(12) United States Patent
Kimura et al.

(10) Patent No.: US 11,708,925 B2
(45) Date of Patent: *Jul. 25, 2023

(54) ELECTRICAL CONDUIT, CONNECTION STRUCTURE FOR ELECTRICAL CONDUIT, BELL BLOCK, METHOD FOR CONNECTING ELECTRICAL CONDUIT, METHOD FOR CONNECTING ELECTRICAL CONDUIT AND BELL BLOCK, PIPE COUPLING, RING MEMBER, DOUBLE-WALL ELECTRICAL CONDUIT, AND CONNECTION STRUCTURE AND CONDUIT LINE FOR DOUBLE-WALL ELECTRICAL CONDUIT

(71) Applicant: FURUKAWA ELECTRIC CO., LTD., Tokyo (JP)

(72) Inventors: Yasuki Kimura, Tokyo (JP); Satoshi Kozawa, Tokyo (JP); Yuzo Nakajima, Tokyo (JP)

(73) Assignee: FURUKAWA ELECTRIC CO., LTD., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/845,440

(22) Filed: Jun. 21, 2022

(65) Prior Publication Data

US 2022/0316639 A1 Oct. 6, 2022

Related U.S. Application Data

(63) Continuation of application No. 16/856,726, filed on Apr. 23, 2020, now Pat. No. 11,402,046, which is a
(Continued)

(30) Foreign Application Priority Data

Oct. 24, 2017 (JP) ................................. 2017-205424

(51) Int. Cl.
*F16L 37/091* (2006.01)
*F16L 37/56* (2006.01)
(Continued)

(52) U.S. Cl.
CPC ............. *F16L 37/091* (2013.01); *F16L 37/56* (2013.01); *H02G 3/0481* (2013.01); *H02G 3/0616* (2013.01)

(58) Field of Classification Search
CPC ....... F16L 37/091; F16L 37/098; F16L 37/56; H02G 3/0616
See application file for complete search history.

(56) References Cited

U.S. PATENT DOCUMENTS 3,695,643 A 10/1972 Schmunk
3,899,198 A 8/1975 Maroschak
(Continued)

FOREIGN PATENT DOCUMENTS

DE 102010029725 A1 12/2011
JP S5890022 U 6/1983
(Continued)

OTHER PUBLICATIONS

International Search Report issued in PCT Patent Application No. PCT/JP2017/041038 dated Jan. 9, 2018.
(Continued)

*Primary Examiner* — David Bochna
(74) *Attorney, Agent, or Firm* — Marshall, Gerstein & Borun LLP

(57) ABSTRACT

A ring member is disposed on a ring member mounting position. The ring member mounting position is a region between a pair of locking walls and is formed in a straight pipe shape. The ring member is in a substantially C shape with an opening at a part of its circumferential direction. The ring member may also be formed in a ring shape being
(Continued)

connected at ring member joint parts. The ring member includes a reduced diameter part and first click parts protruding from the reduced diameter part substantially parallel in the pipe axial direction to form a slide guide. The ring member also includes second click parts of which outer diameters expand gradually from the reduced diameter part toward their tip ends. A male fitting part and a female fitting part are fitted with each other using the above ring member to obtain an electrical conduit. A connection structure for the electrical conduits, a bell block, a method for connecting electrical conduits, a method for connecting an electrical conduit and a bell block, a pipe coupling, and a ring member can be obtained thereby. The present invention can also provide a double-wall conduit of which an outer conduit is the electrical conduit having the same structures as the male fitting part and the female fitting part, a connection structure for the double-wall electrical conduits, and a conduit line using the connection structure.

13 Claims, 38 Drawing Sheets

Related U.S. Application Data continuation-in-part of application No. PCT/JP2017/041038, filed on Nov. 15, 2017.

(51) Int. Cl.
*H02G 3/04* (2006.01)
*H02G 3/06* (2006.01)

(56) References Cited

U.S. PATENT DOCUMENTS

| | | | |
|---|---|---|---|
| 3,958,425 | A | 5/1976 | Maroschak |
| 4,247,136 | A | 1/1981 | Fouss et al. |
| 4,558,889 | A | 12/1985 | Gans |
| 4,865,362 | A | 9/1989 | Holden |
| 5,266,050 | A | 11/1993 | O'Neil et al. |
| 5,326,138 | A | 7/1994 | Claes et al. |
| 5,575,509 | A | 11/1996 | Wood et al. |
| 5,799,703 | A | 9/1998 | Kanao et al. |
| 6,435,567 | B2 | 8/2002 | Kikumori et al. |
| 6,555,750 | B2 | 4/2003 | Kiely |
| 6,941,972 | B2 | 9/2005 | Toliver et al. |
| 7,104,574 | B2 | 9/2006 | Dukes et al. |
| 7,214,890 | B2 | 5/2007 | Kiely et al. |
| 7,434,850 | B2 | 10/2008 | Duininck et al. |
| 7,748,754 | B2 | 7/2010 | Snijders et al. |
| 9,647,432 | B2 | 5/2017 | Yeh |
| 9,762,041 | B1 | 9/2017 | Yeh |
| 11,402,046 | B2 * | 8/2022 | Kimura ............... H02G 3/0616 |
| 2017/0067588 | A1 | 3/2017 | Chaupin et al. |

FOREIGN PATENT DOCUMENTS

| | | |
|---|---|---|
| JP | H02240494 A | 9/1990 |
| JP | H09184581 A | 7/1997 |
| JP | H09287685 A | 11/1997 |
| JP | 2000161563 A | 6/2000 |
| JP | 2002-98268 A | 4/2002 |
| JP | D1149173 | 8/2002 |
| JP | D1178155 S | 6/2003 |
| JP | 2005172233 A | 6/2005 |
| JP | 2006-322491 A | 11/2006 |
| JP | 2007-064267 A | 3/2007 |
| JP | 2009-159742 A | 7/2009 |
| JP | 2009-275790 A | 11/2009 |
| JP | 2009279907 A | 12/2009 |
| JP | 2011-234520 A | 11/2011 |
| JP | 6325715 B1 | 5/2018 |
| WO | WO-2011003778 A1 | 1/2011 |
| WO | WO-2018179680 A1 | 10/2018 |

OTHER PUBLICATIONS

Examination Report issued in Indian Patent Application No. 202047009017 dated Jun. 18, 2020.
Hearing Notice issued in Indian Patent Application No. 202047009017 dated Dec. 21, 2020.
International Application No. PCT/JP2017/041038, International Preliminary Reporton Patentability, dated Apr. 28, 2020.
Description of Evidence issued in Patent Opposition Case of U.S. Pat. No. 6,391,903 dated Mar. 18, 2019.
Notice of Opposition to Patent issued in Opposition of U.S. Pat. No. 6,391,903 dated Mar. 13, 2019.
Decision on Opposition issued in the Opposition of U.S. Pat. No. 6,391,903.
Petition as a Written Statement filed in Opposition of U.S. Pat. No. 6,391,903, dated Mar. 31, 2019.
Written Submission filed in Indian patent Application No. 202047009017 dated Apr. 7, 2021.
Decision for grant of patent issued in Indian Patent Application No. 202047009017 dated Apr. 9, 2021.
Supplementary European Search Report issued in European Patent Application No. 17930128 dated Jun. 18, 2021.

\* cited by examiner

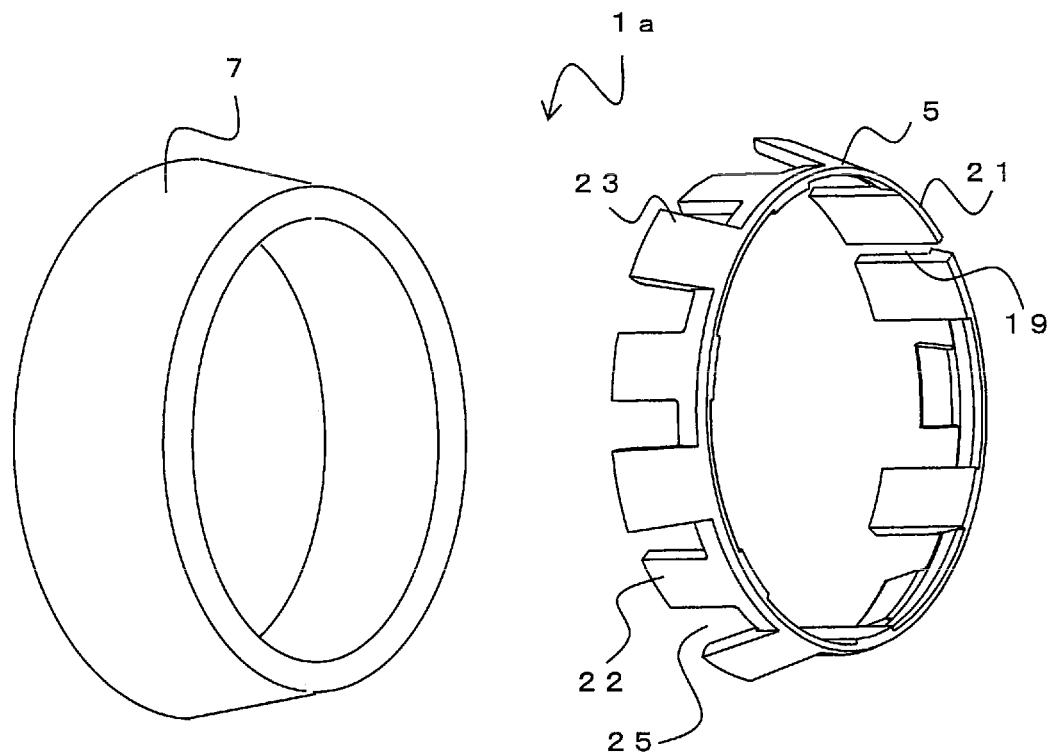
Fig. 1
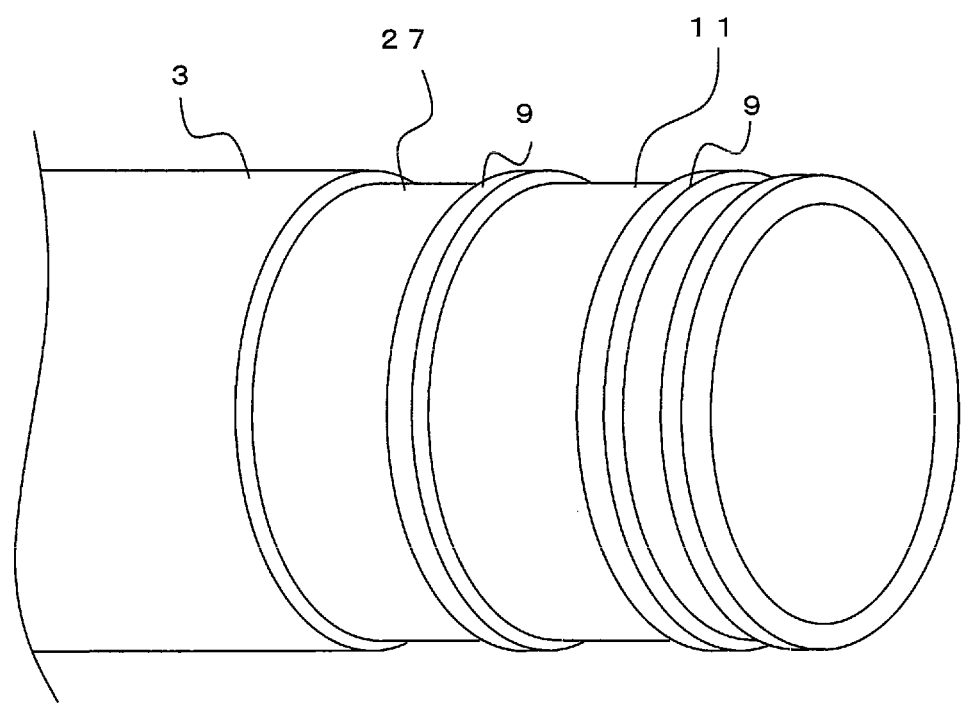

Fig. 1 2 A
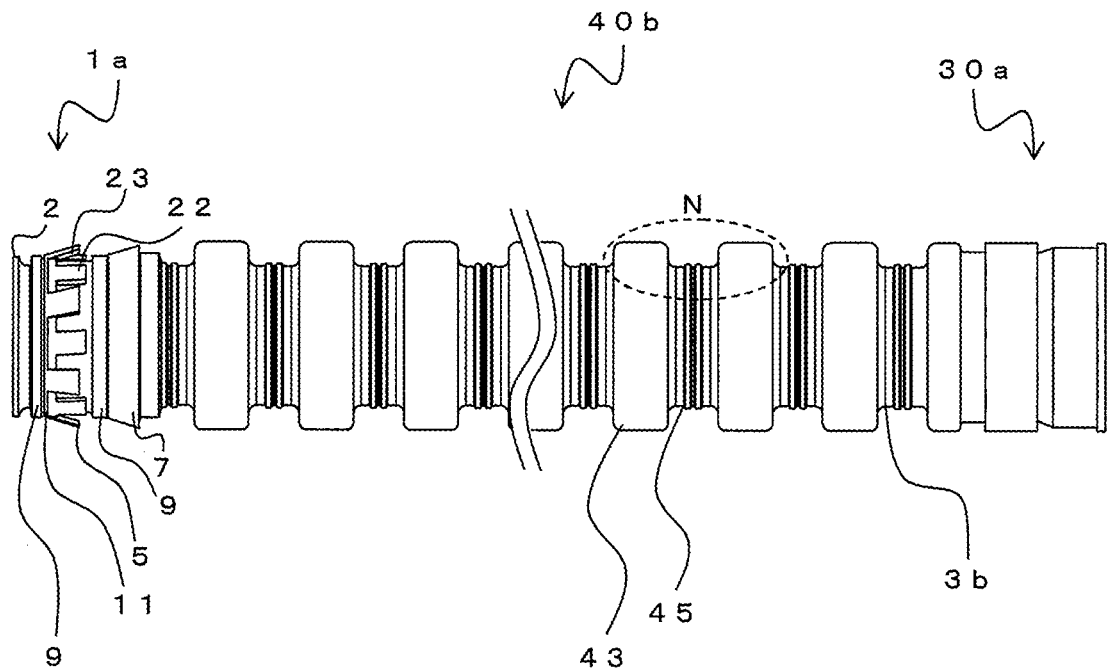
Fig. 1 2 B
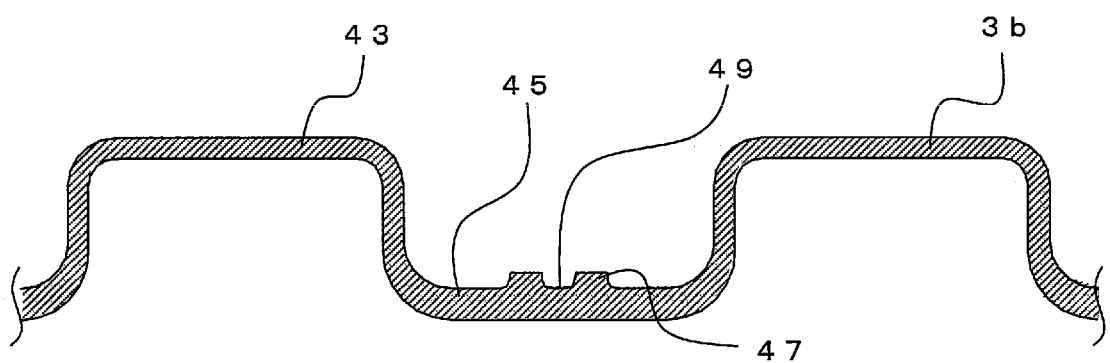

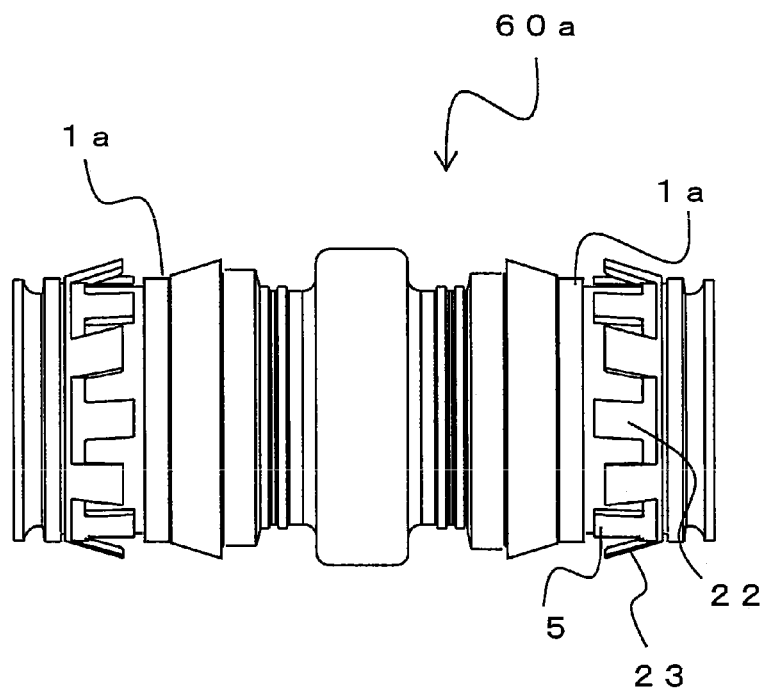
Fig. 1 8 A

Fig. 1 9 A
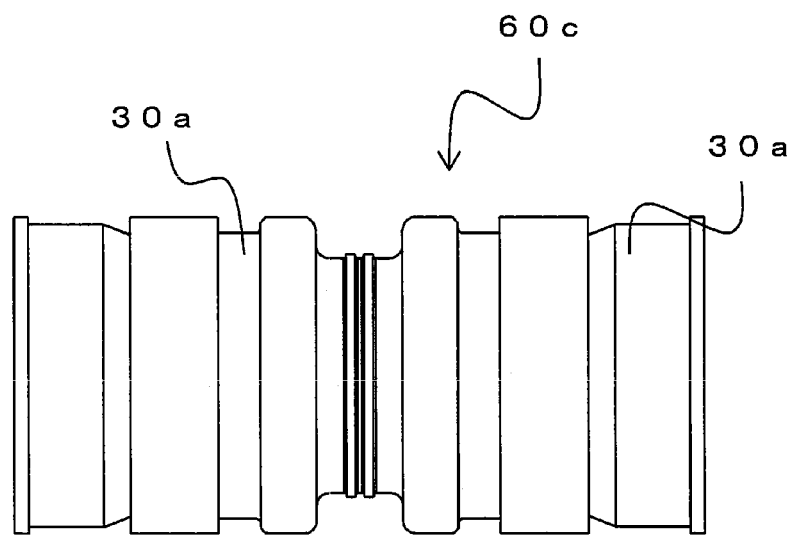
Fig. 1 9 B
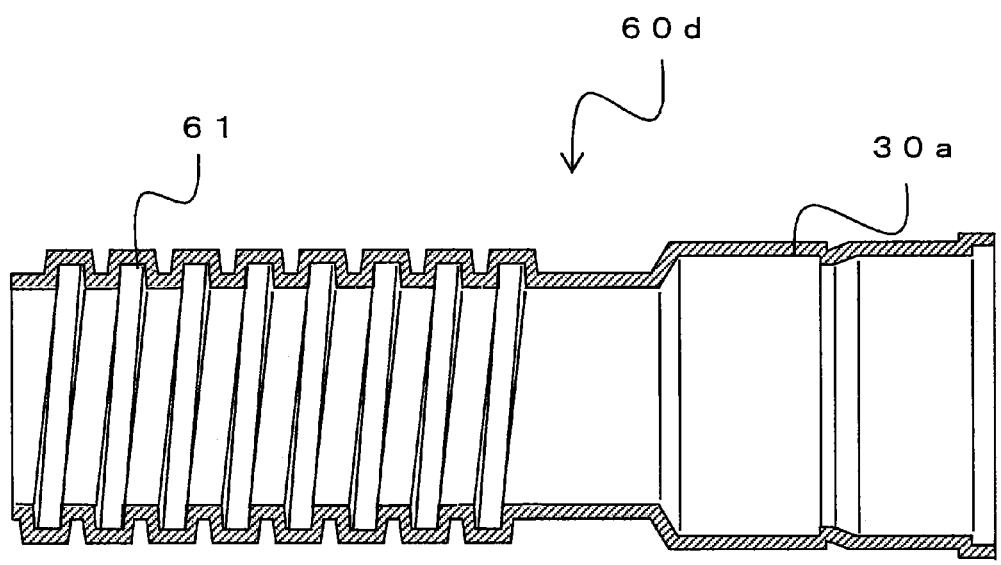

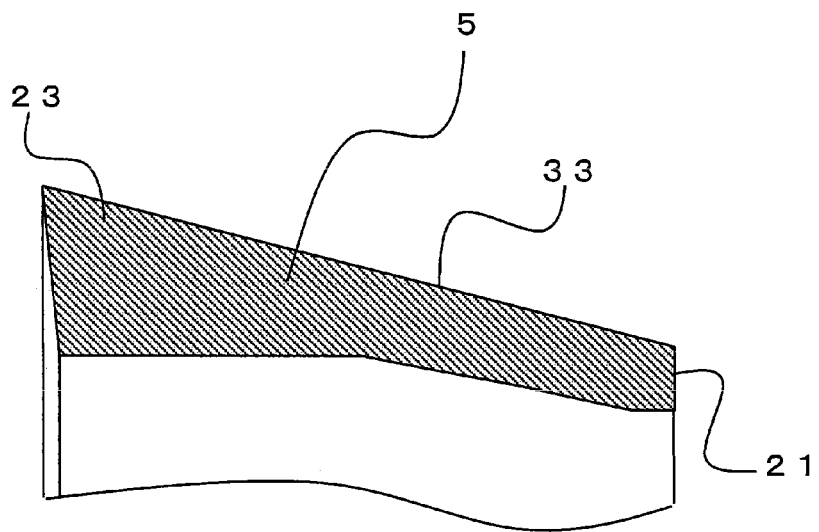
Fig. 2 0 A
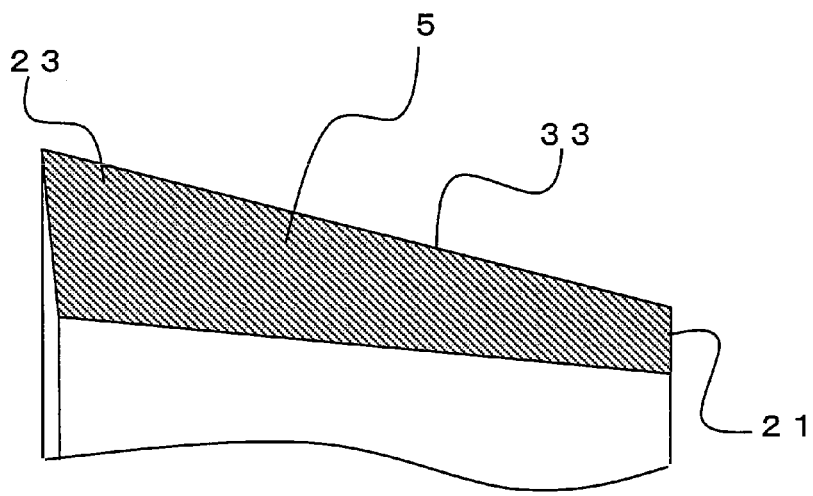
Fig. 2 0 B

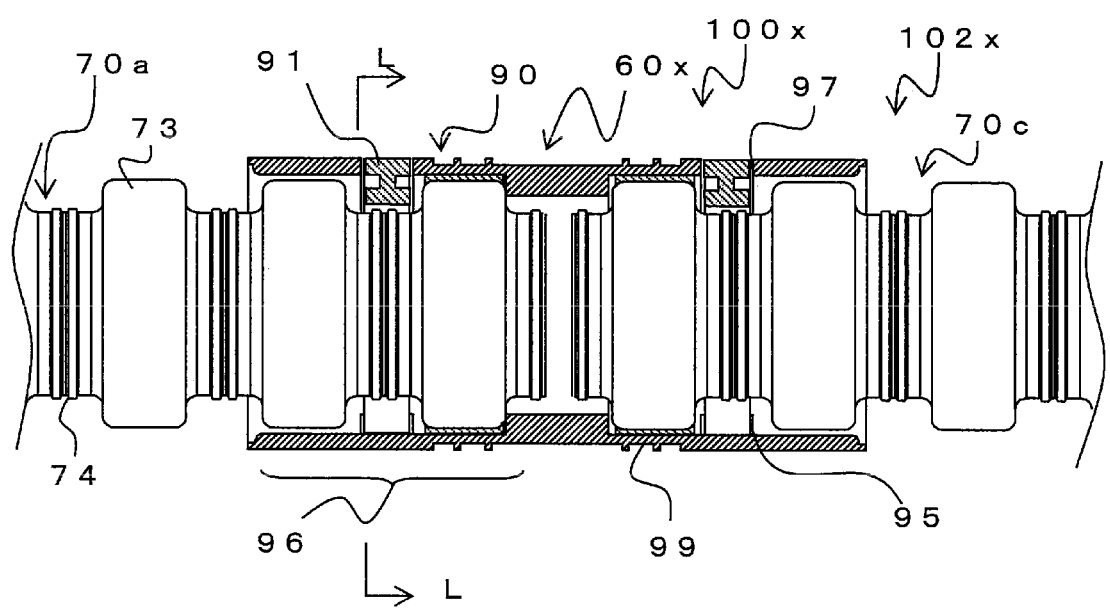
Fig. 2 8 B

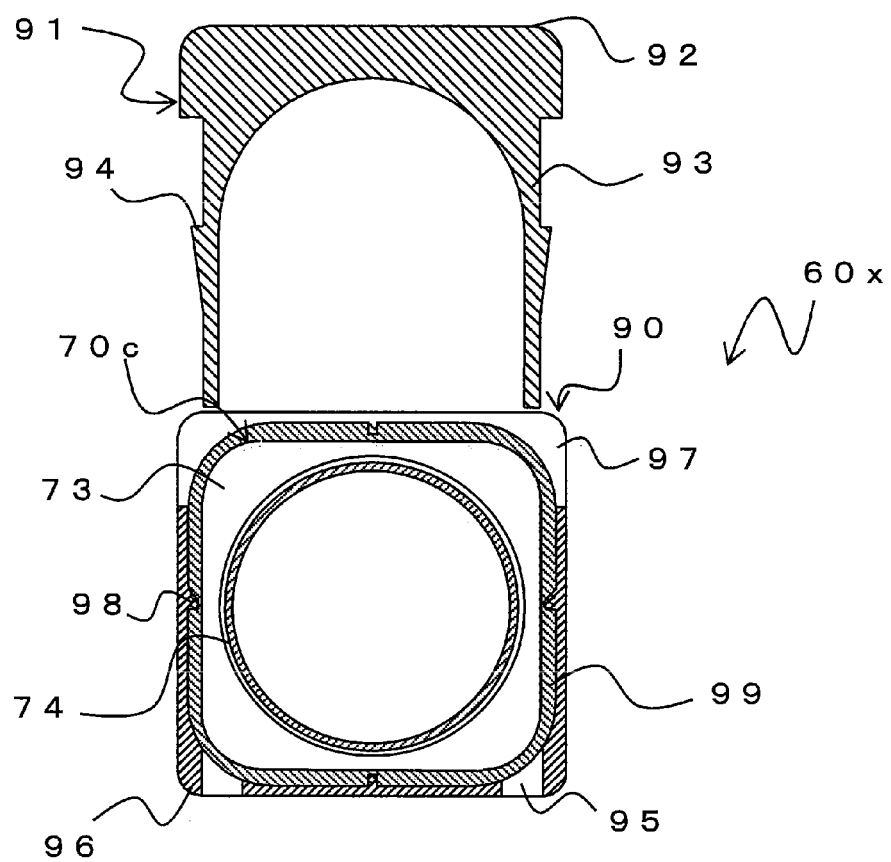
Fig. 2 9 A

ELECTRICAL CONDUIT, CONNECTION STRUCTURE FOR ELECTRICAL CONDUIT, BELL BLOCK, METHOD FOR CONNECTING ELECTRICAL CONDUIT, METHOD FOR CONNECTING ELECTRICAL CONDUIT AND BELL BLOCK, PIPE COUPLING, RING MEMBER, DOUBLE-WALL ELECTRICAL CONDUIT, AND CONNECTION STRUCTURE AND CONDUIT LINE FOR DOUBLE-WALL ELECTRICAL CONDUIT

TECHNICAL FIELD OF THE INVENTION

The present invention relates to an electrical conduit for protecting electrical cables, a connection structure for electrical conduits, a bell block, a method for connecting electrical conduits, a method for connecting an electrical conduit and a bell block, a pipe coupling, a ring member, a double-wall conduit of which an outer conduit is the electrical conduit, a connection structure for the double-wall electrical conduits, and a conduit line using the connection structure.

BACKGROUND OF THE INVENTION

An electrical conduit has been conventionally laid underground to be used, for example. In such a case, a plurality of electrical conduits are laid underground side by side. Also, since each electrical conduit is manufactured and transported having a predetermined length, a plurality of the electrical conduits are connected at joint parts by using pipe couplings or fitting structures to be used.

As such a connection structure for electrical conduits, a pipe coupling having a spiral pipe has been proposed (Patent Document 1), for example.

In Patent Document 1, connection is done by rotating and screwing an end of an electrical conduit having a spiral outer face (a male structure) into a spiral inner face of a pipe coupling (a female structure). In addition, a water expansion member is provided on an outer periphery of the male coupling part and on an inner periphery surface of the female coupling part for water sealing.

Also, a stopper ring, which can compactly and easily connect flexible pipes having wave shapes together, and which does not easily fall off from a pipe coupling on impact or the like, has been disclosed (Patent Document 2).

Patent Document 2 describes a stopper ring that is disposed inside a female fitting part used for connecting electrical conduits, which are protection pipes for cables and the like. The stopper ring disposed on the female fitting part can prevent the male fitting part inserted into the female fitting part from drawing off from the female fitting part. At this time, with an appropriate shape of the stopper ring, attachment of the stopper ring is facilitated.

In more detail, the stopper ring according to an invention of Patent Document 2 includes a ring-shaped main body, a plurality of click parts bending inward in a radius direction of the main body, and a plurality of stoppers provided on an outer periphery surface of the main body, the stoppers protruding toward a periphery of the main body.

Here, the stoppers for the ring stopper include a pair of first stoppers and a pair of second stoppers, in which the pair of the first stoppers are provided on opposing positions on the main body and the pair of the second stoppers are provided on opposing positions on the main body. Also, among the stoppers, inclined parts inclining toward a pipe axis direction of the main body are provided at least on an outer surface of the pair of the second stoppers. The inclined parts provided on the pair of the second stoppers are formed so that inclining angles thereof are facing opposite directions from each other to the pipe axis direction of the main body.

The invention of Patent Document 2 can solve problems such as toppling of the stopper ring inside a pipe or difficulties of attaching the stopper ring on an interior wall of the conduit when attaching a stopper ring to a female coupling of an electrical conduit. Also, it is possible to prevent temporary diameter reduction of the C-shaped stopper ring due to impact of unloading trucks and thus to prevent the stopper ring from drawing off from the pipe coupling.

Also, in addition to the above, Patent Document 3 discloses a synthetic resin pipe with waves in which a socket and a spigot are formed on either end of a pipe axis direction, a rubber ring is attached at a first predetermined position at the back of a rubber ring, and the spigot can be inserted into the socket (Patent Document 3).

In Patent Document 3, a groove for accommodating the ring and protecting the ring from drawing off in co operation with the ring is formed at a second predetermined position of the socket, which is on a farther tip end side than the rubber ring. Patent Document 3 relates to a synthetic resin pipe with waves and a connection structure using the synthetic resin pipe with waves. Also, in the invention of Patent Document 3, the ring attached to the synthetic resin pipe with waves having mountain parts and valley parts alternately formed on a periphery surface thereof is formed by overlapping two ring members, each of which has an opening at a part of its circumferential direction, in the pipe axial direction. When inserting the spigot into the socket, both of these two ring members are under diameter reduction. On the other hand, when pulling out the spigot, the synthetic resin pipe with waves is in contact with one of the ring members so the other ring member stays opened even if the first ring member undergoes diameter reduction. Thus, pulling out of the synthetic resin pipe with waves is restricted.

Also, providing a structure for preventing pulling out of electrical conduits in a block body for protecting electrical conduits used for a handhole has been proposed (Patent Document 4).

In Patent Document 4, an outer shape of the block member is substantially a cube or a cuboid, formed with a penetrating hole. In the penetrating hole, substantially circular cross sectional shapes continues in the pipe axial direction in a projecting and recessed pattern from a front face side to a rear face side of the block. A stopping member having locking piece is attached on a recessed part of the penetrating hole.

Also, a double-wall rectangular electrical conduit, in which an outer pipe and an inner pipe inside the outer pipe are formed as one body, has been disclosed (Patent Document 5). The outer pipe is formed of rectangular cross sectional wall portions and circular cross sectional wall portions that are alternately disposed in its pipe axial direction, while the inner pipe has an inner shape that is formed in a substantially straight cylindrical surface.

Patent Document 5 describes that the double-wall rectangular electrical conduit in Patent Document 5 can be stably laid in any places, the positioning thereof is easy, and, even after laying the pipe, position shifting is unlikely and thus it is easy to keep its layout position.

Moreover, a pipe coupling for rectangular electrical conduits formed of a coupling body and a Π-shaped fixing member including a top surface portion and a pair of leg portions has been described. In this pipe coupling, inserting the Π-shaped fixing member into a cutout portion of the coupling body can fix the electrical conduit (Patent Document 6).

On both side portions of the Π-shaped fixing member of Patent Document 6, a step portion is provided, and the Π-shaped fixing member is inserted from an upper part of the coupling body into the cutout portion. The step portion can prevent the Π-shaped fixing member from coming off the coupling body.

However, Patent Document 1 is for a use in connecting pipes with screw waves and there are restrictions on the shape of applicable pipes. Also, it is necessary to screw a pipe coupling at the time of connection, which requires some time for connection work. Also, since an outer diameter of the pipe coupling is larger than an outer diameter of the pipe body, coupled parts become unstable when a plurality of electrical conduits are stacked and laid underground, for example.

Also, Patent Document 2 relates to a stopper ring, which is inserted and fixed inside a female fitting structure. However, in assembling, workability of inserting the stopper ring inside the female fitting part is bad. Also, it is impossible to view and check its status after assembling, which can lead to unawareness of not attaching the stopper ring or drawing off of the stopper ring in transport, or the like.

Also, the invention of Patent Document 3 includes a rubber ring at a position closer to a male spigot side and further includes a stopper ring at the back of the male part. An expanded diameter ring is to be dropped into a groove of wave parts, which are provided periodically on the male part. However, in Patent Document 3, the rubber ring is provided at the position closer to the spigot side of the male part. For this reason, when further inserting the male coupling part deeply into a female coupling part to be fitted with the stopper ring, insertion resistance of the rubber ring part increases and, in some cases, it is necessary to apply a lubricant onto the rubber ring part.

Also, in Patent Document 4, a part of the locking piece is embedded in the block body and thus its manufacturability is bad. Also, similarly to Patent Document 2, it is impossible to view and check the locking piece from outside.

Also, in the double-wall rectangular electrical conduit according to Patent Document 5, there are no fitting parts such as a male fitting part nor a female fitting part at front and rear tip ends of the electrical conduit, and thus there is an issue that an extra connecting member such as a pipe coupling is required for connecting these electrical conduits. Furthermore, the double-wall rectangular electrical conduit according to Patent Document 5 has no ring member with a slide guide or the like disposed at the male fitting part, since there is no male nor female fitting part therein.

Furthermore, Patent Document 6 discloses a pipe joint. In the pipe coupling according to Patent Document 6, large diameter portions of rectangular electrical conduits are disposed from both sides of the pipe joint into a tubular portion of a substantially rectangular shape, facing each other in a pipe axial direction with a cutout portion therebetween, and fixed by inserting a Π-shaped fixing member into the cutout portion. At this time, the Π-shaped fixing member disposed so as to cover a small diameter portion is in contact with a side face of the cutout portion, and this can prevent falling of the electrical conduit from the pipe joint.

RELATED ART

Patent Documents

[Patent Document 1] Japanese Unexamined Patent Application Publication No. 2007-64267 (JP-A-2007-64267)

[Patent Document 2] Japanese Unexamined Patent Application Publication No. 2009-275790 (JP-A-2009-275790)

[Patent Document 3] Japanese Unexamined Patent Application Publication No. 2002-98268 (JP-A-2002-98268)

[Patent Document 4] Japanese Unexamined Patent Application Publication No. 2011-234520 (JP-A-2011-234520)

[Patent Document 5] Japanese Unexamined Patent Application Publication No. H09-280430 (JP-A-1997-280430)

[Patent Document 6] Japanese Unexamined Patent Application Publication No. 2018-174638 (JP-A-2018-174638)

SUMMARY OF THE INVENTION

The object of the present invention is to provide an electrical conduit, a connection structure for electrical conduits, a bell block, a method for connecting electrical conduits, a method for connecting an electrical conduit and a bell block, a pipe coupling, a ring member, a double-wall conduit of which an outer conduit is the electrical conduit, a connection structure for the double-wall electrical conduits, and a conduit line using the connection structure.

To achieve the above object, a first invention is an electrical conduit including a male fitting part that is formed on an outer periphery part of a pipe body in a vicinity of an end part thereof. The male fitting part includes a pair of locking walls that are disposed separately in a pipe axial direction, a ring member mounting position that connects the locking walls with one another being formed parallel to the pipe axial direction in a straight-pipe shape, a ring member that is disposed on the ring member mounting position between the locking walls. The ring member is in a substantially C shape with an opening at a part of its circumferential direction, and the ring member includes a reduced diameter part at one end part, a plurality of first click parts and a plurality of second click parts. The first and second click parts are provided side by side separately with slits therebetween to the reduced diameter part in its circumferential direction. The first click part is a click part that protrudes from the reduced diameter substantially parallel to the pipe axial direction to form a slide guide and the second click part is a locking click whose outer diameter gradually increases from the reduced diameter part toward a tip end thereof. In the ring member, both a tip end of the second click part and a tip end of the slide guide are disposed so as to be positioned on an inner side of a pipe axial direction of the pipe body and the reduced diameter part is disposed so as to be positioned on a tip end side of the pipe body. Outer diameters of the reduced diameter part and the slide guide are formed smaller than an outer diameter of the locking wall and an outer diameter of the tip end of the second click part is formed larger than the outer diameter of the locking wall. There is a clearance between the ring member and at least one of the locking walls and the ring member can slide in an axial direction over the ring member mounting position.

As above, the ring member includes the reduced diameter part at one end part of the ring member, a plurality of the first click parts and the second click parts that are provided side by side separately with slits therebetween to the reduced diameter part in its circumferential direction. Here, the first click part is a click part that protrudes from the reduced diameter substantially parallel to the pipe axial direction to form a slide guide and the second click part is formed of a locking click whose outer diameter gradually increases from the reduced diameter part toward a tip end thereof. Since the first click parts are disposed on a part of the circumferential direction, the number of the second click part disposed thereon is less and an insertion resistance at the time of inserting the female fitting part into the male fitting part is reduced so the female fitting part is easily inserted into the male fitting part. Here, the effect of lowering the insertion resistance by providing the first click parts is especially effective in connection of electrical conduits particularly having large diameters.

Also, the slide guide, which is the first click part, and the locking click, which is the second click part, of the electrical conduit is formed in plurality of numbers at predetermined intervals. At this time, each of the click parts may be disposed so as to be mutually formed at the predetermined intervals in the circumferential direction, or each of the click parts may be disposed facing a center of the ring member mounting position, for example.

Here, when the male fitting part is inserted into the female fitting part to fit the electrical conduits with each other, since the outer diameter of the slide guide, which is the first click parts, is smaller than the outer diameter of the locking wall, the first click parts contact the locking wall while the ring member slides and moves. Thus, the retaining ring does not ride over the locking wall and the ring member can be held stably. Also, since the outer diameter of the locking click, which is the second click parts, is larger than that of the locking wall and the locking click is formed so as to protrude from the locking wall, the ring member fitting part of the female fitting part can be held stably by the locking click when a pulling out force is applied onto the ring member.

Also, since the ring member slides and moves, friction resistance between the female fitting part and the ring member can be reduced, which facilitates connection of the electrical conduits.

Here, a ring member joint part may be formed on each end of the ring member and both ends of the ring member may be connected with each other at the ring member joint parts so that the ring member is formed in a ring shape on the ring member mounting position of the male fitting part of the pipe body.

Connecting ends of the ring member with each other and forming the ring member in a ring shape in this way prevents the ring member from leaning or drawing off during transportation or connection of the electrical conduits.

Also, forming the joint parts of the ring member in saw-blade like grooves, numerous micro protrusions, adhesive layers with release paper, or the like allows the joint parts to change a joint position and to adjust a length of the ring member. If the joint parts are formed in such a length-adjustable shape, size variation in manufacturing the fitting part of the electrical conduit can be absorbed and a clearance between the ring member and the ring member mounting position can be optimized.

The second click part of the ring member may be formed as a planar shape. Examples for the planar shape of the second click part are a rectangular shape, a trapezoid shape, and a tongue shape. Also, the click part in the second invention can be formed as a shape of only a contour periphery part of the planar shape, for example. Examples are a horseshoe shape, a U shape, and a V shape. By having such a shape with the contour periphery part, the reduced part can be easily deformed when the female fitting part is inserted, and inserting the electrical conduit is easy.

The electrical conduit may have a water sealing member that is provided on a farther inner side with respect to the locking wall on the inner side of the pipe axial direction of the male fitting part. In the present invention, as described below, a side with an opening of the pipe body is defined as a tip end side, and a farther deep side in a longitudinal direction opposite to the tip end side is defined as an inner side of the pipe axial direction of the pipe body.

According to the first invention, the ring member disposed on an outer surface of the male fitting member can slide and move over the ring member mounting position while being easily viewed. Also, at the time of inserting the male fitting part into the female fitting part, since the slide guide, which is the first click parts, is formed on the ring member, the slide guide allows the female fitting part to be stably inserted into the male fitting part. Furthermore, forming the slide guide of the ring member can reduce the number of the locking clicks, which are the second click parts of the ring member, so that the insertion resistance is reduced and the insertion property of the ring member can be improved. Also, the effects of diameter expansion due to expansion of circumferential length of the ring member from elastic repulsive force of the ring member and diameter expansion of the click part in a cross section taken in the pipe axial direction from a restoration of bending transformation can efficiently deform the ring member.

Also, providing a ring member joint part on each end of the ring member and connecting both ends of the ring member can form the ring member in a ring shape. Forming the ring member in a ring shape in this way can slide and move the ring member smoothly over the ring member mounting position.

In particular, at the time of fitting the male fitting part into the female fitting part, the ring member can slide and move over the ring member mounting position of the male fitting part. When the male fitting part is pushed further into the female fitting part, the ring fitting part adjacent to a slope part of the female fitting part eventually contacts the second click part of the ring member so the ring member restraints the male fitting part to the female fitting part and the male fitting part acts effectively to connect the electrical conduits.

As above, in the first invention, the ring fitting part formed in the female fitting part locks the male fitting part immediately after the click part of the ring member passes over the ring fitting part. Also, the tip end of the second click parts of the ring member are disposed on farther inside of the electrical conduit so that the diameter of the ring member can be easily reduced or expanded and thus an elastic repulsive force of the ring member facilitates the expansion of the diameter thereof. Also, even if the thickness of the end part of the reduced diameter part of the ring member to which a pulling out force is applied is increased, the slits formed in the ring member allow the diameter to be reduced easily.

A second invention is an electrical conduit having fitting structures on both ends. The electrical conduit includes a pipe body, a male fitting part formed on one end of the pipe body, and a female fitting part formed on another end of the pipe body. The female fitting part includes a shape that can be fitted with the male fitting part. The male fitting part is formed on an outer periphery part of the pipe body in a vicinity of an end part thereof. The male fitting part includes a pair of locking walls that are disposed separately in a pipe axial direction, a ring member mounting position that connects the locking walls with one another, the ring member mounting position being formed parallel to the pipe axial direction in a straight-pipe shape, and a ring member that is disposed on the ring member mounting position between the locking walls. The ring member is in a substantially C shape with an opening at a part of its circumferential direction. The ring member includes a reduced diameter part at one end part, a plurality of first click parts and a plurality of second click parts. The first and second click parts are provided side by side separately with slits therebetween to the reduced diameter part in its circumferential direction. The first click part is a click part that protrudes from the reduced diameter substantially parallel to the pipe axial direction to form a slide guide and the second click part is a locking click whose outer diameter gradually increases from the reduced diameter part toward a tip end thereof. In the ring member, both a tip end of the second click part and a tip end of the slide guide are disposed so as to be positioned on an inner side of the pipe axial direction of the pipe body and the reduced diameter part is disposed so as to be positioned on a tip end side of the pipe body. Outer diameters of the reduced diameter part and the slide guide are formed smaller than an outer diameter of the locking wall and an outer diameter of the tip end of the second lick part is formed larger than the outer diameter of the locking wall. There is a clearance between the ring member and at least one of the locking walls and the ring member can slide in an axial direction over the ring member mounting position. The female fitting part is formed on an inner circumferential part of the pipe body and includes, from the tip end side in sequence, a cylindrical part, a slope part whose diameter reduces gradually from the cylindrical part, and a ring fitting part whose diameter expands from a minimum inner diameter part of the slope part.

A water sealing member may be provided on a farther inner side with respect to the locking wall on the inner side of the pipe axial direction of the male fitting part. In this way, it is possible to stop water with more certainty.

Continuous predetermined-pitched spiral wavy forms may be formed on an outer periphery surface of the pipe body between the male fitting part and the female fitting part.

Large diameter parts as substantially square shaped mountain parts and small diameter parts as circular valley parts may be alternately formed on an outer periphery surface of the pipe body between the male fitting part and the female fitting part.

A pair of protrusion parts may be formed at a substantially center of the small diameter part as the valley part in a pipe axial direction of the pipe body and a flat part may be formed between the protrusion parts on a cross section in the pipe axial direction of the pipe body.

The small diameter part as the valley part in a pipe axial direction of the pipe body may be formed in a wave shape.

The second click part of the ring member may include a tapered part whose diameter decreases from a tip end of the second click part toward the reduced diameter part on a cross section taken in the pipe axial direction, and the second click part may be in a sharp wedge shape, in which the thickness decreases from the tip end of the second click part toward the reduced diameter part.

An inner circumferential part of the ring member may be in the wedge shape, in which the diameter thereof gradually and continuously decreases from the second click part, or the inner circumferential part of the ring member may be in a two-step sharp wedge shape in which the inner circumferential part is bent. Thus, the inner circumferential part of the ring member may be in a two-step sharp wedge shape in which the inner circumferential part is bent as above, or the inner circumferential part of the ring member may be in the wedge shape, in which the diameter thereof gradually and continuously decreases from the second click part.

Also, on condition that an enough strength is given to prevent the ring member from buckling when a pulling out force is applied, the ring member may be in a wedge shape in which a part where the thickness thereof is slightly decreases is formed halfway from the tip end of the second click part toward the reduced diameter part.

A ring member joint part may be formed on each end of a circumferential direction of the ring member and both ends of the ring member may be connected at the ring member joint parts so that the ring member is formed in a ring shape on the ring member mounting position.

The ring member may be made of any of ABS resin, PP resin, rigid polyvinyl chloride, PC resin mixed with any of the above, and polymer alloy.

The water sealing member may be disposed on a water sealing member holder that is formed farther on the inner side with respect to the locking wall on the inner side of the pipe axial direction of the male fitting part.

The water sealing member may be made of rubber or a water expansion member.

According to the second invention, the same effects as the first invention can be obtained. Also, since the second invention includes the male fitting part on one end and the female fitting part on the other end, it is easy to connect a plurality of the electrical conduits.

Also, the electrical conduit according to the second invention can have spiral wavy forms formed on the outer periphery surface of the pipe body. That is, the male fitting part and the female fitting part can be provided onto a conventional pipe with spiral waves.

Also, the electrical conduit according to the second invention may have substantially square shaped mountain parts and circular valley parts alternately formed on the outer periphery surface of the pipe body. That is, the electrical conduit may be a square shaped electrical conduit. In this way, a plurality of the electrical conduits can be stacked stably when being stacked.

At this time, if a pair of the protrusion parts are formed at a substantially center of the valley part in the pipe axial direction and a groove-like shape is formed between the protrusion parts, the electrical conduit can be cut easily at this part. Thus, length adjustment is easy.

The valley part between the substantially square shaped mountain parts may be in a waveform. In this way, flexibility can be further improved.

Here, when the male fitting part is inserted into the female fitting part to fit the electrical conduits with each other, since the outer diameter of the slide guide, which is the first click parts, is smaller than the outer diameter of the locking wall, the first click parts contact the locking wall while the ring member slides and moves. Thus, the retaining ring does not ride over the locking wall and the ring member can be held stably. Also, since the outer diameter of the locking click, which is the second click parts, is larger than that of the locking wall and the locking click is formed so as to protrude from the locking wall, the ring member fitting part of the female fitting part can be held stably by the locking click when a pulling out force is applied onto the ring member. Also, since the ring member slides and moves, friction resistance between the female fitting part and the ring member can be reduced, which facilitates connection of the electrical conduits.

Here, a ring member joint part may be formed on each end of the ring member and both ends of the ring member may be connected with each other at the ring member joint parts so that the ring member is formed in a ring shape on the ring member mounting position. Connecting the ends of the ring member with each other and forming the ring member in a ring shape in this way prevents the ring member from leaning toward the pipe axial direction or drawing off during transportation or connection of the electrical conduits.

Here, the ring member used in the second invention has the same structure, and thus the same effects, as the ring member used in the first invention. Thus, problems such as leaning of the ring member or overriding on the locking wall by the ring member, which arise in fitting the electrical conduits using the ring member formed only with the locking clicks, which are the second click parts, hardly occur. Furthermore, this enables the insertion resistance at the time of inserting the male fitting part into the female fitting part to decreases and facilitates the connection of the electrical conduits. Also, arrangements and shapes of the first click parts and the second click parts of the ring member in the second invention can be configured in the same way as the ring member in the first invention, and thus the same effects as the first invention can be obtained.

Also, if the ring member joint part is provided on each end of the ring member and both ends of the ring member are connected with each other at the ring member joint parts, the ring member can be formed in a ring shape. By forming the ring member in the ring shape in this way, the ring member can smoothly slide and move over the ring member mounting position. Furthermore, if the joint parts of the ring member have a length-adjustable structure, such as in saw-blade like grooves, numerous micro protrusions, or adhesive layers with release paper, at the time of joining the ring member, then size variation in manufacturing the fitting part of the electrical conduit can be absorbed and a clearance between the ring member and the ring member mounting position can be optimized.

Here, the ring member is in a sharp wedge shape in which the thickness thereof decreases from the tip end of the second click part toward the reduced diameter part, or in a two-step wedge shape in which the inner circumferential part of the ring member is bent. That is, the ring member is in a wedge shape in which the diameter of the ring member decreases from the tip end of the second click part toward the reduced diameter part. Also in this case, at the time of reducing the diameter of the ring member, the diameter of the ring member can be reduced by elastically deforming the ring member so that the ring member declines toward the pipe axial direction with the reduced diameter part as the supporting point.

Also, by appropriately selecting a material and a shape for the ring member, moderate elasticity and strength for withstanding the pulling out force can be obtained at the same time.

Also, either rubber or a water expansion member can be chosen for the water sealing member.

A third invention is a connection structure for the electrical conduits according to the second invention. The connection structure includes a plurality of the electrical conduits, in which the male fitting part of one of the electrical conduits fits and connects with the female fitting part of the other electrical conduit.

Also, the third invention is a connection structure for the electrical conduits according to the second invention. The connection structure includes a handhole including a bell block and the electrical conduit, in which the bell block having the same structure as the female fitting part is connected with the male fitting part of the electrical conduit.

The handhole may include a plurality of the bell blocks and the electrical conduit may be connected to a part or all of the bell blocks.

According to the third invention, a connection structure for the electrical conduits with the others or for the electrical conduit and the bell block, in which connecting operation is easy, can be obtained.

A fourth invention is a bell block that can be connected with the electrical conduit according to the second invention. The bell block includes a structure that is the same as the female fitting part.

According to the fourth invention, the bell block that can be easily connected with the electrical conduit can be obtained.

A fifth invention is a method for connecting the electrical conduits according to the second invention. The method includes steps of, in sequence, inserting a tip end of the male fitting part into the female fitting part, contacting the tapered part on an outer periphery of the ring member disposed on a region between the locking walls to the slope part of the female fitting part and sliding and moving the ring member up to an end part side of the ring member mounting position of the male fitting part to elastically deform the second click part of the ring member declining toward the pipe axial direction with a contacting part between the ring member mounting position of the male fitting part and an inner surface of the reduced diameter part of the ring member as a supporting point and to reduce a diameter of the second click part, and passing an end of the second lick part through the slope part of the female fitting part to accommodate the second click part into the ring fitting part formed on the inner side of the pipe axial direction of the slope part of the female fitting part.

Also, the method may include a step in which a ring member joint part is formed on each end of the ring member and both ends of the ring member are connected to each other at the ring member joint parts before connecting electrical conduits so that the ring member is formed in a ring shape circularly surrounding a periphery of the ring member mounting position.

In this case, the diameter of the ring member decreases while the ring member slides. Thus, compared to a case in which the ring member is fixed and reduced in the diameter, the diameter of the ring member can be reduced by smaller degrees according to slide positions. Thus, resistance at the time of connecting the electrical conduits together can be less.

Also, a sixth invention is a method for connecting the electrical conduit according to the second invention and a bell block having the same structure as the female fitting part of the electrical conduit. The method includes steps of, in sequence, inserting a tip end of the male fitting part into the bell block, contacting the tapered part on an outer periphery of the ring member disposed on a region between the locking walls to the slope part of the bell block and sliding and moving the ring member up to an end part side of the ring member mounting position of the male fitting part to elastically deform the second click part of the ring member declining toward the pipe axial direction with a contacting part between the ring member mounting position of the male fitting part and an inner surface of the reduced diameter part of the ring member as a supporting point and to reduce a diameter of the second click part, and passing an end of the second lick part through the slope part of the bell block to accommodate the second click part into the ring fitting part formed on the inner side of the pipe axial direction of the slope part of the bell block.

Also, the method may include a step in which a ring member joint part is formed on each end of the ring member and both ends of the ring member are connected to each other at the ring member joint parts before connecting electrical conduits so that the ring member is formed in a ring shape circularly surrounding a periphery of the ring member mounting position.

According to the fifth and sixth inventions, the electrical conduits with the others, or the electrical conduits and the bell block, can be easily connected.

A seventh invention is a pipe coupling that can be connected with the electrical conduit according the second invention, in which at least one end of the pipe coupling has the same structure as the male fitting part.

In this case, both ends may have the same structures as the male fitting part. Also, one of the ends may have the same structure as the male fitting part and the other end may be a bell mouth. Also, one of the ends may have the same structure as the female fitting part and the other end may have the same structure as the male fitting part.

Also, the seventh invention is a pipe coupling that can be connected with the electrical conduit according the second invention, in which at least one end of the pipe coupling has the same structure as the female fitting part.

In this case, one end may have the same structure as the female fitting part and the other end may be a bell mouth. Also, one end may have the same structure as the female fitting part and the other end may have continuous spiral wavy forms on an outer surface of the pipe body.

According to the seventh invention, the pipe coupling that can be connected with the male fitting part or the female fitting part of the electrical conduit can be obtained.

An eighth invention is a ring member used for a connecting part of an electrical conduit. The ring member is in substantially C shape with an opening at a part of its circumferential direction. The ring member includes a reduced diameter part at one end part, a plurality of first click parts and a plurality of second click parts. The first and second click parts are provided side by side separately with slits therebetween to the reduced diameter part in its circumferential direction. The first click part is a click part that protrudes from the reduced diameter substantially parallel to the pipe axial direction to form a slide guide, and the second click part is a locking click whose outer diameter gradually increases from the reduced diameter part toward a tip end thereof.

The second click part of the ring member includes a tapered part whose diameter decreases from a tip end of the second click part toward the reduced diameter part on a cross section taken in the pipe axial direction, and is in a sharp wedge shape, in which the thickness decreases from the tip end of the second click part toward the reduced diameter part. A thin part which is formed by making a thickness of an inner part of an outer frame part of a click surface of a click part of the second click part less than a thickness of an outer frame part may be provided.

The slide guide may be formed in a planar shape. Also, the slide guide may be formed in a frame shape. Here, the planar shaped slide guide is preferably in a rectangular or trapezoid shape, and the frame shaped slide guide is preferably in a substantially horseshoe shape, a U shape, or a V shape.

According to the eighth invention, using the ring member for the male fitting part facilitates fitting with the female fitting part and the male fitting part in which connection operation is easy can be obtained.

A ninth invention is a double-wall rectangular electrical conduit including an outer pipe formed of an electrical conduit having fitting structures on both ends. The electrical conduit includes a pipe body, a male fitting part formed on one end part of the pipe body, and a female fitting part formed on another end part of the pipe body. The female fitting part has a shape that can be fitted with the male fitting part. The male fitting part is formed on an outer periphery part of the pipe body in a vicinity of the end part thereof. The male fitting part includes a pair of locking walls that are disposed separately in a pipe axial direction, a ring member mounting position that connects the locking walls with one another, the ring member mounting position being formed parallel to the pipe axial direction in a straight-pipe shape, and a ring member that is disposed on the ring member mounting position between the locking walls. The ring member is either in a substantially C shape with an opening at a part of a circumferential direction of the ring member, or in a ring shape being connected at ring member joint parts formed at both ends of the circumferential direction of the ring member. The ring member includes a reduced diameter part at one end part thereof, a plurality of first click parts and a plurality of second click parts, the first and second click parts being provided side by side separately with slits therebetween to the reduced diameter part in the circumferential direction of the ring member. The first click part is a click part that protrudes from the reduced diameter substantially parallel to the pipe axial direction to form a slide guide and the second click part is a locking click whose outer diameter gradually increases from the reduced diameter part toward a tip end thereof. In the ring member, both a tip end of the second click part and a tip end of the slide guide are disposed so as to be positioned on an inner side of a pipe axial direction of the pipe body and the reduced diameter part is disposed so as to be positioned on a tip end side of the pipe body. Outer diameters of the reduced diameter part and the slide guide are formed smaller than an outer diameter of the locking wall and an outer diameter of the tip end of the second lick part is formed larger than the outer diameter of the locking wall. There is a clearance between the ring member and at least one of the locking walls and the ring member can slide in an axial direction within the ring member mounting position. The female fitting part is formed on an inner circumferential part of the pipe body and includes, from the tip end side in sequence, a cylindrical part, a slope part whose diameter reduces gradually from the cylindrical part, and a ring fitting part whose diameter expands from a minimum inner diameter part of the slope part. A water sealing member is provided on a farther inner side of the locking wall on the inner side of the pipe axial direction of the male fitting part of the outer pipe. Large diameter parts as substantially square shaped mountain parts and small diameter parts as circular valley parts are alternately formed on an outer periphery surface of the pipe body between the male fitting part and the female fitting part. An inner pipe in a substantially tubular shape is disposed inside the outer pipe. An inner periphery surface of the small diameter part of the outer pipe is fusion bonded with an outer periphery surface of the inner pipe at the small diameter part.

It is preferable that the inner pipe is accommodated inside the male fitting part of the outer pipe, and the inner pipe is cut inside the female fitting part of the outer pipe so as not to obstruct a connection between the male fitting part and the female fitting part.

The ninth invention can provide a double-wall electrical conduit having the electrical conduit according to the first invention as an outer pipe and a substantially tubular-shaped inner pipe that is fusion bonded to the small diameter part. Here, the double-wall electrical conduit has a better wire passing performance than a common single wall rectangular electrical conduit in which alternating large diameter parts and small diameter parts are disposed. This is because the double-wall electrical conduit has the tubular-shaped inner pipe disposed inside the electrical conduit and there are hence no groove-like spaces corresponding to the large diameter part existing on the inner surface side thereof. This allows construction of the electrical conduits not only to attain high efficiency by disposing the substantially rectangular electrical conduits closely contacting with each other, but also to easily carry out wire passing, which widely reduces the cost of construction. Also, since the double-wall electrical conduit according to the present invention has the inner pipe and the outer pipe that are fusion bonded together at predetermined intervals to be unified, its rigidity is higher compared to an electrical conduit without an inner pipe. Furthermore, because of its moderate flexibility, the double-wall rectangular electrical conduit according to the ninth invention has high rigidity and, at the same time, excels not only in wire passing performance but also in handling performance.

The double-wall rectangular electrical conduit according to the ninth invention includes at least the rectangular electrical conduit according to the second invention. Furthermore, the double-wall rectangular electrical conduit according to the ninth invention can be connected with the bell block according to the fourth invention, and thus a structure similar to the connection structure for the electrical conduit and the bell block according to the third invention can be obtained. Also, the structures of the male fitting part, the female fitting part, and the like of the double-wall rectangular electrical conduit according to the ninth invention are the same as in the second invention, and thus the method for connecting the electrical conduit and the bell block according to the sixth invention can be obtained. Also, the seventh invention is a pipe coupling in which at least one end of the pipe coupling has the same structure as the male fitting part according to the second invention. Also, the ring member according to the eighth invention can be applied to the ninth invention.

A tenth invention is a connection structure for double-wall rectangular electrical conduits, in which the two double-wall rectangular electrical conduits according to the ninth invention are disposed facing each other in the pipe axial direction, and the female fitting part of the first double-wall rectangular electrical conduit is inserted into the male fitting part of the second double-wall rectangular electrical conduit. The tenth invention can provide a connection structure for double-wall rectangular electrical conduits, and, in addition, a conduit line for the double-wall rectangular electrical conduit can be obtained from a plurality of the connection structures. Such a conduit line has high rigidity and excels in wire passing performance, and, at the same time, slacking of the electrical conduit that impairs flexibility can be suppressed and the construction performance of the conduit line is thereby improved.

By connecting the male fitting part with the female fitting part at both ends of the double-wall rectangular electrical conduits as above, it is possible to build a conduit line for a predetermined length, but it is impossible to adjust the length of the conduit line for the double-wall rectangular electrical conduits. To adjust the length of the conduit line formed of the double-wall rectangular electrical conduits, it is required to cut the double-wall rectangular electrical conduit at the small diameter part to have a predetermined length and then to face and connect together the double-wall rectangular electrical conduits that are cut at the small diameter parts.

Also, an eleventh invention is a connection structure for double-wall rectangular electrical conduits, wherein a pipe coupling is used to connect the double-wall rectangular electrical conduits according to the ninth invention. The pipe coupling includes a joint body and a Π-shaped fixing member. The Π-shaped fixing member includes a top surface portion and leg portions that are connected at substantially right angles to the top surface portion projecting downward. The double-wall rectangular electrical conduits each end part of which is cut at the substantial center of the pipe axial direction of the small diameter part are inserted into both sides of the coupling body of the pipe coupling, respectively. A cutout portion is formed at an upper part of the coupling body at a position corresponding to each of the small diameter parts in the proximity of the end parts of the double-wall rectangular conduits, the small diameter part being situated between the two large diameter parts that are inserted into the coupling body. The Π-shaped fixing member is inserted from above into the cutout portion, and the inserted Π-shaped fixing member restricts movement of the large diameter part so that the double-wall rectangular electrical conduit being cut at the substantial center of the pipe axial direction of the small diameter of the double-wall rectangular electrical conduit and the other double-wall rectangular electrical conduit being cut at the substantial center of the pipe axial direction of the small diameter are connected to the pipe coupling.

In the eleventh invention, the double-wall electrical conduit has the large diameter part formed so that the diameter thereof gradually expands outward, and thus a stress force directing outward is applied onto an end part of the small diameter part at the time of fusion bonding. Whereas, cutting at the substantial center of the pipe axial direction of the small diameter part means that it is possible to cut the electrical conduits connected by the pipe coupling at a part where the fusion-bonding strength with the connected inner pipe is the highest. Also, cutting at the substantial center of the pipe axial direction of the small diameter part allows the fusion bonding part of the small diameter part to have predetermined lengths on both sides of the cut part. This prevents a decrease in the bonding strength between the inner pipe and the outer pipe due to vibration at the time of cutting or the like, which is effective in keeping the large diameter part in a stable shape in vicinity of the cut part.

A twelfth invention is a connection structure for double-wall rectangular electrical conduits, wherein a pipe coupling is used to connect the double-wall rectangular conduits according to the ninth invention. The pipe coupling includes a tubular member, and a locking piece disposed inside the tubular member, the locking piece having a spring property. The end parts of the double-wall rectangular electrical conduits each of which is cut at the substantial center of the pipe axial direction of the small diameter part are inserted into the substantially rectangular tubular member from both sides of the tubular member, respectively. The locking piece having a spring property supported on a far side from a facing portion of the double-wall rectangular electrical conduit becomes contact with and supports a side face of the large diameter part on a side closer to the facing portion of the double-wall rectangular electrical conduit, so that the double-wall rectangular electrical conduits inserted from the both ends of the tubular member into the tubular portion are connected together. The connection structure for double-wall rectangular electrical conduits can be easily obtained by means of the pipe coupling using such locking piece.

Furthermore, if an end part on an opposite side of a connecting part in the connection structure for the double-wall rectangular electrical conduits is cut at the substantial center of the small diameter part in the twelfth invention, a conduit line of the double-wall rectangular electrical conduits can be obtained by using the similar pipe coupling to connect another double-wall rectangular electrical conduit that has no connecting part and is cut at the substantial center of the small diameter part.

Here, it is preferable that a pair of protrusion portions are formed symmetrically with a flat portion therebetween at the substantial center of the pipe axial direction of the small diameter part of the double-wall rectangular electrical conduit according to either of the eleventh and twelfth inventions. If the pair of protrusion portions are formed symmetrically with a flat portion therebetween at the substantial center of the pipe axial direction of the small diameter part, it is possible to cut the flat portion formed between the protrusion portions. This enables a stable cutting at the substantial center of the small diameter part where the fusion-bonding strength of the inner pipe mentioned above is the highest, while allowing the fusion bonding part of the small diameter part to keep the predetermined length.

A thirteenth invention is a conduit line for double-wall rectangular conduits, wherein a substantial center of the pipe axial direction of the small diameter part on an opposite side of the end part that is connected to the pipe coupling for the double-wall electrical conduit is formed as an other end part in the connection structure for double-wall rectangular electrical conduits according to either eleventh invention or the twelfth invention, and at least one, or two or more, of the double-wall rectangular conduits each having the substantial center of the pipe axial direction of the small diameter part as the end part, are further connected to the other end part of the connection structure. According to the thirteenth invention, in an electrical conduit of a predetermined length including a large number of the large diameter parts and the small diameter parts that are alternately disposed, the length of the electrical conduit to be connected can be adjusted by changing the decision of which small diameter part disposed among the alternate arrangement of the large diameter parts and the small diameter parts is to be cut. The adjustment of the length of the conduit line for double-wall rectangular electrical conduits is thereby possible.

The conduit line for double-wall rectangular electrical conduits obtained as above includes the tubular-shaped inner pipe provided inside the outer pipe. Thus, the double-wall rectangular electrical conduit excels in wire passing performance, and it is easy to wire optical fiber cables therethrough. Furthermore, since the inner pipe is fusion bonded with the small diameter parts of the outer pipe, the rigidity of the electrical conduit is higher than that of an electrical conduit formed of only an outer pipe, and thus an electrical conduit that can be laid much deeper underground can be obtained.

The present invention can provide an electrical conduit, a connection structure for electrical conduits, a bell block, a method for connecting electrical conduits, a method for connecting an electrical conduit and a bell block, a pipe coupling, a ring member, a double-wall conduit of which an outer conduit is the electrical conduit, a connection structure for the double-wall electrical conduits, and a conduit line using the connection structure.

BRIEF DESCRIPTION OF DRAWINGS

FIG. 1 is an exploded perspective view of a male fitting part 1a.
FIG. 2 is a side view of the male fitting part 1a.
FIG. 3 is a cross sectional view of the male fitting part 1a.
FIG. 5 is a view showing a method for connecting the male fitting part 1a and a female fitting part 30a.
FIG. 6A is a view showing the method for connecting the male fitting part 1a and the female fitting part 30a.
FIG. 6B is a view showing the method for connecting the male fitting part 1a and the female fitting part 30a.
FIG. 7A is a view showing the method for connecting the male fitting part 1a and the female fitting part 30a.
FIG. 7B is a view showing a connecting structure 10 for the male fitting part 1a and the female fitting part 30a.
FIG. 8A is a perspective view of a ring member 5a.
FIG. 8B is an enlarged view of joint parts 24a and 24b.
FIG. 9A is a view corresponding to FIG. 7A and is a view showing another method for connecting the male fitting part 1a and the female fitting part 30a.
FIG. 9B is a view showing another method for connecting the male fitting part 1a and the female fitting part 30a.
FIG. 10A is a view showing another method for connecting the male fitting part 1a and the female fitting part 30a.
FIG. 10B is a view showing another connecting structure 10 of the male fitting part 1a and the female fitting part 30a.
FIG. 11 is a view showing an electrical conduit 40a.
FIG. 12A is a view showing an electrical conduit 40b.
FIG. 12B is an enlarged cross sectional view of N section in FIG. 12A.
FIG. 16 is a view showing a connection structure 10a for the handhole 55 and the electrical conduit 40b.
FIG. 17 is a view showing a bell block 50a.
FIG. 18A is a view showing a pipe coupling 60a.
FIG. 19A is a view showing a pipe coupling 60c.
FIG. 19B is a view showing a pipe coupling 60d.
FIG. 20A is a view showing a cross section of a second click part 23 of the ring member 5.
FIG. 20B is a view showing a cross section of the second click part 23 of the ring member 5.

FIG. 29A is a cross sectional view taken along K-K line in FIG. 28A.

DESCRIPTION OF SOME EMBODIMENTS

Figure 2:
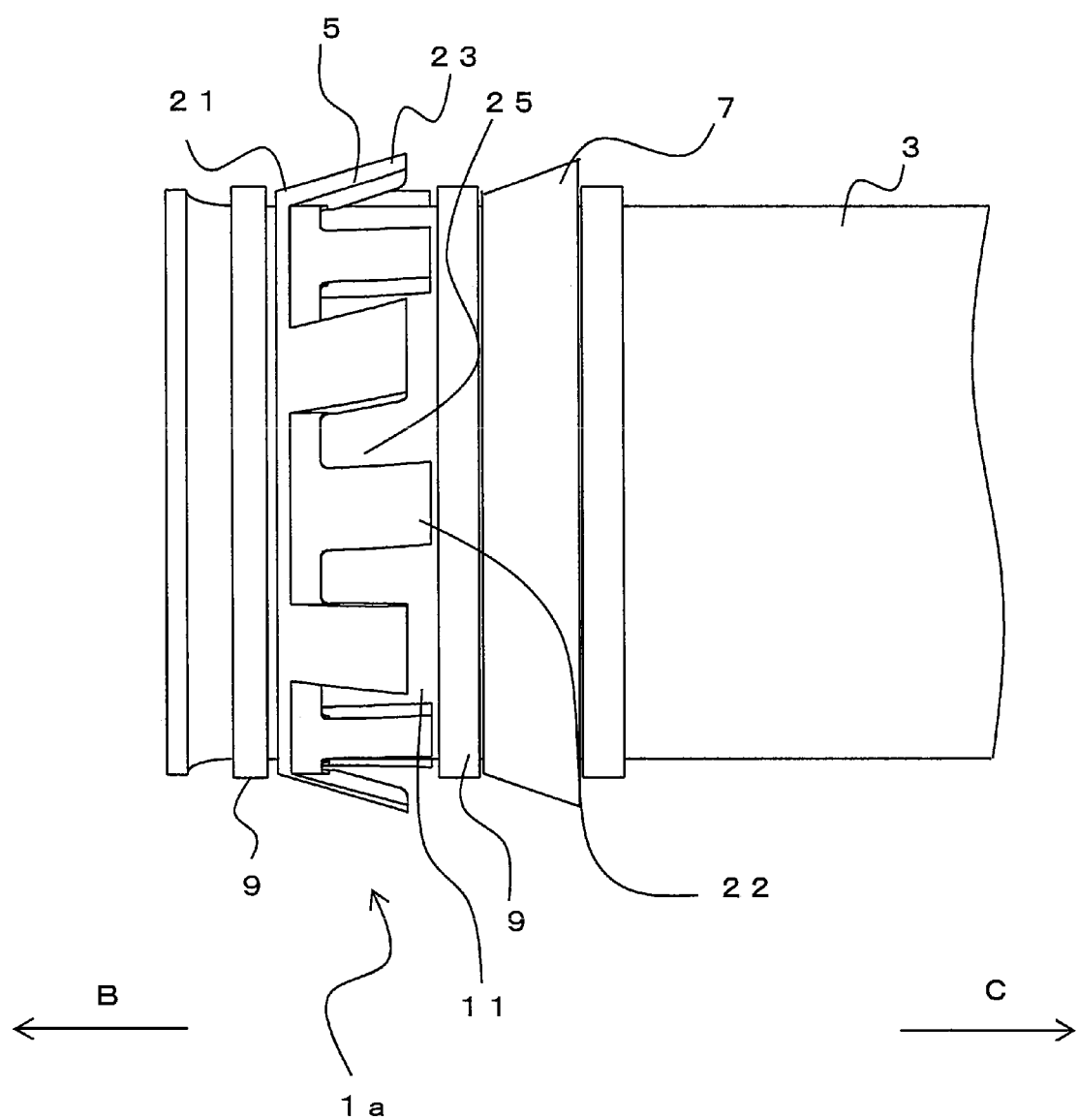
Figure 3:
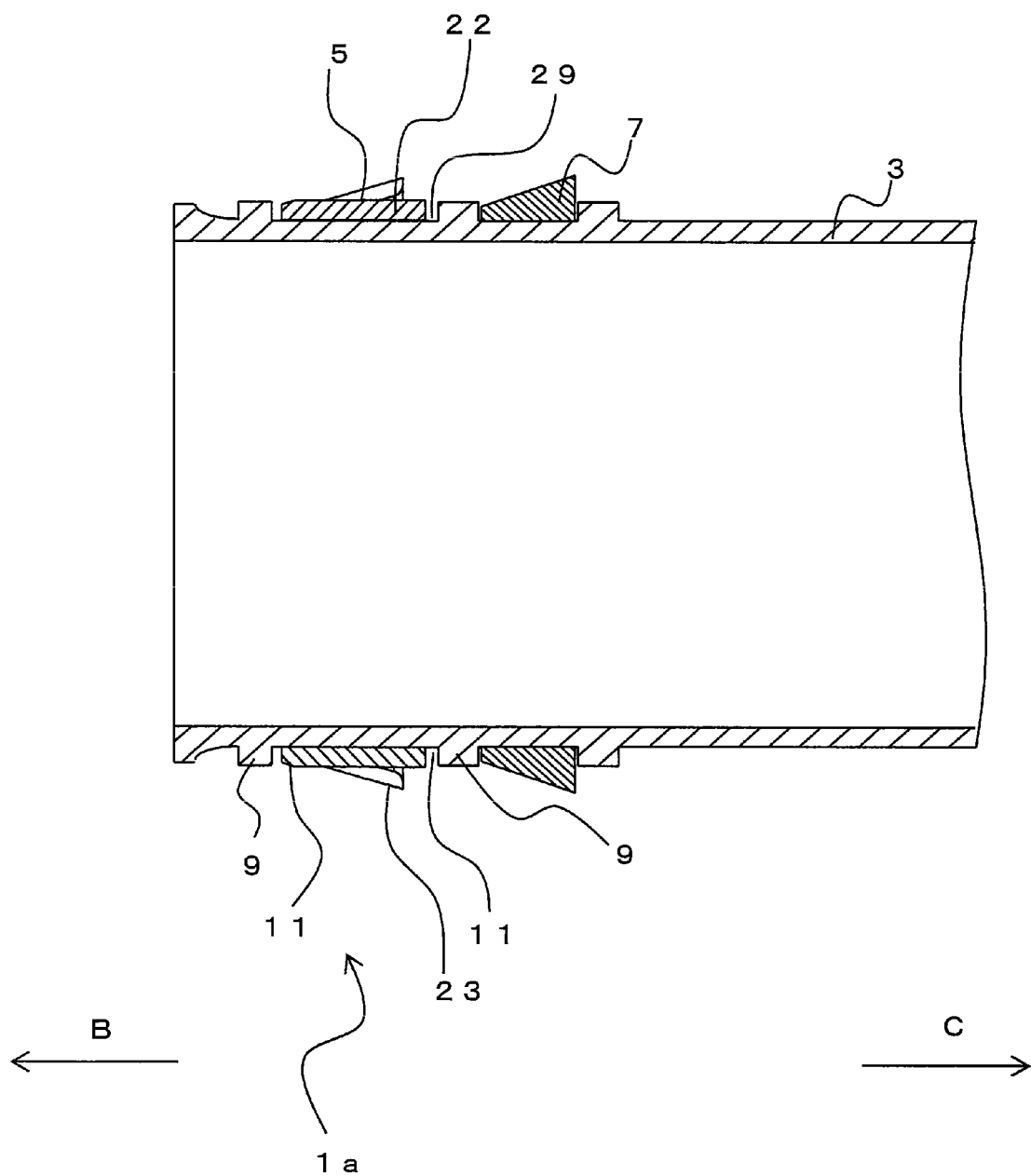
Figure 1:
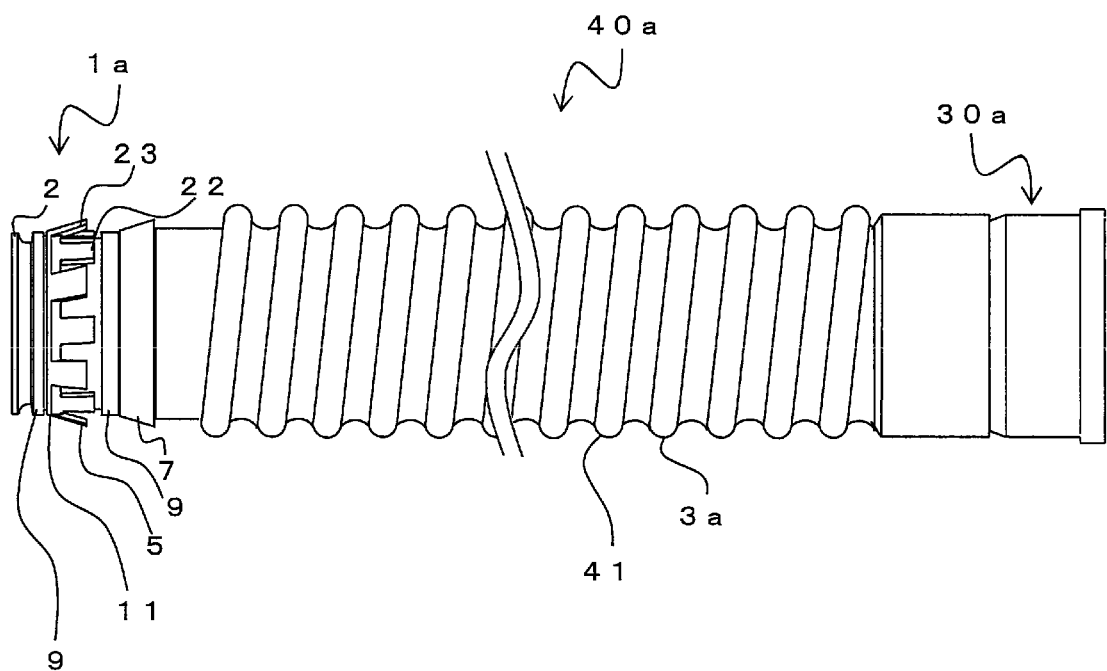

Hereinafter, an embodiment of the present invention will be described with reference to the accompanying drawings. FIG. 1 is an exploded perspective view of a male fitting part 1a and FIG. 2 is a side view of the male fitting part 1a. Also, FIG. 3 is a cross sectional view of the male fitting part 1a taken in its pipe axial direction. The male fitting part 1a mainly includes a pipe body 3, a ring member 5, a water sealing member 7, and so on. The male fitting member 1a is formed on an outer periphery part of the pipe body 3 in a vicinity of an end part thereof.

The pipe body 3 is either a flexible electrical conduit, a pipe coupling body, or a bell block, for example, and its form is not limited as long as electrical cables or the like can be inserted therethrough. The details of its form will be described below. Also, although material for the pipe body 3 does not matter, it is preferable that the pipe body 3 is made of resin, for example, preferably polyethylene.

High density polyethylene (HDPE) is a crystalline polyethylene thermoplastic made of repeated units of ethylene combined linearly with little branching, and it is called as a hard polyethylene for its relatively hard nature. HDPE is defined in the former JIS K6748: 1995 as a polyethylene whose density is 0.942 or higher. A copolymer of HDPE is a crystalline resin normally having one to five branchings to a thousand ethylene monomers. The degree of crystallization of a homopolymer of HDPE with a specific gravity of 0.97 is higher than 75%, and its rigidity, tensile strength, and impact strength are high. Also, HDPE is cold resistant: its mechanical properties can be maintained to a temperature as low as −80° C. Also, although HDPE is inappropriate for being imprinted or stuck together due to less polarization within molecules, it is a good electrical insulation property.

At an end part of the pipe body 3, a locking wall 9, a ring member mounting position 11, the locking wall 9, and a water sealing member holder 27 are formed in sequence from a tip end. In descriptions hereinafter, a side of the pipe body 3 where there is an opening is defined as a tip end side (a direction shown by an arrow B in FIG. 2 and FIG. 3), and a side opposite thereto (a direction shown by an arrow C in FIG. 2 and FIG. 3) is defined as an inner side of the pipe axial direction of the pipe body 3. The locking wall 9 is a part having a larger diameter compared to its surroundings. A pair of the locking walls 9 are disposed separately in a pipe axial direction to restrict a range of motion of a ring member 5, which will be described later.

A region between the pair of the locking walls 9 becomes the ring member mounting position 11 on which the ring member 5, which will be described below, is to be disposed. That is, the male fitting part 1a includes the pair of locking walls 9 that are disposed separately in the pipe axial direction and the ring member 5 that is disposed on the ring member mounting position 11 between the locking walls 9. The ring member mounting position 11 is formed as a straight pipe parallel to the pipe axial direction, connecting the locking walls 9 one another. A reduced diameter part 21 is disposed in the region between the pair of the locking walls on the tip end side of the pipe body 3, and first click parts 22 and second click parts 23 are disposed in the region between the pair of the locking walls 9 on the inner side of the pipe axial direction of the pipe body 3. Outer diameters of the reduced diameter part 21 and the first click parts 22 are smaller than the outer diameter of the locking wall 9. An outer diameter of the second click parts 23 is larger than the outer diameter of the locking wall 9 and thus the second click parts 23 protrude outward of the locking wall 9 in a diameter direction.

A water sealing member holder 27 is provided on the inner side of the pipe axial direction beyond the ring member mounting position 11. As shown in FIG. 3, the water sealing member holder 27 is a groove a cross section of which is substantially rectangular, and the water sealing member holder 27 holds the water sealing member 7. That is, the water sealing member 7 is provided on the inner side farther beyond the locking wall 9 on the inner side of the pipe axial direction of the male fitting part 1a. The water sealing member 7 is a ring shaped member and an inner diameter of the water sealing member 7 is smaller than an outer diameter of the water sealing holder 27 and thus an inner surface of the water sealing member 7 closely contacts an outer surface of the water sealing member holder 27.

An internal circumference part of a cross section of the water sealing member 7 is in a straight form (having an approximately same diameter in the pipe axial direction) and an outer circumference part is formed so as to have a slope part from one end of the pipe axial direction to the other. As shown in FIG. 3, a maximum outer diameter part of the water sealing member 7 is disposed facing toward the inner side of the pipe axial direction of the pipe body 3, in which the outer diameter of the said part is larger than a maximum diameter of the pipe body 3 of the male fitting part 1a and thus the water sealing member 7 protrudes outward in a diameter direction. The maximum diameter of the slope part from the one end of the pipe axial direction to the other may be formed at the middle of the tip end side and the most inner side, instead of at the most inner side of the pipe axial direction of the water sealing member.

Although FIG. 3 shows an example of the water sealing member 7 having the slope part formed on the outer circumference, the present invention is not limited thereto. For example, as will be described below, when the water sealing member 7 is formed of a water expansion member, the outer periphery surface of the water sealing member 7 may be formed in a flat shape creating a clearance between the water sealing member 7 and the female fitting part, without providing the slope part. This is because the water expansion member includes a hydrophilic carboxyl group and takes a lot of water molecules into its network structure to form a gel structure, and thus the water expansion member swells and expands in volume to stop water.

The water sealing member 7 is made of rubber or a water expansion member, for example. If the water sealing member 7 is made of rubber, ethylene propylene rubber is applicable, for example. Ethylene propylene rubber is a type of synthetic rubber obtained by copolymerization of ethylene and propylene. To allow vulcanization by a sulfur compound, ethylene propylene rubber is often used in a form of an EPDM (ethylene propylene diene monomer) rubber, which is a copolymer of ethylene propylene rubber and a little amount of diene monomer. Other than that, rubber such as SBR, CR, NBR, ACM rubber or EPDM/PP dynamically crosslinked elastomer may be used.

If the water sealing member 7 is made of water expansion member, non-woven cloth formed of polyester fiber and sodium polyacrylate fiber may be used, for example. In this case, a ratio of polyester fiber and sodium polyacrylate fiber is such that, if the total of both is 100% by mass, an amount of sodium polyacrylate is between 30% and 70%, preferably between 50 to 70% by mass.

Here, it is preferable to add a binder resin, which is a resin having a low melting point, to the water expansion non-woven cloth. The ratio of the binder resin is preferably in a range between 1 and 10%, more preferably between 1 and 5%, of the total of both the polyester fiber and the sodium polyacrylate fiber. As a binder resin, for example, polyester with low melting point can be used and the non-woven cloth can be formed by using a needle punching method.

(Working Example of a Ring Member Without Joint Parts)

The ring member 5 is disposed on the ring member mounting position 11. The ring member 5 is substantially C shaped with an opening 19 being opened at end parts of a circumferential direction. One of an end parts of the ring member 5 in the pipe axial direction is the reduced diameter part 21, which has an outer diameter smaller than the other parts. The plurality of the first click parts 22 and the second click parts 23 are provided toward the other end part of the ring member 5. The plurality of the first click parts 22 and the second click parts 23 are provided side by side separately with slits 25 therebetween in the circumferential direction to the reduced diameter part 21. Also, the outer diameters of the plurality of the second click parts 23 increases gradually from the reduced diameter part 21 toward the tip ends.

Figure 4:
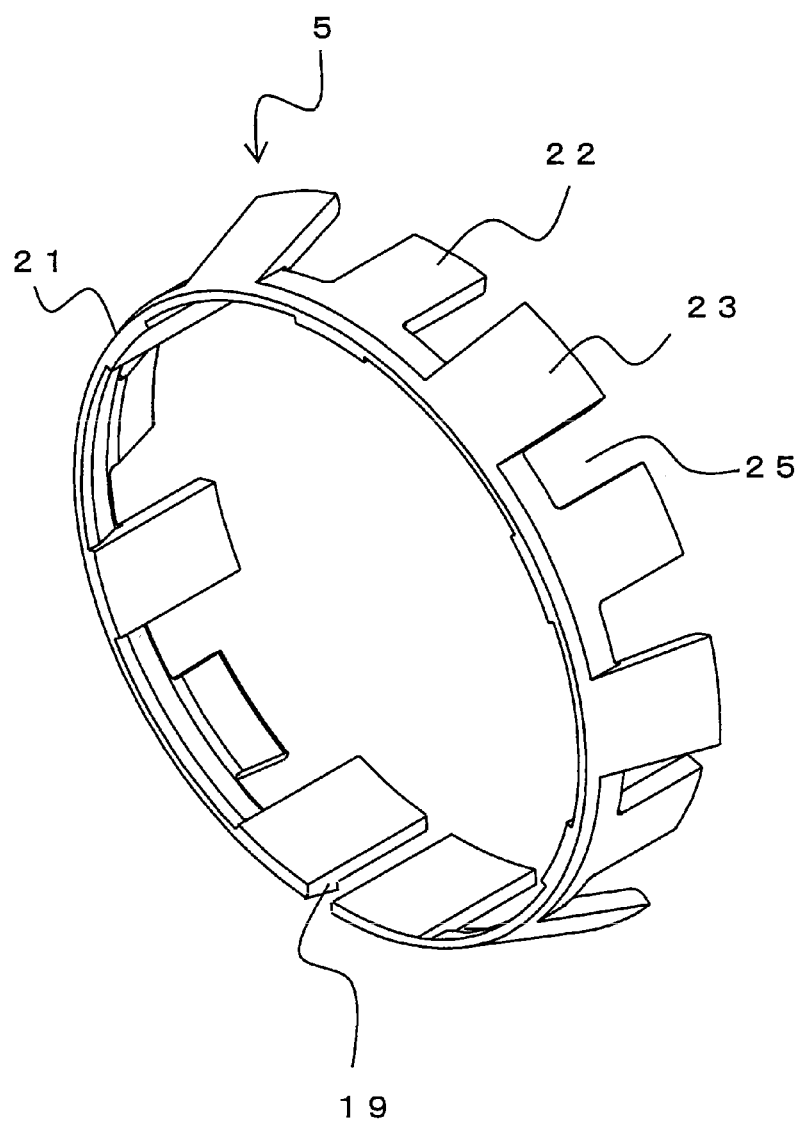
FIG. 4 is a perspective view of a ring member 5.

FIG. 4 is a perspective view of the ring member 5. The ring member 5 includes the first click parts 22 that serve as a slide guide and the second click parts 23 that serve as locking clicks. That is, the first click parts 22 serve as a slide guide that is formed substantially parallel to the pipe axial direction from the reduced diameter part 21, and the second click part 23 serves as a locking click having a tapered part whose outer diameter expands from the reduced diameter part 21 toward the tip end. The ring member 5 shown in the drawing has no joint parts at the end parts thereof, which are separated by the opening 19.

Although the first click part 22 is in a substantially rectangular shape in the example shown in the drawing, the shape of the first click part 22 is not limited to the rectangular shape. For example, the first click part 22 formed as a rectangular or a trapezoid shaped surface is applicable.

As described above, the diameter of the outer surface of the ring member 5 gradually increases from the reduced diameter part 21 toward the end parts of the second click parts 23. That is, on a cross section taken in the pipe axial direction, the ring member 5 has a tapered part whose diameter decreases from the tip end of the second click part 23 toward the reduced diameter part 21. The ring member 5 is in either a sharp wedge shape, in which the thickness decreases from the tip end of the second click part 23 toward the reduced diameter part 21, or a wedge shape, in which the thickness of the tip end of the click part is larger than the thickness of the reduced diameter part.

As shown in FIG. 3, in the ring member 5 used for connecting electrical conduits, the tip ends of the first click parts 22 and the second click parts 23 are positioned on the inner side of the pipe axial direction of the pipe body 3, and the reduced diameter part 21 is disposed so as to face toward the tip end side of the pipe body 3. Since the inner diameter of the ring member 5 is smaller than the outer diameter of the locking wall 9, the ring member 5 is held between the locking walls 9.

Any of ABS resin, PP resin, rigid polyvinyl chloride, PC resin mixed with any of the above, or polymer alloy is applicable for the ring member 5, for example, and it is preferable to apply ABS resin (acrylonitrile butadiene styrene copolymer).

ABS resin is a thermoplastic resin whose normal temperature is between 70 and 100° C. and it is a resin that excels in balanced mechanical properties such as rigidness, toughness, processability, impact resistance, and bending fatigue strength. Adjustment of mixing ratio of materials enables the above balance of properties. Also, ABS resin is excellent in imprint properties and has a good flexibility so that thin products can be formed easily with a beautiful surface. As for mechanical properties of ABS resin, for example, its tensile strength is approximately 39 MPa, and its bending elastic modulus is approximately 64 MPa.

A grafting method, for example, is known as a method for manufacturing ABS resin. An emulsion grafting method includes steps of copolymerization of acrylonitrile, latex, and styrene together with a catalyst and an emulsifier in a polymerizer, removing moisture by using a centrifugal separator, and forming pellets using an extruding machine. A bulk polymerization method includes steps of copolymerization of the components using a polymerizer tank, removing unreacted monomers, and forming pellets using an extruding machine. Alternatively, a polymer blend method includes steps of compounding ABS resin added with rubber and additive agent by a mixer, and forming pellets by using an extruding machine. A method of manufacturing ABS resin with extremely high ratio of butadiene by the grafting method and then compounding thereof with ABS resin is one of the polymer blend methods.

As shown in FIG. 3, a length of the ring member 5 in the pipe axial direction is less than a length of the ring member mounting position 11. Thus, when the ring member 5 is disposed on the ring member mounting position 11, there is a clearance 29 between the ring member 5 and at least one of the locking walls 9. For this reason, the ring member 5 is guided by the first click parts 22, which serve as the slide guide for the ring member 5, and can slide in the pipe axial direction over the ring member mounting position 11, which is formed parallel to the pipe axial direction connecting the locking walls 9 with one another.

Thus, the reduced diameter part 21, which is a side end part of the ring member 5, is attached so as to be positioned on the ring member mounting position 11, and the reduced diameter part 21 moves and slides over the ring member mounting position 11. At this time, the first click parts 22, which serve as the slide guide, are in contact with the locking wall 9, serving as a stopper that restricts the movement of the ring member 5.

(Working Example of a Ring Member Having an Opening)

Figure 5:
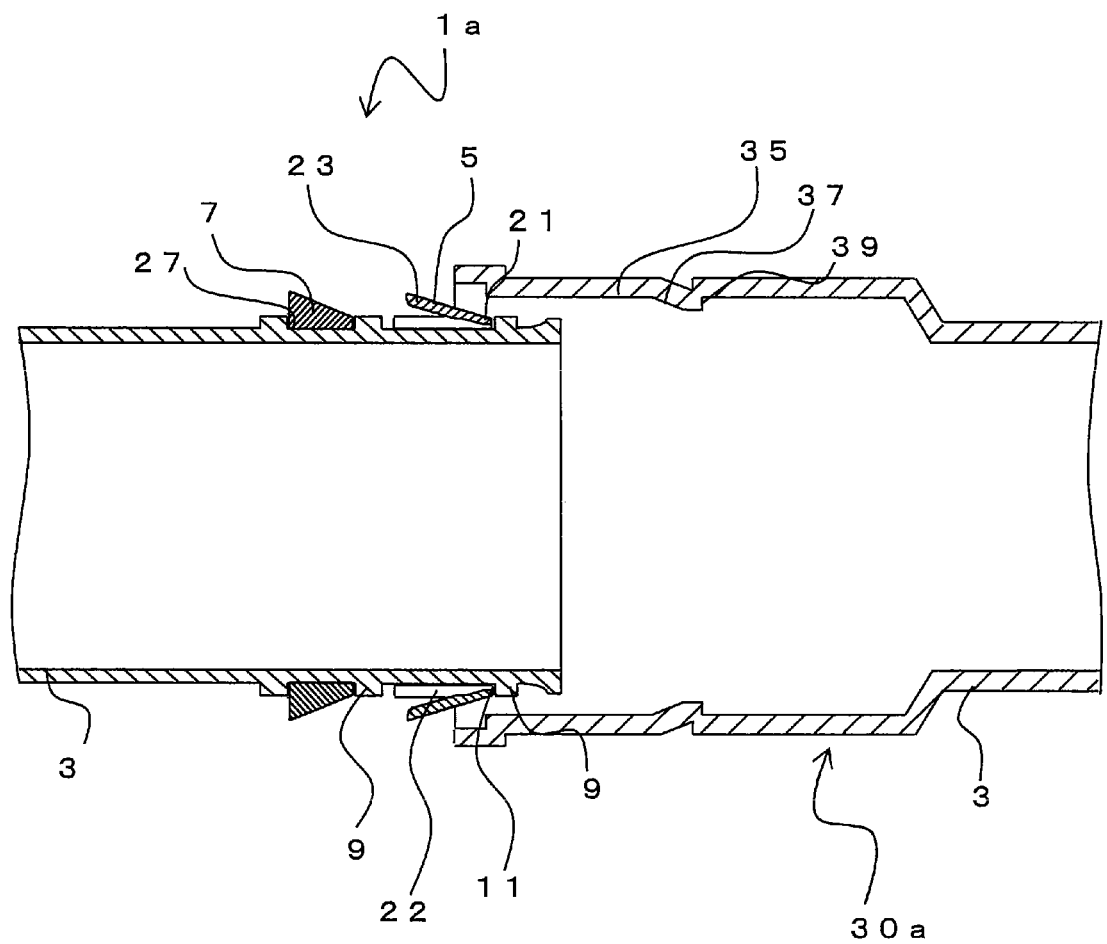

Next, the male fitting part 1a and a method for connecting the same with a female fitting part that can be fitted thereto will be described. FIG. 5 is a view showing a state in which the male fitting part 1a and female fitting part 30a are disposed facing each other and the male fitting part 1a is inserted into the female fitting part 30a. First, as shown in FIG. 5, a tip end of the male fitting part 1a is inserted into the female fitting part 30a.

The female fitting part 30a is formed on an inner circumference part of the tip end side of the pipe body 3. The female fitting part 30a includes a cylindrical part 35, a slope part 37 whose diameter gradually decreases from the cylindrical part 35, and a ring fitting part 39 whose diameter gradually increases from a minimum inner diameter part of the slope part 37.

FIG. 6A to FIG. 7B are cross sectional views showing each step of the method for connecting the electrical conduits by inserting the male fitting part 1a into the female fitting part 30a, in which the ring member 5 having an opening is disposed on an outer circumference of the ring member mounting position 11 of the male fitting part 1a. In this case, for example, the second click parts 23 are disposed facing each other symmetrically at a center axis of the pipe body, and, in each of the cross sectional views, the first click parts 22 and the second click parts 23 of the ring member 5 are shown symmetrically on an upper side and a lower side of the male fitting part 1a.

When the male fitting part 1a is pushed into the female fitting part 30a from the state shown in FIG. 6A (shown by an arrow F in the drawing), a tapered part 33 on the outer circumference of the ring member 5 disposed on the ring member mounting position 11 contacts the slope part 37 of the female fitting part 30a. When the male fitting part 1a is further pushed inside the female fitting part 30a, as shown in FIG. 6B, the tip ends of the first click parts 22 of the ring member 5 can slide and move to be in contact with the locking wall 9 at an end part of the ring member mounting position 11 on the inner side of the pipe axial direction of the male fitting part 1 (an arrow G in the drawing).

As shown in FIG. 7A, if the male fitting part 1a is further inserted into the female fitting part 30a from this state (the arrow F in the drawing), the end part of the second click part 23 passes beyond the slope part 37 of the female fitting part 30a. At this time, the second click part 23 which has been elastically deformed is now released from a pressure from the slope part 37 and restores into an original diameter and expands (an arrow J in the drawing). This makes the second click part 23 to be accommodated into the ring fitting part 39 that is formed on the inner side of the pipe axial direction of the slope part 37 of the female fitting part 3a.

FIG. 7B is a view showing a connection structure 10 for the male fitting member 1a connected with the female fitting member 30a, which can be obtained in this way. In this state, the tip end of the second click part 23 fits with the ring fitting part 39 of the female fitting part 30a. Thus, if the female fitting member 30a is pulled out (an arrow K in the drawing), the locking wall 9 on the reduced diameter side of the ring member 5 restricts movement of the ring member 5 and it is impossible to pull out the male fitting member 1a from the female fitting member 30a.

In this state, at least a part of the outer periphery surface of the water sealing member 7 is in close contact with an inner surface of the cylindrical member 35 of the female fitting member 30a. That is, the water sealing member 7 can fill a gap between the male fitting member 1a and the female fitting member 30a. This can prevent water entering into the connection structure 10 from outside.

Also, since the water sealing member 7 is disposed on the inner side of the pipe axial direction farther with respect to the ring member 5, when the male fitting member 1a is pushed into the female fitting member 30a, the male fitting member 1a does not receive resistance from the water sealing member 7 until the female fitting member 30a is in contact with the water sealing member 7. Thus, a thrusting resistance of the male fitting member 1a to the female fitting member 30a can be reduced.

The male fitting member 1a and the female fitting member 30a are formed with materials having sufficient strengths, respectively, and then both are fitted together to be tested on a tension tester and applied with a load thereby to find a pulling out load. As a result, the pulling out load satisfied 100 kg. Thus, it was confirmed that the pulling out force of the coupling part had a sufficient pulling out force.

Figure 8:
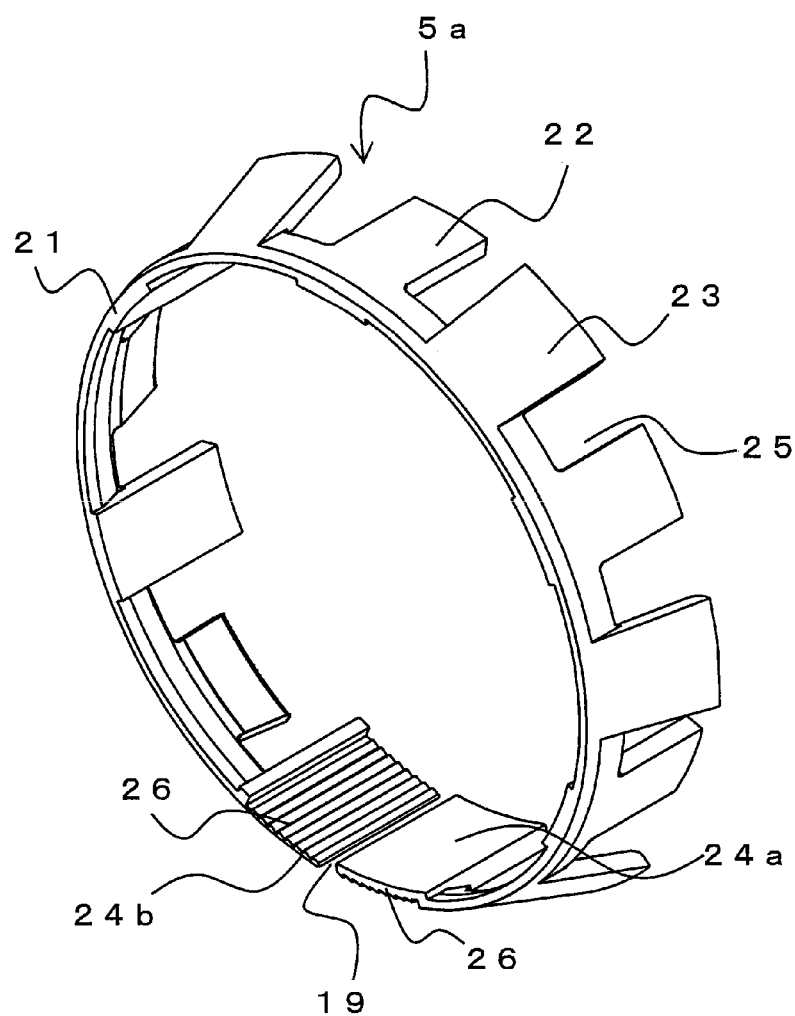
Figure 8:
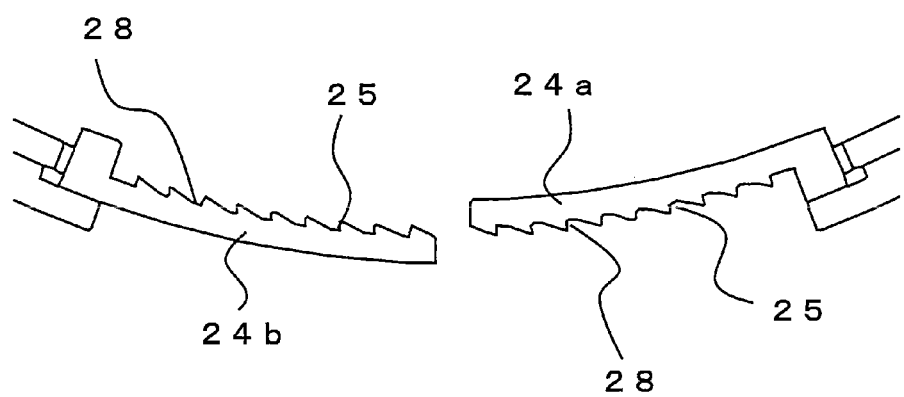

Although an example in which the ring member 5 having the opening 19 is described in the present embodiment, the present invention is not limited thereto. FIG. 8A is a perspective view showing a ring member 5a. The ring member 5a has almost the same structure as the ring member 5 except that the ring member 5a has joint parts 24a and 24b, which can be connected to one another, at both ends of its circumferential direction.

(An Embodiment Using a Ring-Shaped Ring Member Having Joint Parts)

The ring member 5a includes both the first clicking parts 22 and the second clicking parts 23, and, furthermore, the joint parts 24a and 24b are formed at both ends of the circumferential direction of the ring member 5a.

FIG. 8B is an enlarged view of the joint parts 24a and 24b. Each of the joint parts 24a and 24b has a fitting part 26 that is formed of saw blade shaped grooves. Fitting the fitting parts 26 at both ends of the ring member 5a and connecting the joint parts 24a and 24b together form the ring member 5a into a ring shape. Thus, the ring-shaped ring member 5a can be disposed on the ring member mounting position 11.

Figure 6:
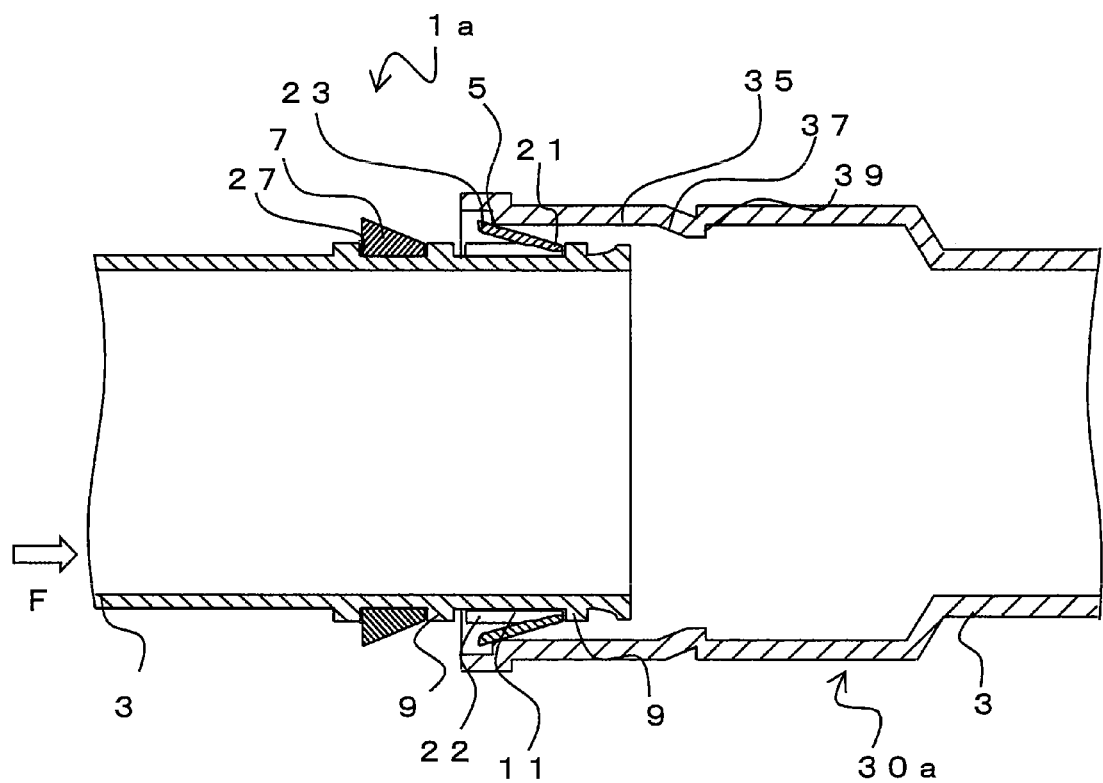
Figure 6:
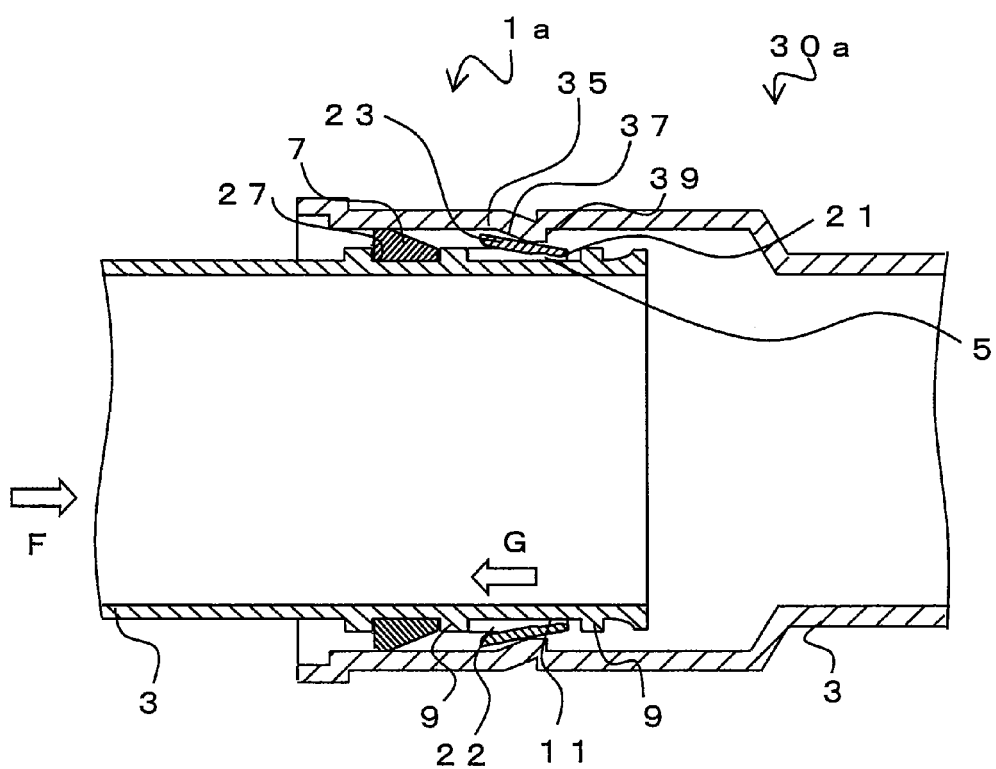
Figure 7:
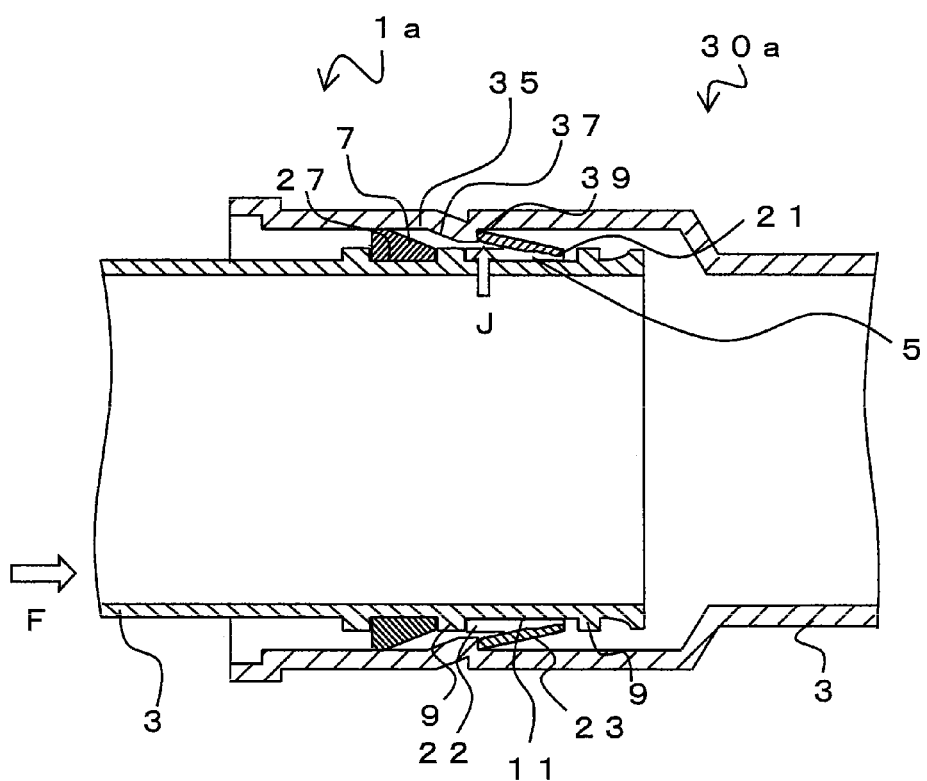
Figure 7:
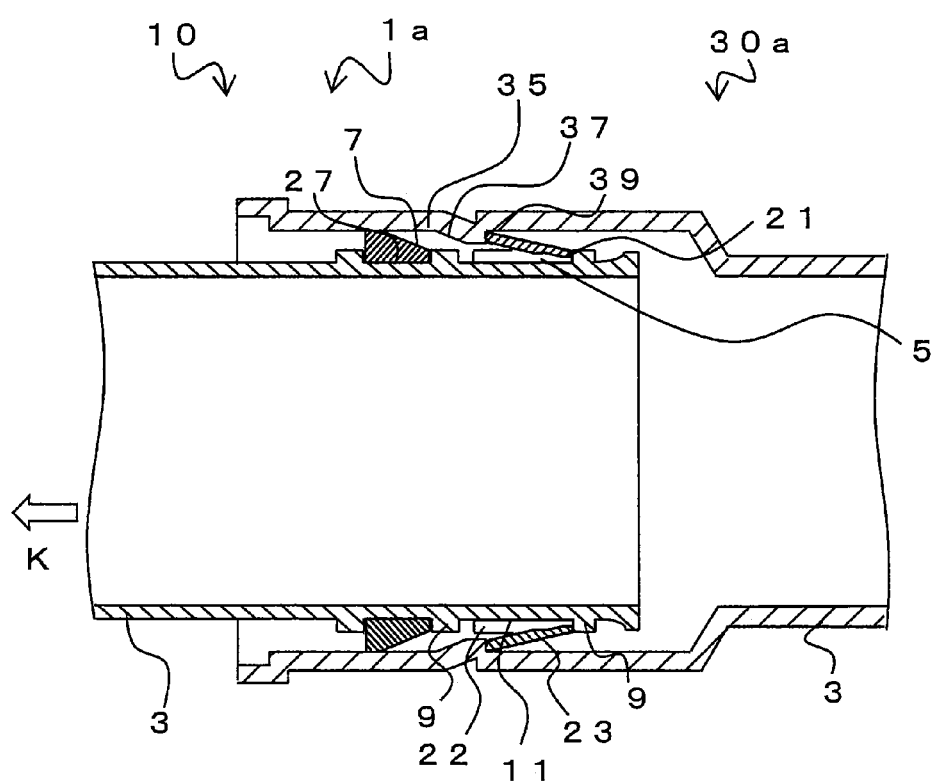
Figure 9:
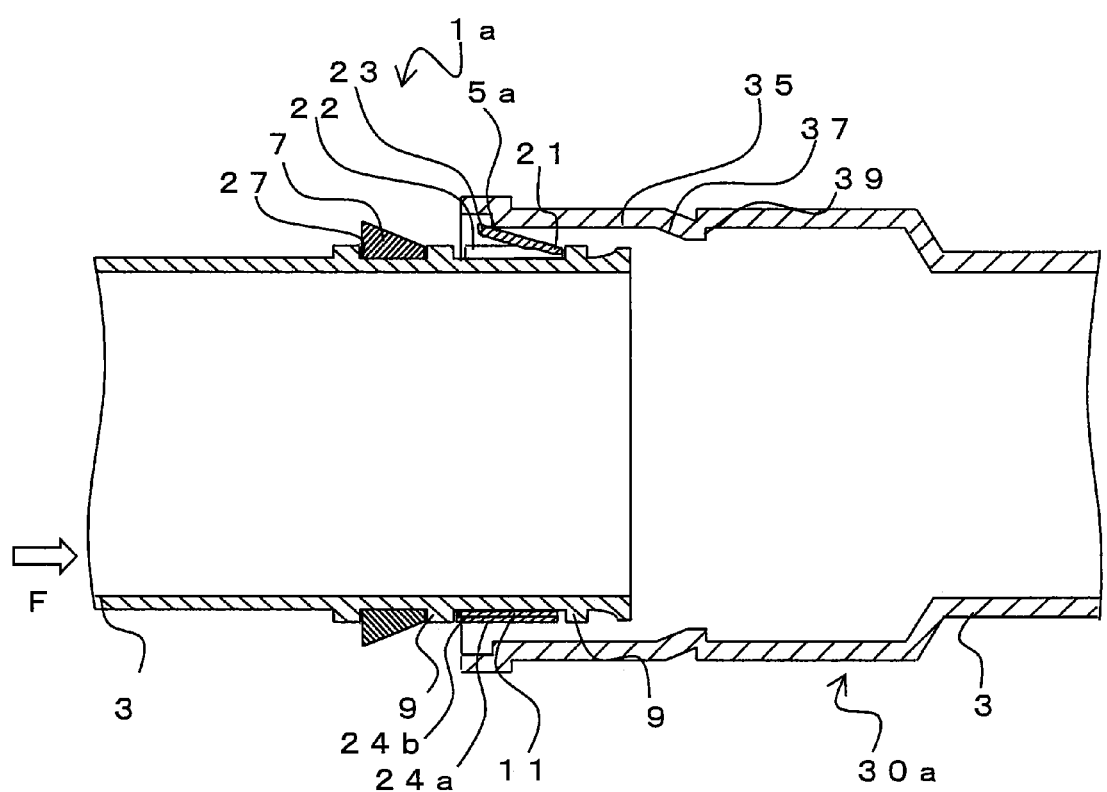
Figure 9:
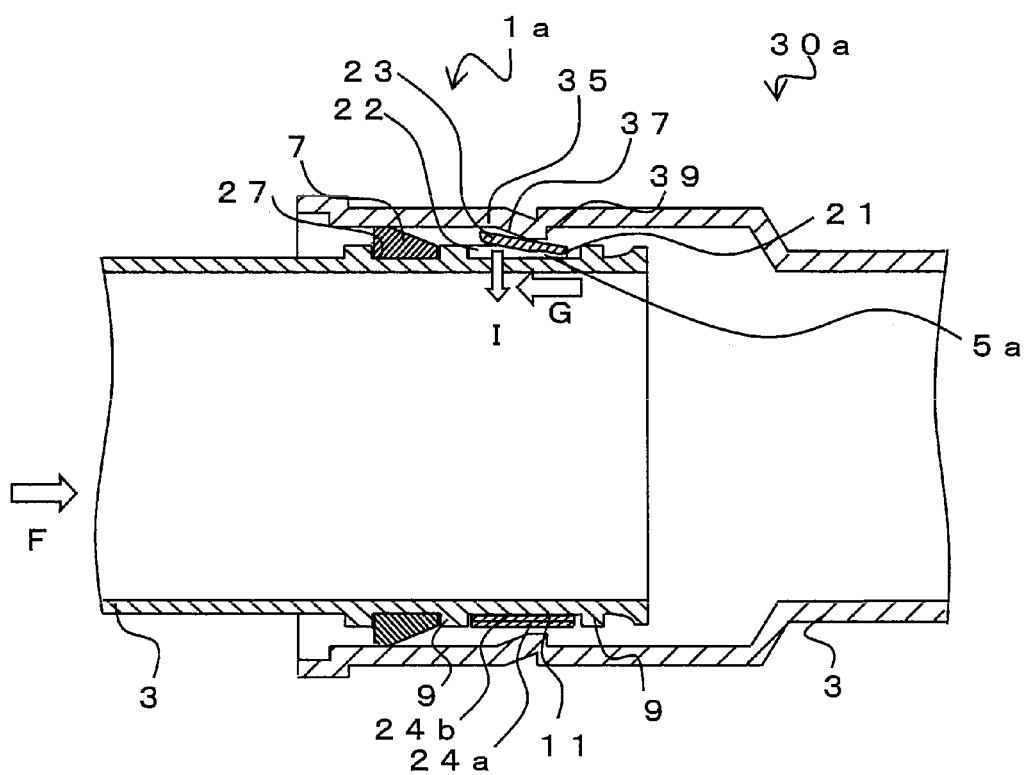
Figure 10A:
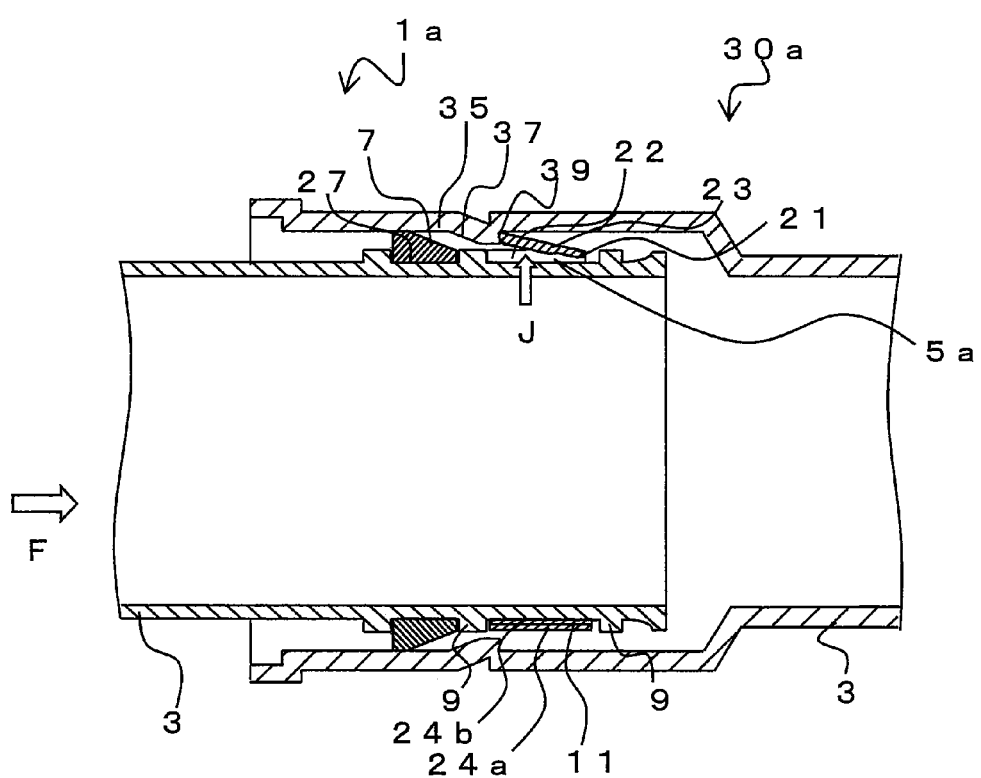
Figure 10B:
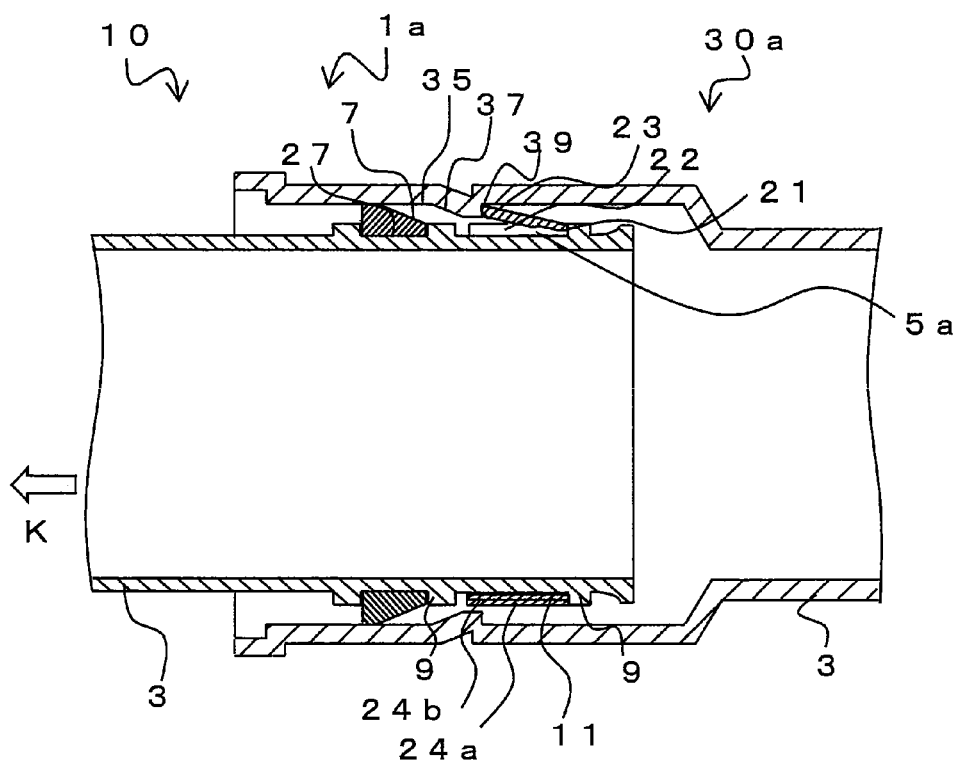

FIG. 9A to FIG. 10B are cross sectional views showing steps of a method for connecting the male fitting part 1a with the female fitting part 30a, in which the joint parts of the ring member 5 are connected and disposed circularly on the outer circumference of the male fitting part 1a which is then inserted into the female fitting part 30a. In each of the cross sectional views, the first clicking part 22 and the second clicking part 23 of the ring member 5a are shown on an upper side of the male fitting part 1a and the joint parts 24a and 24b of the ring member 5a are shown on a lower side of the male fitting part 1a. Here, FIG. 9A and FIG. 9B correspond to FIG. 6A and FIG. 6B showing an embodiment without the joint parts and FIG. 10A and FIG. 10B correspond to FIG. 7A and FIG. 7B showing the embodiment without the joint parts. Here, the structure of the female fitting part shown in FIG. 9 and FIG. 10 is the same as in the FIG. 6 and FIG. 7.

First, before connecting electrical conduits, the joint parts 24a and 24b at both ends of the circumference direction of the ring member 5a are connected to each other and the ring member 5a is formed so that the ring member 5a circularly surrounds a periphery of the ring member mounting position 11. Next, in a case where the ring member 5a is used, the male fitting part 1a is inserted into the female fitting part 30a similarly as the case in which the ring member 5 is used and, as shown in FIG. 9A, the tapered part 33 of the ring member 5a contacts the slope part 37 of the female fitting part 30a.

When the male fitting part 1a is further inserted into the female fitting part 30a, the ring member 5a slides and moves within the ring member mounting position 11 guided by the first click parts 22 until the tip end of the second licking part 23 is in contact with the locking wall 9. At this time, since both ends of the ring member 5a are fixed to each other by the joint parts 24a and 24b, the ring member 5a can more stably slide and move over the ring member mounting position 11 of the male fitting member 1a than in a case in which the ring member 5 without joint parts at both ends thereof is used. Also, at this time, even if the male fitting part 1a is inserted slantingly into the female fitting member 30a, the ring member 5a does not come off.

Also, as shown in FIG. 9B, when the male fitting part 1a is further pushed into the female fitting part 30a from this state (the arrow F in the drawing), the tip ends of the first click parts 22 of the ring member 5a can slide and move so as to be in contact with the locking wall at an end part of the ring member mounting position 11 on the inner side of the pipe axial direction of the male fitting part 1a (the arrow G in the drawing). Also, in FIG. 9B, with the contacting part between the ring member mounting position 11 of the male fitting part 1a and an inner surface of the reduced diameter part 21 of the ring member 5 a as a supporting point, the second click part 23 can be elastically deformed so that the second click part 23 declines toward the pipe axial direction and its diameter can be reduced (an arrow I in the drawing).

As shown in FIG. 10A, when the male fitting part 1a is further pushed into the female fitting part 30a from this state (the arrow F in the drawing), an end part of the second click part 23 passes beyond the slope part 37 of the female fitting part 30a. At this time, the second click part 23 which has been elastically deformed is now released from the pressure from the slope part 37 and restores into the original diameter and expands (the arrow J in the drawing). This makes the second click parts 23 to be accommodated into the ring fitting part 39 that is formed on the inner side of the pipe axial direction of the slope part 37 of the female fitting part 30a.

FIG. 10B shows the connection structure 10 for the male fitting part 1a connected with the female fitting part 30a, which is obtained by carrying out the above steps in sequence. In this state, the tip end of the second click part 23 fits with the ring fitting part 39 of the female fitting part 30a. Thus, when the female fitting part 30a is pulled out (opposite to the arrow K in the drawing), the locking wall 9 on the reduced diameter side of the ring member 5a restricts movement of the ring member 5a and it is impossible to pull out the male fitting member 1a from the female fitting member 30a. As above, the same effects as the ring member 5 can be obtained by using the ring member 5a having the joint parts 24a and 24 b at the both ends thereof. Also, in the ring member 5a, a connecting position of the joint parts 24a and 24b can be adjusted to adjust a clearance required for sliding movement or to absorb manufacturing dispersion of a pipe diameter of a large-diameter electrical conduit or the like, and thus the ring member 5a can move and slide over the ring member mounting position 11 more smoothly.

Next, an electrical conduit including the male fitting part 1a will be described. FIG. 11 is a view showing an electrical conduit 40a. The electrical conduit 40a has fitting structures at both ends thereof and includes a pipe body 3a, the male fitting part 1a that is formed on one end of the pipe body 3a, and the female fitting member 30a that is formed on another end of the pipe body 3a and has a shape that can be fitted with the male fitting member 1a.

The electrical conduit 40a includes continuous predetermined-pitched spiral wavy forms on an outer periphery surface of the pipe body 3a between the male fitting part 1a and the female fitting part 30a. When such the electrical conduit 40a is used, a plurality of the electrical conduits 40a can be connected with one another to be used. For example, a method for connecting the electrical conduits 40a is similar to the method for connecting the male fitting part 1a and the female fitting part 30 described above. That is, a connection structure for electrical conduits including a plurality of the electrical conduits 40a, in which the male fitting structure 1a of a first electrical conduit 40a can be connected with the female fitting part 30a of a second electrical conduit 40a, can be obtained only by inserting the male fitting part 1a of the first electrical conduit 40a into the female fitting part 30a of the second electrical conduit 40a. In this way, screwing of spiral shaped couplings or the like is unnecessary for connecting the electrical conduits 40a and thus construction is easy.

A shape of the pipe body is not limited to the above. FIG. 12A is a view showing an electrical conduit 40b. Also, FIG. 12B is an enlarged cross sectional view of a vicinity of an N section in FIG. 12A. The electrical conduit 40b is different from the electrical conduit 40a in that a pipe body 3b is applied instead of the pipe body 3a.

In the electrical conduit 40b shown in FIG. 12A, mountain parts 43 (large diameter parts) and valley parts 45 (small diameter parts) are alternately formed on an outer periphery surface of the pipe body 3b between the male fitting part 1a and the female fitting part 30a. The mountain part 43 has a substantially square cross section and the valley part 45 has a circular cross section. A diameter (a length of one side) of the mountain part 43 is larger than an outer diameter of the valley part 45.

Providing substantially square mountain parts 43 alternately to the valley parts 45 allows the electrical conduits 40b to be stably disposed when being stacked. A maximum outer diameter of the female fitting part 30a is smaller than the diameter (the length of one side) of the mountain part 43. Thus, when viewed from an end part on the side of the female fitting part 30a, the female fitting part 30a does not protrude beyond an outer periphery of the mountain part 43. Thus, when the electrical conduits 40a are stacked with the mountain parts 43 being in contact with each other, the female fitting part 30a does not interfere with the adjacent electrical conduits 40b.

Also, as shown in FIG. 12B, a pair of protrusion parts 47 are formed at a substantially center of the valley part 45 in the pipe axial direction of the pipe body 3b. Also, a flat part 49 is formed between the protrusion parts 47 on a cross section in the pipe axial direction of the pipe body 3b. Forming a groove-like shape between the protrusion parts 47 allows a worker to use a cutting tool along the groove, enabling the worker to cut the pipe body 3 easily. Also, cutting position is unlikely to shift and the pipe body 3b can be cut with accuracy. Needless to say, although drawings are omitted, the valley part 45 may be a straight pipe of circular cross section without the pair of the protrusion parts being provided.

Figure 13:
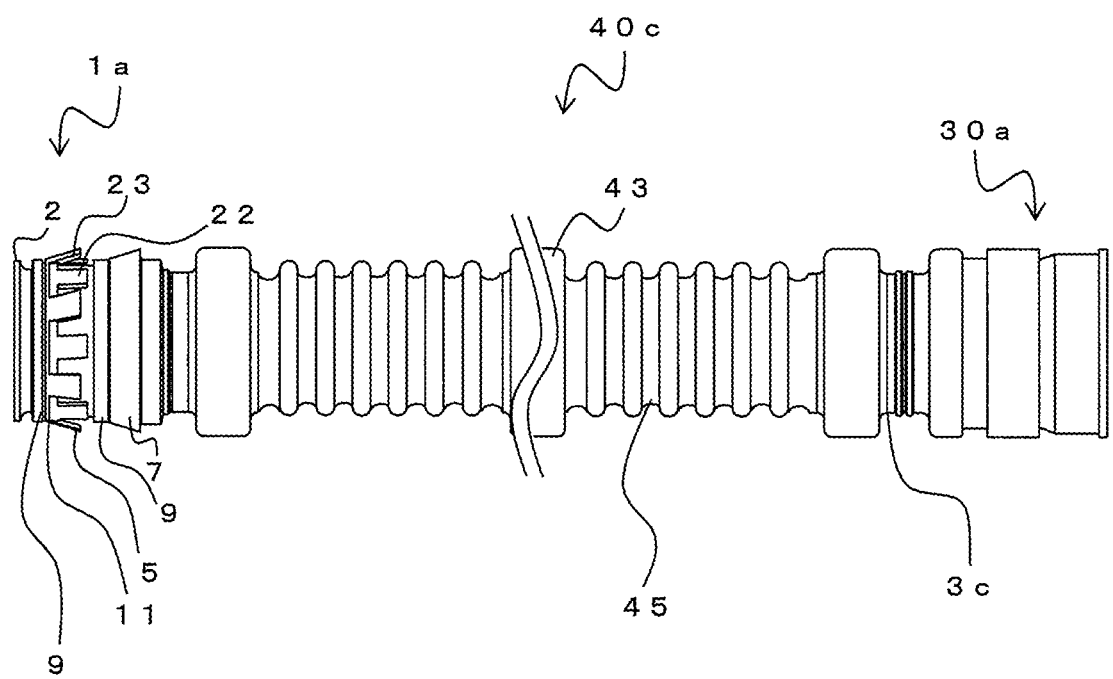
FIG. 13 is a view showing an electrical conduit 40c.

Also, FIG. 13 is a view showing an electrical conduit 40c. The electrical conduit 40c is different from the electrical conduit 40a in that a pipe body 3c is applied instead of the pipe body 3a. In the pipe body 3c, similarly to the pipe body 3b, the substantially square-shaped mountain parts 43 and the circular valley parts 45 are alternately formed.

The valley part 45 of the pipe body 3c is longer enough than the length of the mountain part 43. Also, on a cross section taken in an axial direction of the pipe body 3c, the small diameter part as the valley part 45 is formed in a wave shape. A maximum outer diameter of the wave shape in the valley part 45 is smaller than the outer diameter of the mountain part 43. Similar to the electrical conduit 40b, by providing substantially square-shaped mountain parts 43, the electrical conduit 40c also can be stably disposed when being stacked. Here, although the wave shape is formed as an independent wave in FIG. 13, the wave shape may be in a form of a spiral wave.

Figure 14:
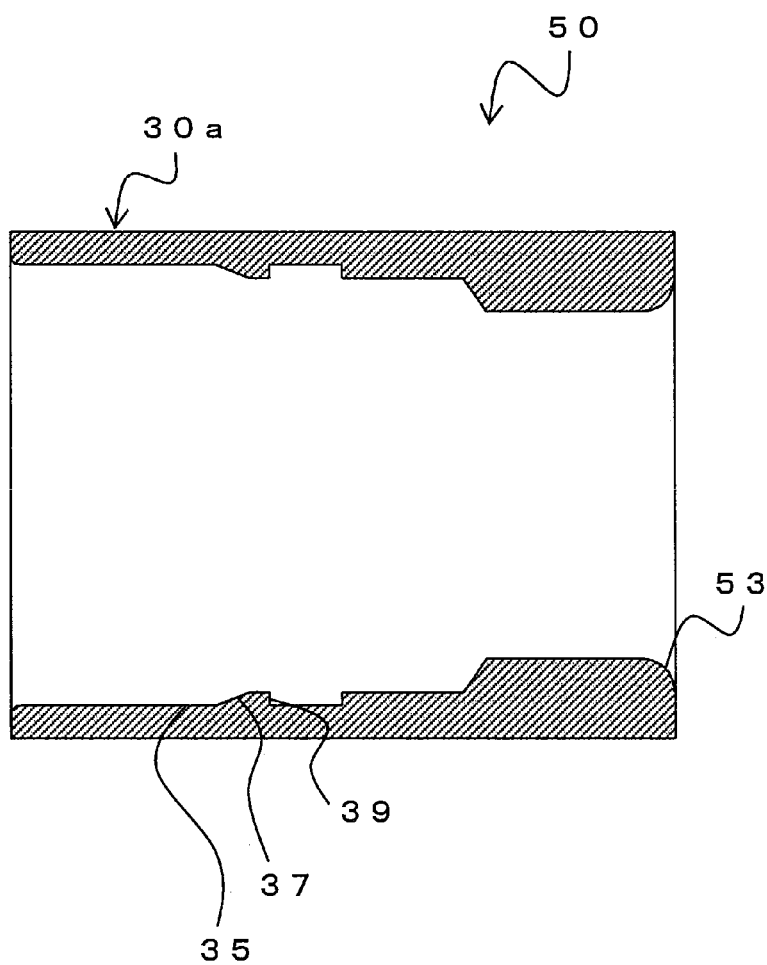
FIG. 14 is a view showing a bell block 50.

Next, a bell block that can be connected with the electrical conduits mentioned above will be described. FIG. 14 is a cross sectional view of a bell block 50. The bell block 50 can be connected with the electrical conduit 40*b* or the like and has the same structure as the female fitting part 30*a*. That is, an inner surface of one end of the bell block 50 has, in sequence from one tip end side (an opening side), the cylindrical part 35, the slope part 37 whose diameter gradually decreases from the cylindrical part 35, and the ring fitting part 39 whose diameter gradually increases from the minimum inner diameter part of the slope part 37. Also, on the other end of the bell block 50, a bell mouth 53 whose inner diameter gradually expands toward the opening end is formed.

The bell block 50 is connected when the male fitting part 1*a* of the electrical conduit 40*b* or the like is inserted into the female fitting part 30*a* side. Also, an electrical cable or the like can be inserted from the bell mouth 53 to the inside.

Figure 15:
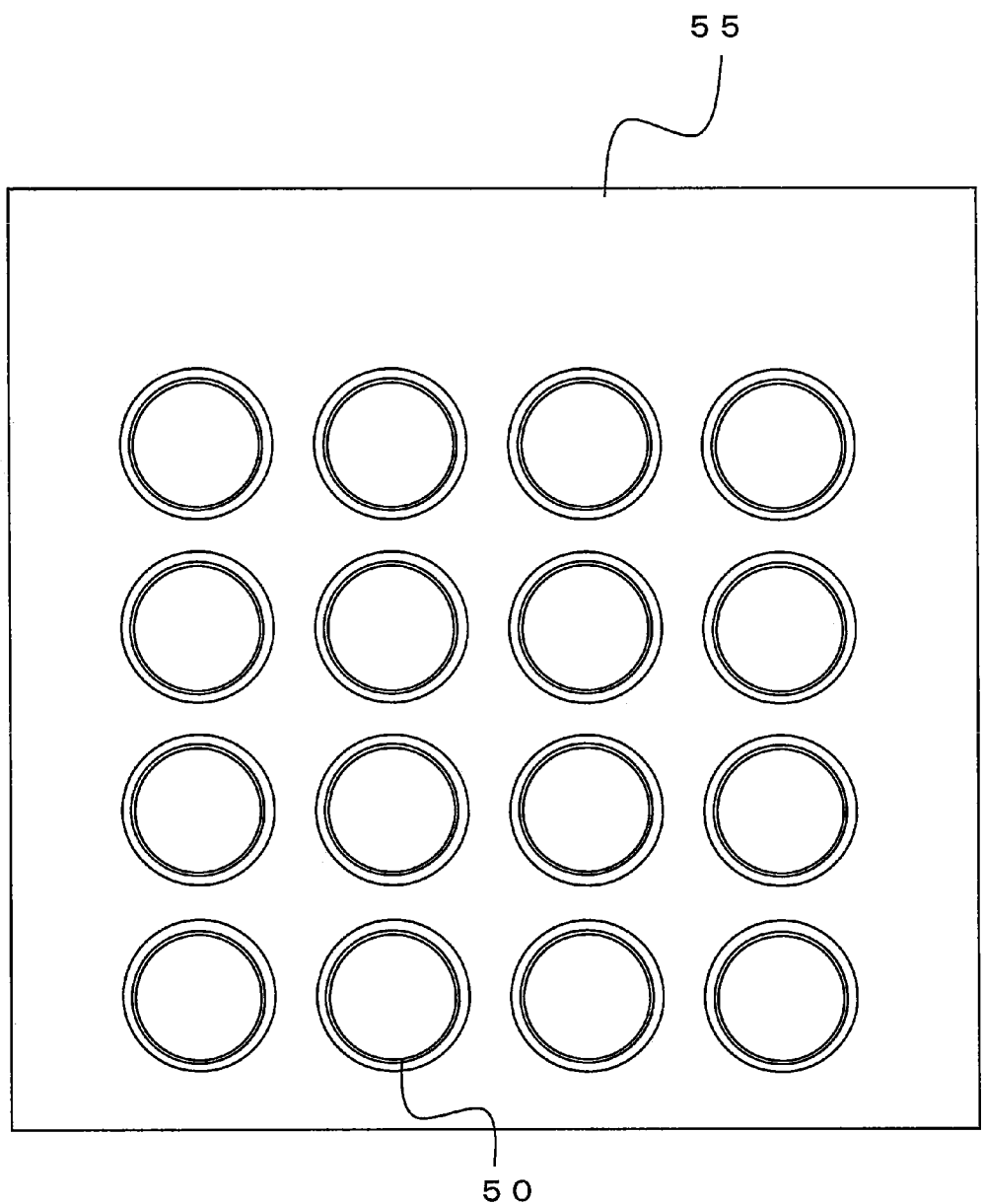
FIG. 15 is a view showing a handhole 55.
Figure 1:
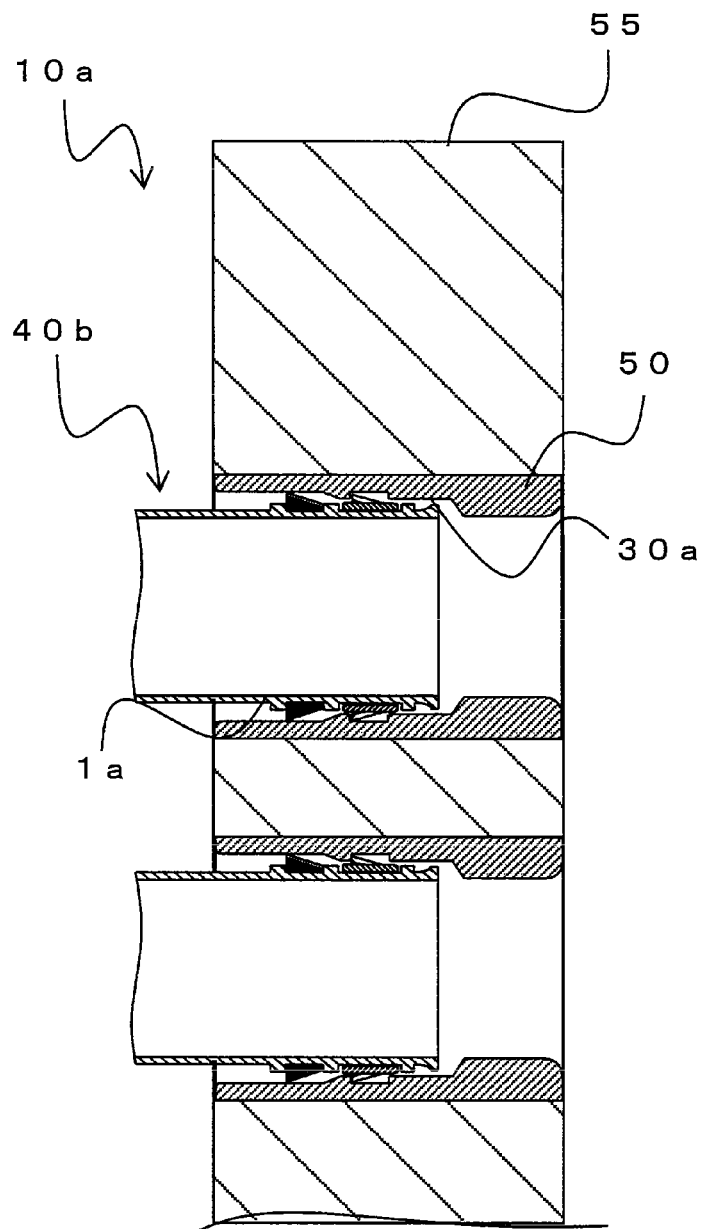

FIG. 15 is a view showing a handhole 55 having a plurality of the bell blocks 50. The handhole 55 is a box made of concrete and the bell blocks 50 are embedded into concrete, for example. That is, on a side face of the concrete made handhole 55, the bell blocks 50 form a plurality of penetrating holes. Alternatively, the bell blocks 50 may be fixed by forming connecting holes in the handhole 55, inserting the bell blocks 50 into the connecting holes, and fixing outer peripheries of the bell block 50 using mortar or epoxy putty. Here, although drawings are omitted, a unified bell block in which a plurality of bell blocks are disposed vertically and horizontally can be applied to the handhole.

FIG. 16 is a cross sectional view showing a connection structure 10*a* for the bell blocks 50 provided in the handhole 55 and the electrical conduits 40*b*. Instead of the electrical conduits 40*b*, other electrical conduits may be applied. As mentioned above, the plurality of the bell blocks 50 are disposed in the handhole 55. The electrical conduits 40*b* are connected to a part or all of the bell blocks 50. That is, the connection structure 10*a* includes the handhole 55 having the bell blocks 50 and the electrical conduits 40*b* and is configured by connecting the bell block 50 having the same structure as the female fitting part 30*a* with the male fitting structure 1*a* of the electrical conduit 40*b*.

A method for connecting the electrical conduit 40*b* with the bell block 50 is the same as the above-mentioned connecting method for connecting electrical conduits together. That is, the male fitting part 1*a* may be inserted into the female fitting part 30*a* of the bell block 50 in the same way as described above, instead of the female fitting part 30*a* of one of the electrical conduits 40*b*. In this way, it is possible to obtain the connection structure 10*a* for electrical conduits, in which the handhole 55, which has the bell block 50 having the same structure as the female fitting part 30*a* of the electrical conduit, is connected with the male fitting part 1*a* of the electrical conduit 40*b*.

Here, as mentioned above, since the mountain part 43 of the electrical conduit 40*b* is square shaped, the electrical conduits 40*b* can be stacked in multiple rows and columns and can be disposed compactly. This enables to reduce an amount of soils to be dug up for embedding the electrical conduits 40*b* and, also, to backfill the soils at once, which results in reducing constructive burden. As a result, reduction of construction period and construction costs can be achieved.

For example, the electrical conduits 40*b* of the present invention can be connected to each other by only inserting the male fitting part 1*a* into the female fitting part 30*a*. Thus, unlike electrical conduits connected by pipe couplings having spiral grooves, it is possible to directly connect the standard length electrical conduits 40*b* with one another, for example.

To connect the handhole 55 and the electrical conduit 40*b*, other than connecting the male fitting part 1*a* of the electrical conduit 40*b* with the bell block 50, a bell block having a fitting part that fits with the female fitting part 30*a* may be connected with the female fitting part 30*a* of the electrical conduit 40*b*.

Figure 17:
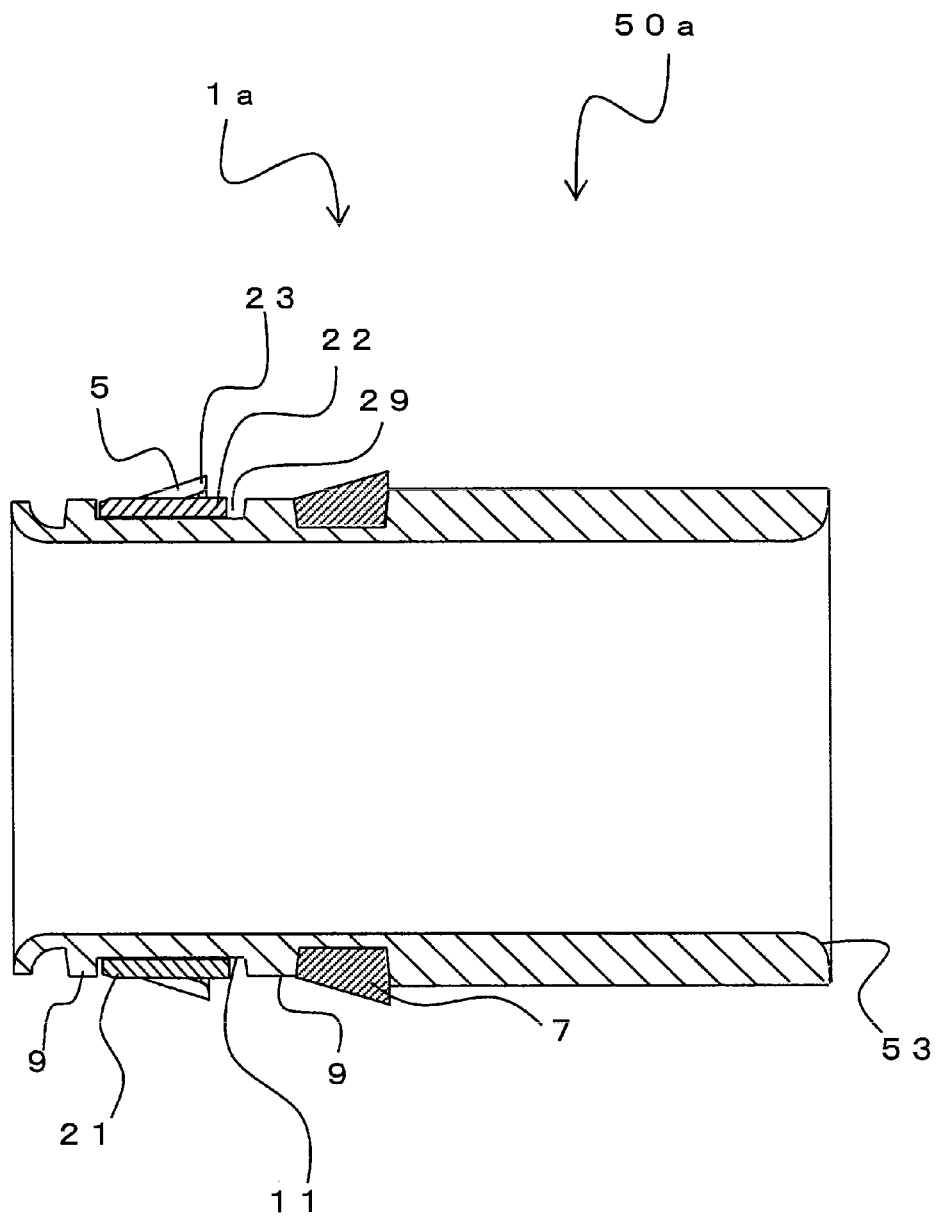

FIG. 17 is a view showing a bell block 50*a*. In the present invention, a member that can be connected with various types of the above-mentioned electrical conduits and includes a structure similar to the male fitting part 1*a* or the female fitting part 30*a* on at least one side thereof is sometimes called as a pipe coupling.

Unlike the bell block 50, the bell block 50*a* includes the male fitting part 1*a*. That is, one end of the bell block 50*a* has a structure similar to the male fitting part 1*a* and the other end thereof has the bell mouth 53. In this case, the male fitting part 1*a* protrudes out of an outer surface of the handhole 55 so as to be able to connect with the female fitting part 30*a* of the electrical conduit.

Also, FIG. 18A is a view showing a pipe coupling 60*a*. Both ends of the pipe coupling 60*a* have the same structure as the male fitting part 1*a*. Using the pipe coupling 60*a* can connect the electrical conduits to one another, each of which includes the female fitting part 30*a* on at least one end thereof. Also, the electrical conduits having female fitting parts 30*a* on both ends can be connected to each other. Also, connecting the female fitting part 30*a* to one end of the pipe coupling 60*a* allows the female fitting part 30*a* to convert into the male fitting part 1*a*.

Here, when the electrical conduits 40*b* are repeatedly connected to form a pipe path of the electrical conduits 40*b*, the bell blocks 50 having the shapes of the female fitting part 30*a* are disposed on the two handholes 55 facing each other, for example. Next, the male fitting part 1*a* is inserted into the bell block 50 of one of the handholes 55 to fix the male fitting part 1*a* to the handhole 55. To extend the pipe path, the male fitting part 1*a* of the next adjacent electrical conduit 40*b* is connected to the female fitting part 30*a* on the other end of the electrical conduit 40*b* that has been fitted.

Also, in parallel with this operation, the male fitting part 1*a* of the electrical conduit 40*b* is inserted into the bell block 50 of the opposite handhole 55 to be connected. To extend the pipe path, the male fitting part 1*a* of the next adjacent electrical conduit 40*b* is connected to the female fitting part 30*a* on the other end of the electrical conduit 40*b* that has been fitted. When these operations are repeated from handholes 55 on both sides, there will be a part where the electrical conduits 40*b* overlap. Thus, it is necessary to adjust lengths of the electrical conduits 40*b*. Adjustment of the lengths of the electrical conduits 40*b* can be performed by cutting and connecting the valley parts 45 of the electrical conduits 40*b* that have been extended from the both sides.

Incidentally, when the electrical conduits 40*b* are connected with each other in this way, an end material of a pipe with one end having the female fitting part 30*a* and the other end being cut at the valley part 45 is to be produced. This end material should not be wasted but used as a pipe to form the electrical pipe path for economic reasons. To use the end material, it is effective to use the pipe coupling 60*a* in which one end is the male fitting part 1*a* and the other end also has the shape of the male fitting part 1*a*.

When the female fitting part 30*a* of the end material is connected with a coupling having male fitting parts 1*a* on both sides thereof, a pipe with one end having the male fitting part 1*a* and the other end being cut at the valley part 45 is produced. By making the one end the male fitting part 1*a*, the pipe can be connected to one end of the bell block 50 having the female type shape formed in the two facing handholes 55. Also, by adjusting the length thereof along with the pipe extended from the other handhole 55, an electrical conduit line connecting handholes together is formed. Here, if a pipe with one end being cut at the valley 45 faces another one with one end being cut at the valley 45, a coupling specialized for connecting the facing valley parts 45 together can be used to connect the pipes.

Here, as mentioned above, the two protrusion parts 47 facing each other are provided on the valley parts 45 of the electrical conduit 40*b* and a groove-like shape is formed between the protrusion parts 47. If these protrusion parts 47 do not exist and an electrical conduit without the groove-shaped form is to be cut, there is no cutting mark or a guide groove for cutting and thus there may be a case in which the cutter slips and the electrical conduit is cut askew. Particularly in rainy weather, the electrical conduits are wet and the electrical conduits and the cutter are slippery so that the electrical conduits are not cut at the predetermined positions or may also likely be cut askew. When connecting such the electrical conduits that are cut askew together, it is difficult to align positions of end parts of the electrical conduits within the pipe coupling and thus the pipe coupling may fail to connect. In such cases, the cut electrical conduits may become a waste.

However, if the two facing protrusion parts 47 are provided at the valley part 45 of the electrical conduit 40*b* to form a groove-like shape between the protrusion parts 47, the cutter can be used along the groove. Thus, this facilitates the operator to find a cutting position and, also, can prevent the cutter from slipping. Thus, there is no deviation from the cutting position or askew cutting.

Figure 18B:
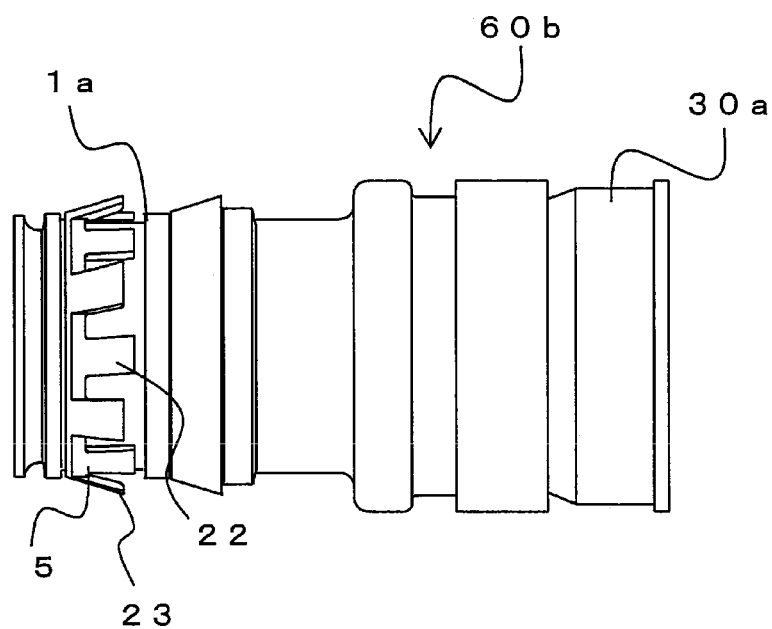
FIG. 18B is a view showing a pipe coupling 60b.

Also, FIG. 18B is a view showing a pipe coupling 60*b*. The pipe coupling 60*b* has the same structure as the male fitting part 1*a* on one end and the same structure as the female fitting part 30*a* on the other end. Using the pipe coupling 60*b* enables to connect an electrical conduit having the male fitting part 1*a* at least on one end thereof with an electrical conduit having the female fitting part 30*a* on at least one end thereof.

Also, FIG. 19A is a view showing a pipe coupling 60*c*. The pipe coupling 60*c* has the same structures as the female fitting part 30*a* on both ends. Using the pipe coupling 60*c* enables to connect electrical conduits together, each of which has the male fitting part 1*a* on one end thereof. Also, the pipe coupling 60*c* can connect electrical conduits having the male fitting parts 1*a* on both ends thereof. Also, the pipe coupling 60*c* can convert the male fitting part 1*a* into the female fitting part 30*a*. At this time, although a groove is formed on a small diameter part at the center of the coupling in FIG. 19A, the groove may not be formed since the groove is not always necessary.

Also, FIG. 19B is a view showing a pipe coupling 60*d*. The pipe coupling 60*d* has the same structure as the female fitting part 30*a* on one end and continuous spiral wavy forms 61 on an outer surface (and an inner surface) of a pipe body on the other end. Using the pipe coupling 60*d* enables to connect an electrical conduit having the male fitting part 1*a* at least on one end thereof with an electrical conduit having spiral wavy forms on an outer surface thereof. As above, using the pipe coupling 60*d* as shown in FIG. 19B can achieve a coupling of different types of pipes, in which an electrical conduit having a square cross section like the present invention is connected with an electrical conduit having a different cross section and spiral wavy forms on its outer surface.

As described above, according to the present embodiment, the ring member 5 is disposed on the outer surface of the male fitting part 1*a* and thus the ring member 5 can be easily visually recognized. Also, when the male fitting part 1*a* is inserted into the female fitting part 30*a*, the ring member 5 can be efficiently deformed owing to both effects of a diameter expansion of a circumferential length of the ring member due to an elastic repulsive force of the ring member 5 and a diameter expansion of the second click part 23 in a cross section taken in the pipe axial direction due to a restoration of bending transformation.

Thus, if a thickness of the second click part 23 of the ring member 5 that is applied with a pulling out force is increased, the diameter of the ring member 5 can be easily decreased. As a result, connecting the male fitting part 1*a* with the female fitting part 30*a* is easy and it is possible to prevent the male fitting part 1*a* from drawing off from the connected status with certainty.

Also, the ring member 5 can slide and move within the ring member mounting position 11. Thus, when the male fitting part 1*a* is pushed inside the female fitting part 30*a*, the ring member 5 can be deformed easily with the contacting point between the ring member 5 and the ring member mounting position 11 as the supporting point. Also, when a force is applied in a direction in which the male fitting part 1*a* is pulled out, the ring member 5 moves and an end of the ring member 5 on the side of the reduced diameter part 21 contacts the locking wall 9 at the end portion of the ring member mounting position 11. This prevents the ring member 5 from coming off the ring member mounting position 11 when the ring member 5 moves over the ring member mounting position, and the ring member 5 can be firmly fixed on the ring member mounting position 11.

Particularly, the ring member 5 is in a sharp wedge shape, in which the thickness thereof decreases from the tip end of the second click part 23 toward the reduced diameter part 21. Thus, when the diameter of the ring member 5 is reduced, the reduced diameter part 21 of the ring member 5 contacts the ring member mounting position 11 so that the ring member 5 can be easily deformed with the contacting part as the supporting point.

Also, the water sealing member 7 is disposed on the inner side of the pipe axial direction beyond the ring member 5. Thus, it is possible to reduce insertion resistance due to the water sealing member 7 when the male fitting part 1*a* is inserted into the female fitting part 30*a*. Also, even if a lubricant is applied on the water sealing member 7, the lubricant never adheres to the ring member 5.

If the ring member 5*a* is used, similarly to the ring member 5, an inner surface in a vicinity of an end part of the reduced part 21 of the ring member 5*a* can move within the ring member mounting position 11 up to a vicinity of the locking wall 9 on an end part of the ring member mounting position 11. Also in this case, the male fitting member 1*a* slides and moves to fit with the female fitting part 30*a*. Thus, the insertion resistance is less than that in a case in which the male fitting part 1*a* is inserted with the ring member 5*a* fixed thereon, so the insertion is easy.

Also, in a case of the ring member 5*a*, the joint parts 24*a* and 24*b* are formed on end parts of the ring member 5*a* and the joint parts 24*a* and 24*b* are connected with each other so that the ring member 5*a* can be mounted on the ring member mounting position of a male fitting part of an electrical conduit or a male-type form of a pipe coupling for connecting different pipes. Thus, when sliding and moving the ring member 5*a*, the ring member 5*a* can slide and move with more stability than in a case of the ring member 5, which does not have the joint parts 24*a* and 24*b*.

Also, the joint parts 24*a* and 24*b* of the ring member 5*a* allows the ring member 5*a* to adjust its length by changing the joint position of the joint parts which are in saw-blade like grooves, numerous micro protrusions, adhesive layers with release paper, or the like. If the joint parts 24*a* and 24*b* are in such a shape, adjusting the length in connecting the ring member 5*a* when the ring member 5*a* is formed into a ring shape can optimize a circumferential length of the ring member 5*a*. Thus, size variation of the fitting part of the electrical conduit can be absorbed.

Also, the electrical conduit 40*a* or the like has the male fitting part 1*a* on one end and the female fitting part 30*a* on the other end, and this facilitates to connect a plurality of the electrical conduits 40*a*.

In particular, the electrical conduit 40*b* has the substantially square-shaped mount parts 43 and circular valley parts 45 alternately formed on the outer periphery surface of the pipe body thereof. Thus, a plurality of the electrical conduits 40*b* can be stacked stably when being stacked. Also, since the electrical conduit 40*b* has a pair of the protrusion parts 47 at a substantially center of the valley parts 45 to the pipe axial direction of the pipe body and a groove shape is formed between the protrusion parts 47, the electrical conduit 40*b* can be easily cut at the said part. Thus, accuracy of the cutting position of the cut pipe can be highly maintained, which makes it possible to build a connection structure for electrical conduits or a pipe path of electrical conduits with high accuracy.

Also, using a pipe coupling having the male fitting part 1*a* or the female fitting part 30*a* on at least one end part thereof can connect various types of electrical conduits easily. Similarly, using a bell block having the male fitting part 1*a* or the female fitting part 30*a* on one end part thereof can connect the bell block with an electrical conduit easily.

As a cross sectional shape of the second click part 23, for example, a wedge shape shown in FIG. 20A may be applicable. In an example shown in FIG. 20A, an outer surface of the ring member 5 has the tapered part 33 whose diameter is continuously and gradually reduced from a tip end of the second click part 23. Also, an inner circumferential part of the ring member 5 is bent and formed with two-step angles. The second click part 23 may be in such a sharp wedge shape in which the thickness decreases from the tip end thereof toward the reduced diameter part 21.

Also, as shown in FIG. 20B, the diameter of the inner circumferential part of the ring member 5 may be reduced linearly and gradually from the tip end of the second click part 23 toward the reduced diameter part 21. In this case, by making a taper angle of the inner periphery surface smaller than a taper angle of the tapered part 33 of the outer periphery surface of the ring member 5, the second click part 23 can be in such a sharp wedge shape in which the thickness decreases from the tip end thereof toward the reduced diameter part 21.

Figure 21A:
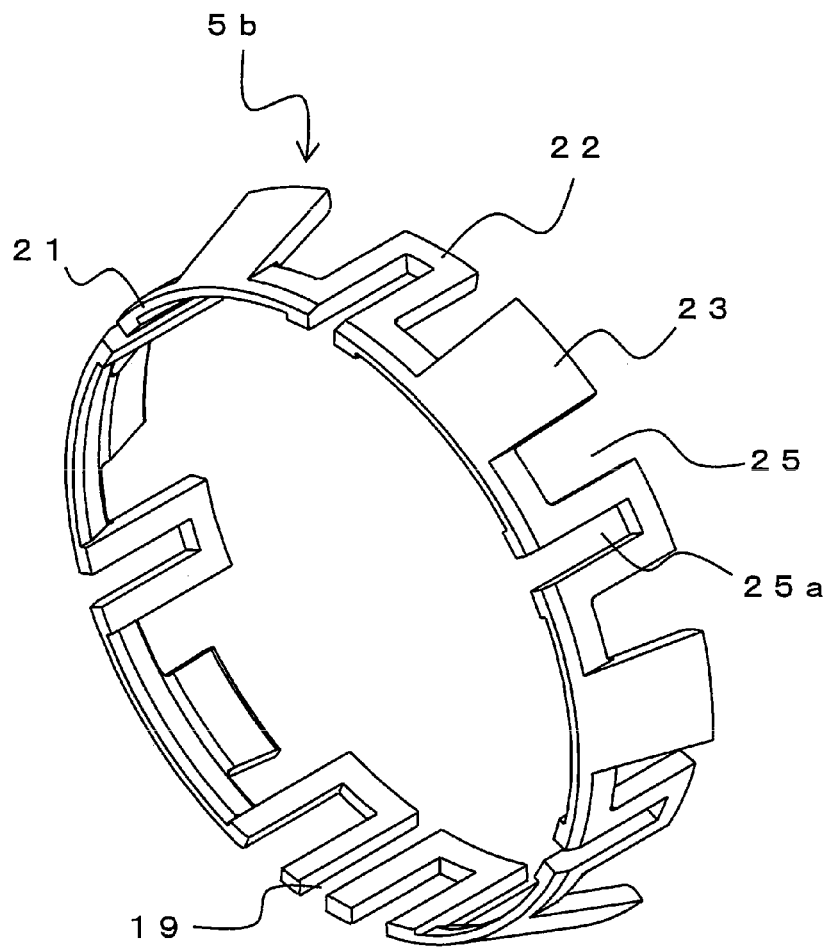
FIG. 21A is a perspective view of a ring member 5b.
Figure 21B:
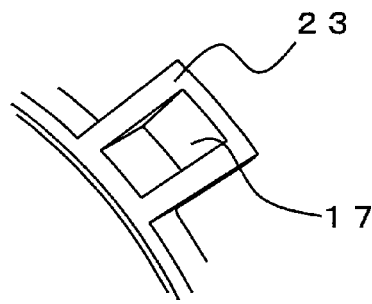
FIG. 21B is an enlarged view of a click part in a case in which a thin part 17 is provided at the second click part 23 of the ring member 5b.

A ring member 5*b* shown in FIG. 21B may also be used. The ring member 5*b* has almost the same structure as the ring member 5 except that the first click part 22 is in a different shape.

The first click part 22 of the ring member 5*b* is formed in a substantially horseshoe shape. That is, the first click part 22 has a slit 25*a* formed from the side of the reduced diameter 21 toward a side of a tip end thereof. Thus, the first click part 22 is in a shape in which an opening is formed on the reduced diameter 21 side and a frame joining in the circumferential direction is formed on the tip end side. Instead of the substantially horseshoe shape having the substantially square-shaped slit 25*a* from the reduced diameter part 21 side, the first click part 22 may be formed in a U shaped or a V shaped frame, for example.

In the ring member 5*b*, since the slit 25 is formed from the reduced diameter part 21 side in the first click part 22, the frame-shaped first click part 22 slightly expands in its diameter when a pressing stress is applied onto the second click part 23. As a result, a circumferential length of the reduced diameter part 21, which includes both the base parts of the first click parts 22 and the second click parts 23, slightly increases and this facilitates the second click parts 23 on both sides of the first click parts 22 to deform. Thus, since the second click parts 23 are easily deformed and the diameter of the ring member 5*b* can be reduced, connecting the male fitting part 1*a* with the female fitting part 30*a* is easy.

As shown in FIG. 21B, the second click part 23 can be in a shape in which a thin part 17 having a thickness less than that of an outer frame part is formed inside the outer frame part. That is, an inner part of the outer frame part is formed so that a thickness of the inner part is less than the thickness of the outer frame part of a click surface of the second click part 23. With the inner part of the outer frame part formed thinner than the outer frame part of the click surface of the second click part 23 as above, the second click part 23 can be easily deformed. Although the thin part 17 is formed in the second click part 23 of the ring member 5*b* here, this can be applied to the other ring members such as the ring member 5 or the ring member 5*a*.

Also, forming the thin part 17 having the thinner thickness than the outer frame part on an outer surface side of the second click part 23 can reduce the insertion resistance at the time of inserting the male fitting part 1*a* into the female fitting part 30*a*. Also, when a pulling out force is applied onto the female fitting part 30*a* and the male fitting part 1*a*, the second click part 23 does not buckle since the outer frame part of the click surface is formed thicker than the inner part.

(Double-Wall Rectangular Electrical Conduit)

Figure 22:
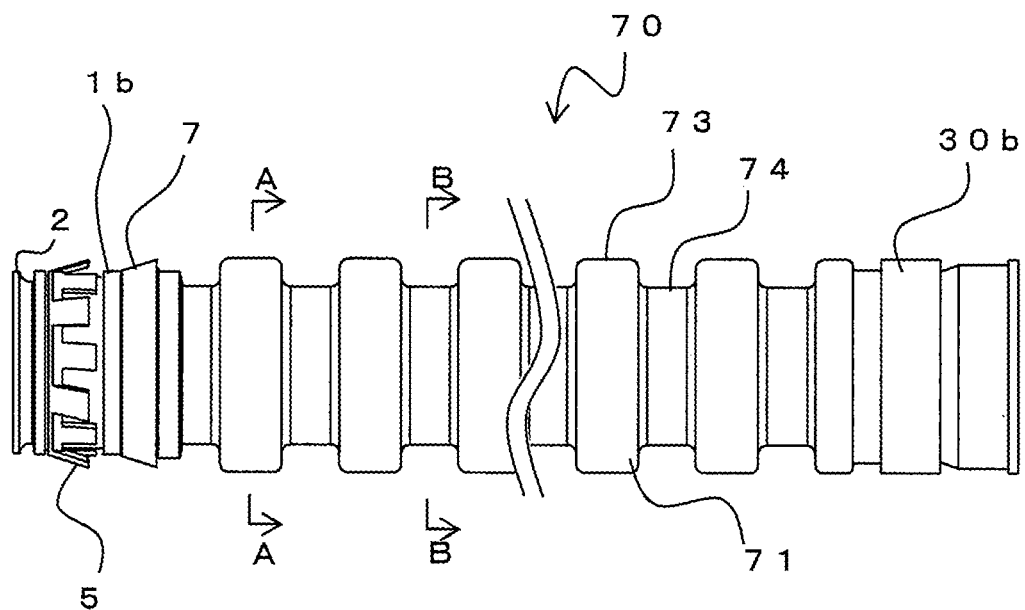
FIG. 22A is a side view showing a double-wall rectangular electrical conduit 70 including a male fitting part 1b and a female fitting part 30b.
FIG. 22B is a cross sectional view of FIG. 22A taken along a pipe axial direction.
Figure 22:
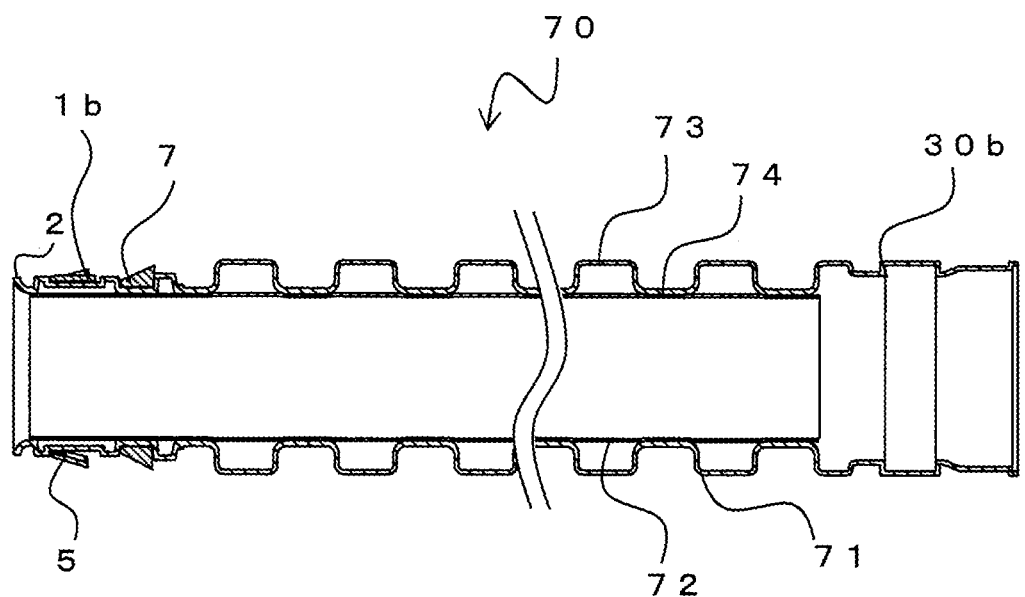

FIG. 22A is a side view showing a double-wall rectangular electrical conduit 70, and FIG. 22B is a cross sectional view of the double-wall rectangular electrical conduit 70 taken along a pipe axial direction. The double-wall rectangular electrical conduit 70 shown in FIG. 22A includes an outer pipe 71, an inner pipe 72, a male fitting part 1*b*, a female fitting part 30*b*, and so on. As shown in FIG. 22B, the outer pipe 71 of the double-wall rectangular electrical conduit 70 is a pipe body having the same shape as the electrical conduit 40*b* shown in FIG. 12A, and the inner pipe 72 thereof is in a substantially cylindrical shape disposed parallel to the pipe axial direction inside the outer pipe 71. A large diameter part 73 of the double-wall rectangular electrical conduit 70 corresponds to the mountain part 43 of the electrical conduit 40*b*, and a small diameter part 74 of the double-wall rectangular electrical conduit 70 corresponds to the valley part 45 of the electrical conduit 40*b*.

The sectional profile of a large diameter part 73 of the double-wall rectangular electrical conduit 70 is a substantially square shape and the sectional profile of a small diameter part 74 is a circular shape.

The outer periphery surface of the inner pipe 72 is fusion bonded with an inner periphery surface of the outer pipe 71 at a position corresponding to the small diameter part 74 of the double-wall rectangular electrical conduit 70. At the large diameter part 73 of the double-wall rectangular electrical conduit 70, a space having a predetermined shape is formed between the outer pipe 71 and the inner pipe 72.

Here, the male fitting part 1b and the female fitting part 30b of the double-wall rectangular electrical conduit 70 are in the same shapes as the end parts of the electrical conduit 40b. Thus, the male fitting part 1b and the female fitting part 30b of the double-wall rectangular electrical conduit 70 are structured to be able to fit with each other. At the tip end of the male fitting part 1b of the double-wall rectangular electrical conduit 70, a guide part 2 having a bell mouth like shape may be formed. However, the guide part 2 is not always necessary, and the guide part 2 may not be formed. This structure of the guide part 2 is the same as for the single wall electric conduit 40a, 40b, 40c in this invention as shown in FIG. 11, FIG. 12B and FIG. 13.

As above, since the inner pipe 72 is disposed inside the outer pipe 71, the double-wall rectangular electrical conduit 70 excels in wire passing performance. At the same time, disposing the inner pipe 72 inside the outer pipe 71 increases rigidity of the electrical conduit, and this gives the electrical conduit less deflection while having a moderate flexibility. Thus, the double-wall rectangular electrical conduit 70 excels not only in wire passing performance but also in handling performance. Also, since the inner pipe 72 is provided inside the outer pipe 71 and the outer pipe 71 and the inner pipe 72 are fusion bonded as one body thereby increasing the rigidity, the double-wall rectangular electrical conduit 70 can be laid much deeper underground than using the electrical conduit 40b, which has no inner pipe. Here, since metal molding, which will be described below, makes the outer pipe 71 of the double-wall rectangular electrical conduit 70 thinner and the outer pipe 71 is required to bear earth pressure at use when laid underground, an element tube of the outer pipe 71 is formed to be thicker than an element tube of the inner pipe 72.

(State of the inner pipe inside the male fitting part and the female fitting part)

The outer pipe 71 forms an outer shape of the male fitting part 1b. The male fitting part 1b (the outer pipe 71) covers and accommodates the inner pipe 72 at the male fitting part 1b.

At the male fitting part 1b, the inner pipe 72 is bonded with an inner surface of a tip end portion of the male fitting part 1b as one body by fusion or by using adhesive, for example. Alternatively, the inner pipe 72 may be separated from the male fitting part 1b without unifying the inner surface of the male fitting part 1b with the inner pipe 72. In such a case, the inner pipe 72 is covered by the male fitting part 1b at proximity of an end portion of the male fitting part 1b. That is, the inner surface of the tip end portion of the male fitting part 1b may be in one body with the inner pipe 72, or the male fitting part 1b may not necessarily be fixed and in contact with the inner pipe 72 if the outer periphery of the inner pipe 72 is covered and does not protrude from the tip end portion of the male fitting part 1b.

The outer pipe 71 also forms an outer shape of the female fitting part 30b at the opposite tip end of the male fitting part 1b of the double-wall rectangular conduit in the tube longitudinal direction. The inner pipe 72 is cut inside the female fitting part 30b so as not to obstruct the connection between the male fitting part 1b and the female fitting part 30b. Since the inner pipe 72 is cut inside the female fitting part 30b, it is possible to prevent the inner pipe 72 from becoming an obstruction for the connection at the time of fitting the female fitting part 30b with the male fitting part 1b. When fitting and connecting the female fitting part 30b with the male fitting part 1b, it is not always necessary to cut the inner pipe disposed inside the male fitting part 1b as mentioned above. However, for the female fitting part 30b to be connected with the male fitting part 1b, the inner pipe 72 becomes an obstacle when inserting the male fitting part 1b and thus it is necessary to cut the inner pipe 72 inside the female fitting part 30b. In this way, the inner pipe 72 is accommodated inside the male fitting part 1b, and the inner pipe 72 is cut inside the female fitting part 30b so that the connection of the double-wall rectangular electrical conduit 70 with the others is easy.

(Method for Manufacturing Double-Wall Rectangular Electrical Conduit)

Figure 23A:
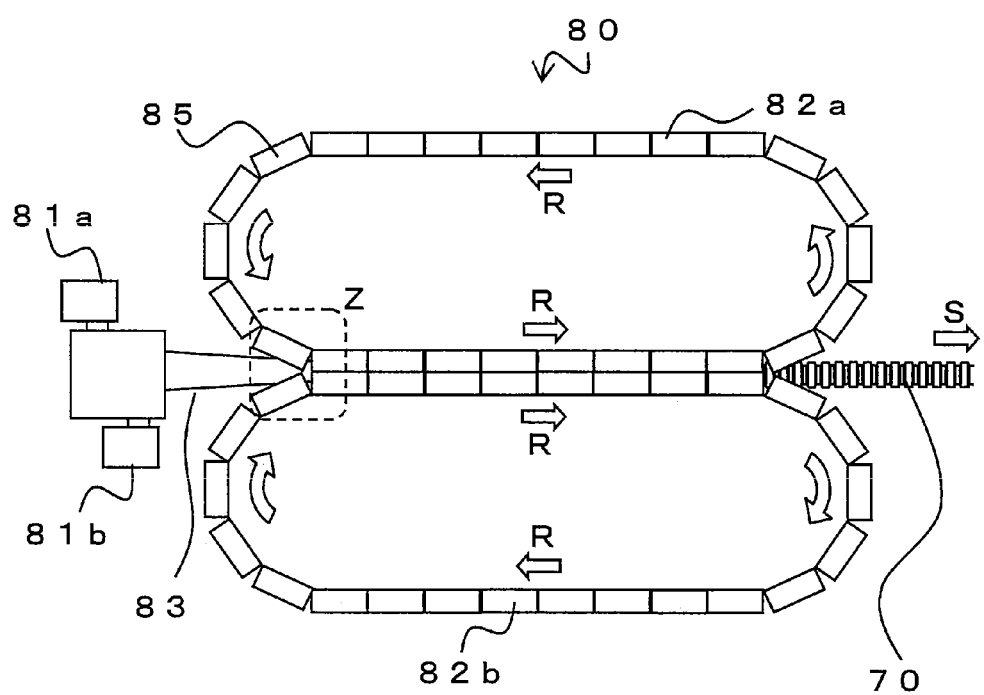
FIG. 23A is a view showing a method for manufacturing the double-wall rectangular electrical conduit 70.

Next, a method for manufacturing the double-wall rectangular electrical conduit 70 will be described. FIG. 23A is a schematic view showing a manufacturing apparatus 80 for double-wall rectangular electrical conduit. The manufacturing apparatus 80 for double-wall rectangular electrical conduit mainly includes extruding machines 81a, 81b, endless tracks 82a, 82b, and so on.

The endless tracks 82a and 82b rotate in opposite directions to each other (in directions shown by arrows R in the drawing). The endless tracks 82a and 82b include a plurality of metal molds 85 and so on. The endless tracks 82a and 82b move at the same speed in the same direction in regard to the feeding direction of the manufacturing apparatus 80 for double-wall rectangular electrical conduit, and the endless tracks 82a and 82b have a molding portion where the endless tracks 82a and 82b face each other. At the molding portion, the metal molds 85 and the like of the endless tracks 82a and 82b are in contact with each other facing each other, and the metal molds 85 move in the feeding direction at the same speed.

The metal mold 85 is a semi-tubular member in a halved shape, including on the inner surface thereof a concave portion and a convex portion that correspond to the large diameter part and the small diameter part of the double-wall rectangular electric conduit 70, respectively. A pair of the metal molds 85 face each other and are put together to make a tubular member.

Figure 23B:
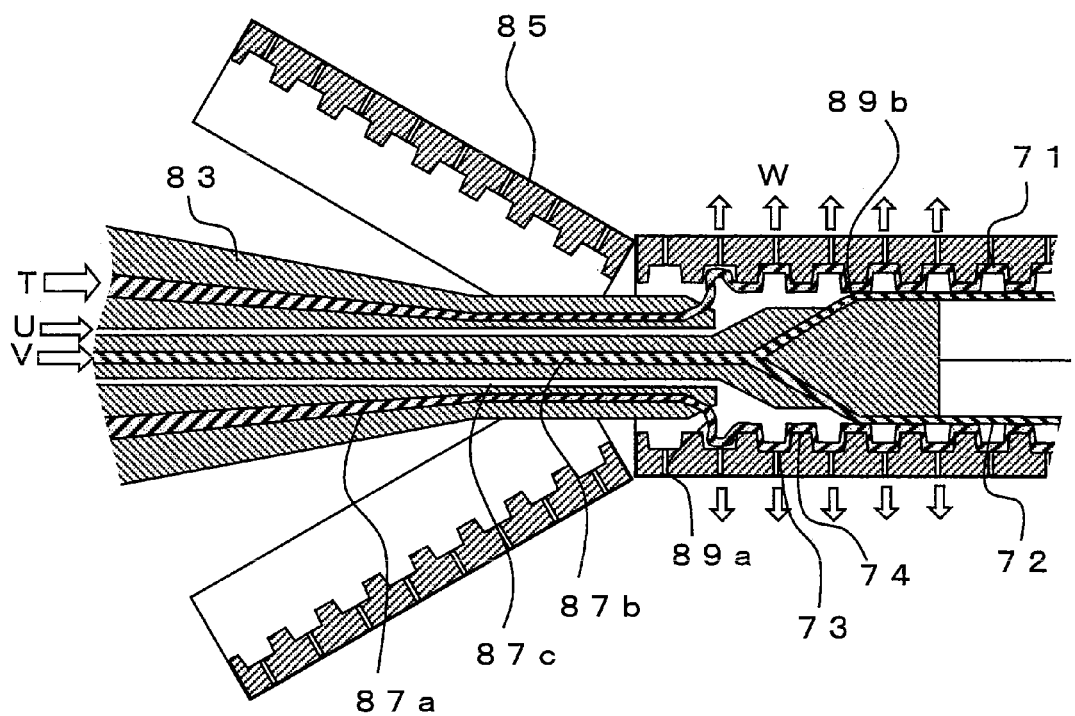
FIG. 23B is an enlarged cross sectional view of Z section in FIG. 23A.

FIG. 23B is a cross sectional view of Z section in FIG. 23A. On an upper stream of the feeding direction of the manufacturing apparatus 80 for double-wall rectangular electrical conduit, the extruding machines 81a, 81b and an extrusion head 83 are disposed. An end portion of the extrusion head 83 is inserted into the tubular portion where the metal molds 85 are facing and in contact with each other.

In the extrusion head 83, a flow channel 87a, through which a resin forming the outer pipe 71 flows, and a flow channel 87b, through which a resin forming the inner pipe 72, are coaxially disposed. For example, on a cross section taken perpendicularly to an axis direction of the extruding head 83, the flow channel 87b is disposed in proximity of the center of the extruding head 83, and the flow channel 87a is formed in a ring shape surrounding a periphery of the flow channel 87b. The flow channel 87a is connected to the extruding machine 81a, and the extruding machine 81a pushes out the resin into the flow channel 87a (an arrow T in the drawing). Similarly, the flow channel 87b is connected to the extruding machine 81b, and the extruding machine 81b pushes out the resin into the flow channel 87b (an arrow V in the drawing).

Between the metal molds 85 that are put together, an element tube 89a in a tubular shape (parison) is extruded from an end of the flow channel 87a through which the resin for the outer pipe flows. That is, the tubular element tube 89a is fed into a tubular space formed between a pair of the metal molds 85. Here, a speed of extrusion of the element tube 89*a* is synchronized with the moving speed of the metal molds 85.

The metal mold 85 has a plurality of holes, and air inside is sucked to the outside (an arrow W in the drawing). At this time, a flow channel 87*c* through which the air flows is formed between the flow channel 87*a* and the flow channel 87*b*. Feeding compressed air into the flow channel 87*c* (an arrow U in the drawing) can suppress an inner pressure of the element tube 89*a* from becoming negative.

Since the air between the metal molds 85 and the element tube 89*a* is sucked to the outside, the element tube 89*a* is pressed against the inner surfaces of the metal molds 85. Thus, corresponding to the inner surface shapes of the metal mold 85, the large diameter part 73 is formed at the concave portion of the metal mold 85 and the small diameter part 74 is formed at the convex portion of the metal mold 85 in the element tube 89*a*. That is, the melted resin in a tubular shape extruded from an outer pipe nozzle (the end of the flow channel 87*a*) is steadily pressed against the inner surfaces of the separated caterpillar-type metal molds 85 by vacuum suction and eventually pressed and fitted to the inner surfaces of the metal molds 85 to form the outer pipe 71.

On a farther tip end side of the extrusion head 83 with respect to where the outer pipe 71 is formed, a tubular element tube 89*b* (parison) is similarly extruded from a ring-shaped tip end of the flow channel 87*b* through which the resin for the inner pipe flows. Here, a speed of extrusion of the element tube 89*b* is synchronized with the moving speed of the metal molds 85. The element tube 89*b* is fed into a space between an inner surface of the outer pipe 71 that has been formed already and an end portion of the extrusion head 83 so as to be formed into a tubular shape, which is a shape for the inner pipe 72. At this time, an outer surface of the inner pipe 72 and an inner surface of the small diameter part 74 of the outer pipe 71 are fusion bonded together. Cooling is performed thereafter and the double-wall rectangular electrical conduit 70 is manufactured.

As mentioned above, the inner pipe 72 is fusion bonded with the inner surface of the outer pipe 71 at the small diameter part 74 as a whole in the pipe axial direction along the inner surface shape of the outer pipe 71. Thus, the outer pipe 71 is fusion bonded with the inner pipe 72 at the small diameter parts 74.

For the metal molds 85, the metal molds for forming the male fitting part 1*b* and the female fitting part 30*b* may be provided before and behind the metal molds in repeated shapes of the large diameter part 73 and the small diameter part 74, at both end portions thereof. This makes it possible to form the male fitting part 1*b* and the female fitting part 30*b* on both end portions of a pipe body having a predetermined length. To form a plurality of the continuous double-wall rectangular electrical conduits 70, the metal molds for forming the male fitting part 1*b* and the female fitting part 30*b* are to be disposed adjacently. In such a case, a part for adjusting the difference between outer diameters of the ends of the both molds is required. As this adjusting part, a transition part that connects the male fitting part 1*b* and the female fitting part 30*b* is provided. That is, a plurality of the double-wall rectangular electrical conduits 70 that are joined together via the transition part are manufactured. The transition part and the unnecessary inner pipe 72 inside the female fitting part 30*b* are cut thereafter.

(Connection Structure for Double-Wall Rectangular Electrical Conduits)

Figure 24:
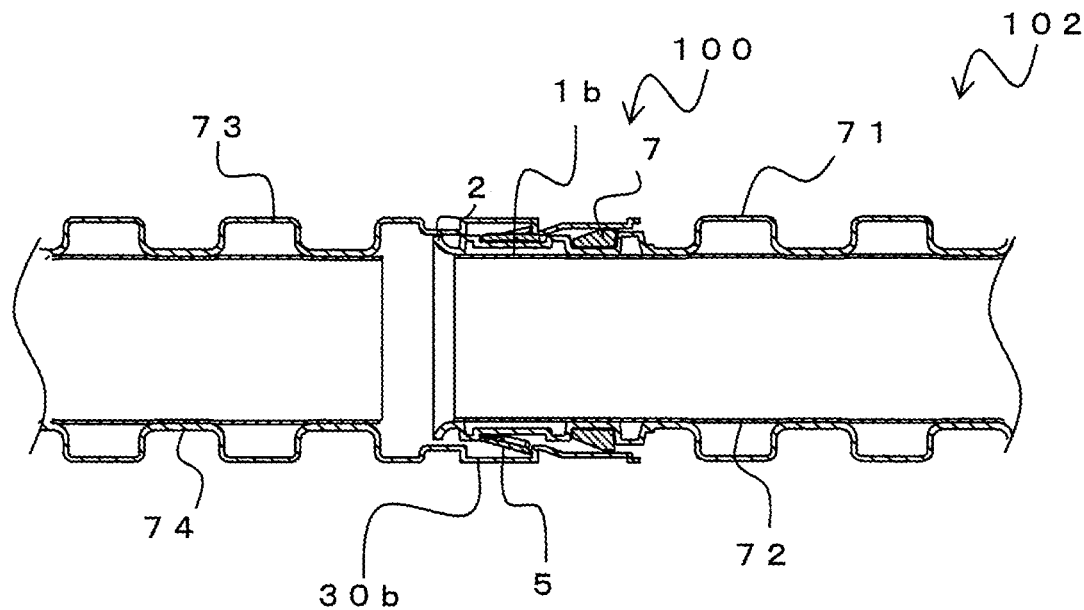
FIG. 24 is a view showing a connecting structure for the male fitting part 1b and the female fitting part 30b of the double-wall rectangular electrical conduit 70.

FIG. 24 is a cross sectional view showing a connection structure 100 for double-wall rectangular electrical conduits in which the two double-wall rectangular electrical conduits 70 are connected with each other. The connection structure 100 is formed by using two double-wall rectangular electrical conduits 70 being disposed so that the male fitting part 1*b* and the female fitting part 30*b* that can be fitted with each other that face each other in regard with the pipe axial direction, and by inserting the male fitting part 1*b* of the one double-wall rectangular electrical conduit 70 into the female fitting part 30*b* of the other double-wall rectangular electrical conduit 70.

Here, the fitting mechanism between the male fitting part 1*b* and the female fitting part 30*b* is similar to the case in the electrical conduits 40*b* without the inner pipe 72, and thus detailed descriptions will be omitted (see FIG. 5 to FIG. 7B, and FIG. 9 to FIG. 10). According to the present embodiment, the connection structure 100 for the double-wall rectangular electrical conduits 70 can be obtained.

Also, as mentioned above, the inner pipe 72 is disposed inside the male fitting part 1*b* and either unified together with or covered and contained by the male fitting part 1*b*. Also, the inner pipe 72 is cut inside the female fitting part 30*b*. This can prevent the inner pipe 72 inside the female fitting part 30*b* from obstructing the connection when the female fitting part 30*b* is fitted with the male fitting part 1*b*.

(Conduit Line Using the Connection Structure for Double-Wall Rectangular Electrical Conduits)

Here, by further connecting the double-wall rectangular electrical conduit 70 repeatedly for a plurality of times to the connection structure 100 for the double-wall rectangular electrical conduits 70, a conduit line 102 for the double-wall rectangular electrical conduits using the connection structure 100 for the double-wall rectangular electrical conduits 70 can be obtained. By connecting the male fitting part 1*b* and the female fitting part 30*b* of the double-wall rectangular electrical conduits 70 with each other in this way, it is possible to build the conduit line 102 for double-wall rectangular electrical conduits of a predetermined length. On the other hand, the length of the conduit line 102 for double-wall rectangular electrical conduits is a substantially integral multiplication of a length of the double-wall rectangular electrical conduit 70. For this reason, it is required to adjust the length of the conduit line 102 for double-wall rectangular electrical conduits if necessary. A method for adjusting the length of the conduit line 102 for double-wall rectangular electrical conduits will be described below.

(Another Connection Structure for the Double-Wall Rectangular Electrical Conduit)

Figure 25:
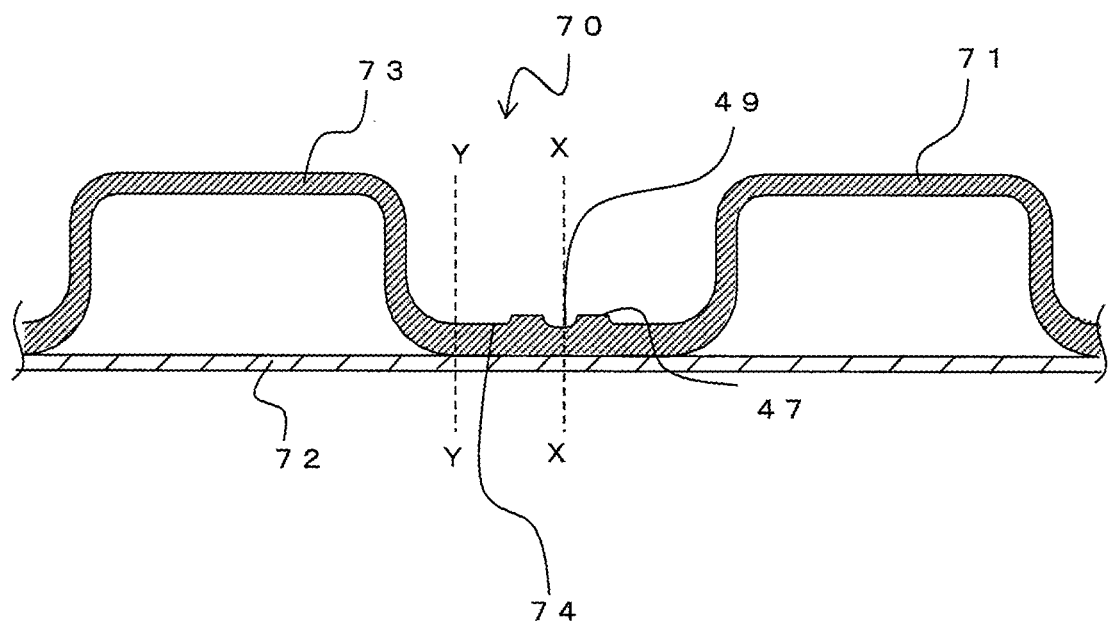
FIG. 25 is an enlarged cross sectional view of a small diameter part 74 of the double-wall rectangular electrical conduit 70.

Another connection structure for the double-wall rectangular electrical conduit using a pipe coupling will be described. The present embodiment can be obtained by connecting the double-wall rectangular electrical conduit 70 that is cut at a predetermined position of the small diameter part 74 to the pipe coupling. FIG. 25 is an enlarged cross sectional view of proximity of the small diameter part 74 of the double-wall rectangular electrical conduit 70. As shown in FIG. 25, a pair of protrusion parts 47 are formed substantially symmetrically with a flat part 49 therebetween at a substantial center of a pipe axial direction of the small diameter part of the electrical conduit used for the connection structure for double-wall rectangular electrical conduits. If the pair of protrusion parts 47 are formed substantially symmetrically with the flat part 49 therebetween at a substantial center of the pipe axial direction, stable cutting of the small diameter part 74 at its substantial center can be performed by cutting the flat part 49, which is formed between the protrusion parts, along a line XX in the drawing. That is, similarly to the electrical conduit 40*b*, the double-wall rectangular electrical conduit 70 can be easily cut by forming a groove between the protrusion parts 47 and using a cutting tool along the groove. Also, since the cutting position is unlikely to be shifted, the double-wall rectangular electrical conduit 70 can be cut with high accuracy.

Here, to obtain the connection structure for double-wall rectangular electrical conduits 70 using the pipe coupling, the following three types of electrical conduits can be used as the double-wall rectangular electrical conduits.

The double-wall rectangular electrical conduit 70 is cut at a predetermined position of the small diameter part 74 (substantially the center of the pipe axial direction), which is then used as:

1) a double-wall rectangular electrical conduit 70a having the male fitting part 1b at an end portion;

2) a double-wall rectangular electrical conduit 70b having the female fitting part 30b at an end portion; and 3) a double-wall rectangular electrical conduit 70c that is cut at predetermined positions of the small diameter parts 74 at both end portions and has no fitting parts.

(Cutting Position of an Electrical Conduit Used in the Connection Structure for Double-Wall Rectangular Electrical Conduits)

Here, the cutting position of the small diameter part 74 of the double-wall rectangular electrical conduit 70 is preferably set at the substantial center of the pipe axial direction of the small diameter part 74. By setting the cutting position of the small diameter part 74 at the substantial center of the pipe axial direction of the small diameter part 74 in this way, it is possible to obtain a predetermined length of a fusion length of the small diameter part 74.

As above, when the double-wall rectangular electrical conduits are connected with the other by using a pipe coupling and at least the ends that are connected to the pipe coupling are cut at the center of the axial direction of the small diameter parts 74, the connection structure for the double-wall rectangular electrical conduits can be obtained. That is, the ends of the double-wall rectangular electrical conduit 70a, the double-wall rectangular electrical conduit 70b, and the double-wall rectangular electrical conduit 70c are cut at the center of the axial direction of the small diameter part 74, and then facing and connecting the large diameter part 73 with the other on the end side by using the pipe coupling can form the connection structure. Thus, it is easy to form a conduit line in which either of the double-wall rectangular electrical conduit 70a, the double-wall rectangular electrical conduit 70b, and the double-wall rectangular electrical conduit 70c is further connected to the end part of the connection structure for the double-wall rectangular electrical conduits.

Also, as shown in FIG. 25, the outer pipe 71 of the double-wall rectangular electrical conduit 70 has the large diameter parts 73 and the small diameter parts 74 that are alternately and repeatedly formed, and the inner surface of the outer pipe 71 is fusion bonded with the outer surface of the inner pipe 72 at the small diameter part 74. Here, a fusion-bonding strength at the center part of the pipe axial direction of the small diameter part 74 is higher than that at the end part of the small diameter part 74. This is because stress acts in a direction opposite to a fusion direction at the proximity of the end part of the small diameter part 74 to form the large diameter part 73. Thus, cutting at the substantial center of the pipe axial direction of the small diameter part 74 means that a part where the fusion strength of the small diameter 74 is the highest becomes the cutting position. This can prevent peeling off of the fusion bonded part due to vibrations or the like during cutting and can also stabilize the shape of the large diameter part 73 that is adjacent to the fusion bonded part.

In this way, it is possible to obtain the predetermined length of the fusion bonded part of the small diameter part 74 while cutting at the part where the fusion strength is the highest. Thus, it is also possible to increase a fusion area of the fusion bonded part of the cut part. For this reason, compared to cutting along a line YY in the drawing or the like, the strength of the end parts of the double-wall rectangular electrical conduits to be connected by the pipe coupling can be kept high, so the double-wall rectangular electrical conduits 70a, 70b, and 70c having sound strength and shapes at the cut end parts can be obtained.

(Connection Structure for Double-Wall Rectangular Electrical Conduits Using a Pipe Coupling with a Π-Shaped Fixing Member)

Figure 26:
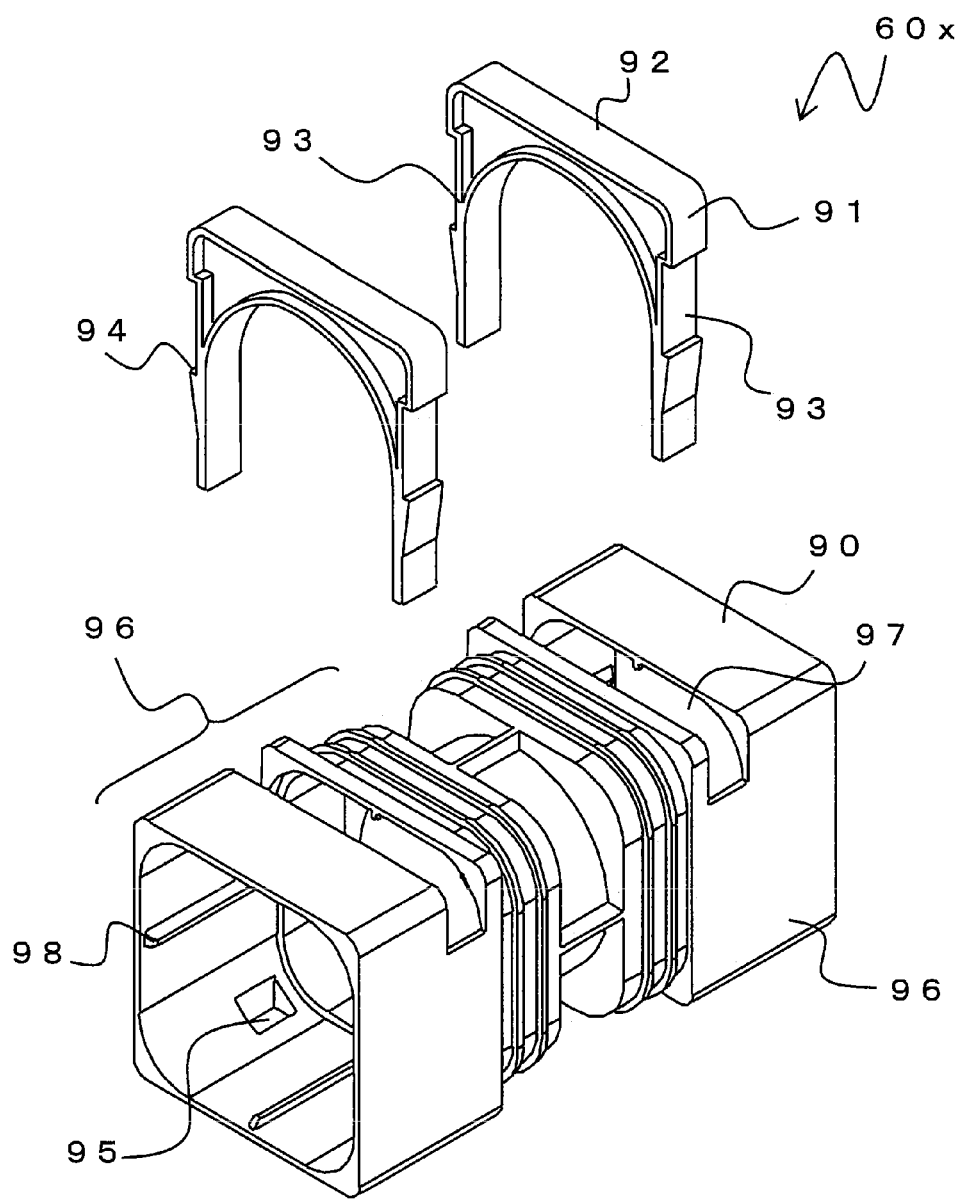
FIG. 26 is an exploded perspective view showing a pipe coupling 60x.

Next, a pipe coupling that is used in a connection structure 100x, which will be described below, between the double-wall rectangular electrical conduit and the pipe coupling will be described. FIG. 26 is an exploded perspective view of a pipe coupling 60x. The pipe coupling 60x is mainly composed of a coupling body 90 and a pair of Π-shaped fixing members 91.

The Π-shaped fixing member 91 includes a top surface portion 92 and a pair of leg portions 93. The leg portions 93 are connected to both side end portions of the top surface portion 92, respectively, so as to be substantially perpendicular to the top surface portion 92 and protruding downward. An engaging portion 94 is formed on each of the leg portions 93, facing outward. The engaging portions 94 are formed so that lower parts thereof spread out to both side directions.

On both end portions of the coupling body 90, a tubular portion 96 having a substantially rectangular shape that is symmetric with regard to the pipe axial direction is formed. The tubular portion 96 is a part to which the large diameter part 73 or the like, which will be described below, of a rectangular electrical conduit being cut at a predetermined position of the small diameter part is inserted. An opening cutout portion 97 is formed at an upper part of the tubular portion 96. Also, on an inner side face of the tubular portion 96, an engaging step portion 98 is formed at a position that corresponds to the cutout portion 97 of the coupling body 90. The engaging step portion 98 is formed as a protruding portion that protrudes inwardly, substantially parallel to the pipe axial direction of the coupling body 90.

Opening portions 95 are provided on both sides of a bottom portion of the tubular portion 96 of the coupling body 90. The opening portion 95 is formed at a position that corresponds to the cutout portion 97 with regard to the pipe axial direction of the coupling body 90. The leg portion 93 of the Π-shaped fixing member 91 can be inserted into the opening portion 95.

Figure 27A:
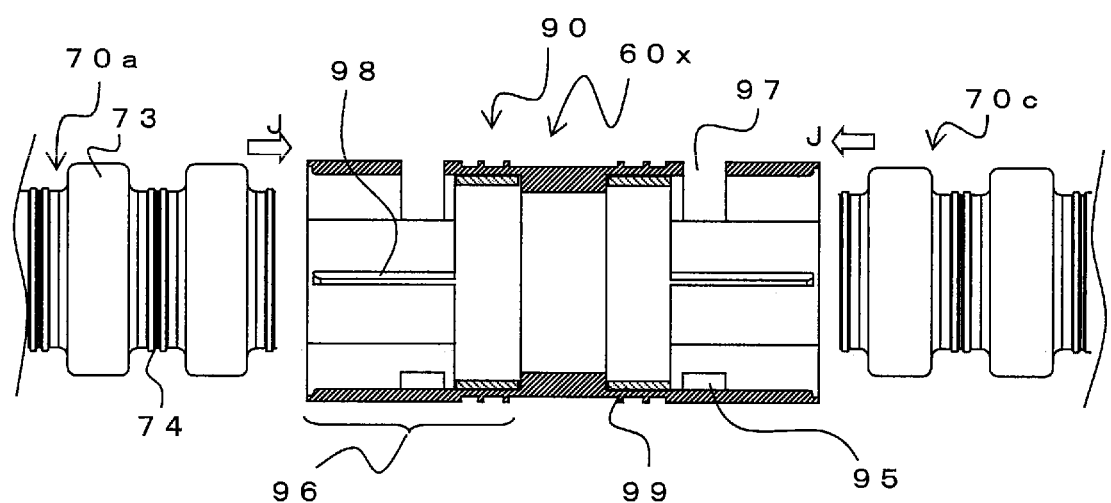
FIG. 27A is a view showing a method for connecting the double-wall rectangular electrical conduits 70 using the pipe coupling 60x.

Next, a method for connecting the cut double-wall rectangular electrical conduits 70a and 70c using the pipe coupling 60x will be described as an example. As mentioned above, the lengths of the double-wall rectangular electrical conduits 70a and 70c each of which is cut at the substantial center of the small diameter part 74 are adjusted suitably. First, as shown in FIG. 27A, the cut double-wall rectangular electrical conduits 70a and 70c are disposed so as to face each other's cut end portions. Next, the facing end portions are inserted into both sides of the coupling body 90 of the pipe coupling 60x, respectively (directions shown by arrows J in the drawing).

Inside the tubular portion 96 of the coupling body 90, a water sealing member 99 surrounding an entire periphery of an inner periphery surface of the tubular portion 96 is disposed on a farther deep side of the cutout portion 97. The water sealing portion 99 is a water expansion member or a rubber packing, for example.

Figure 27B:
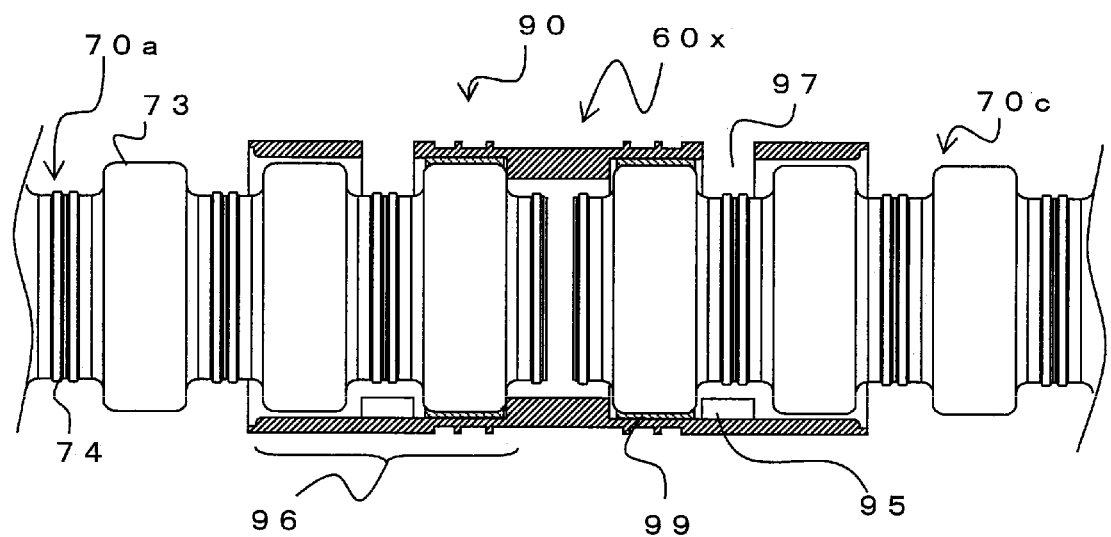
FIG. 27B is the view showing a method for connecting the double-wall rectangular electrical conduits 70 using the pipe coupling 60x.

FIG. 27B is a view showing a state in which the double-wall rectangular electrical conduits 70a and 70c are inserted into both sides of the coupling body 90, respectively. Inside the tubular portion 96 of the coupling body 90, at least the large diameter part 73, the small diameter 74, and the large diameter 73 of the double-wall rectangular electrical conduits 70a and 70c are disposed in sequence. The small diameter part 74 is disposed at a position of the cutout portion 97 of the tubular portion 96. Also, an inner surface of the coupling body 90 and the outer surfaces of the large diameter parts 73 of the double-wall rectangular electrical conduits 70a and 70c are in contact with each other via the sealing member 99, which ensures water sealing performance.

Figure 28:
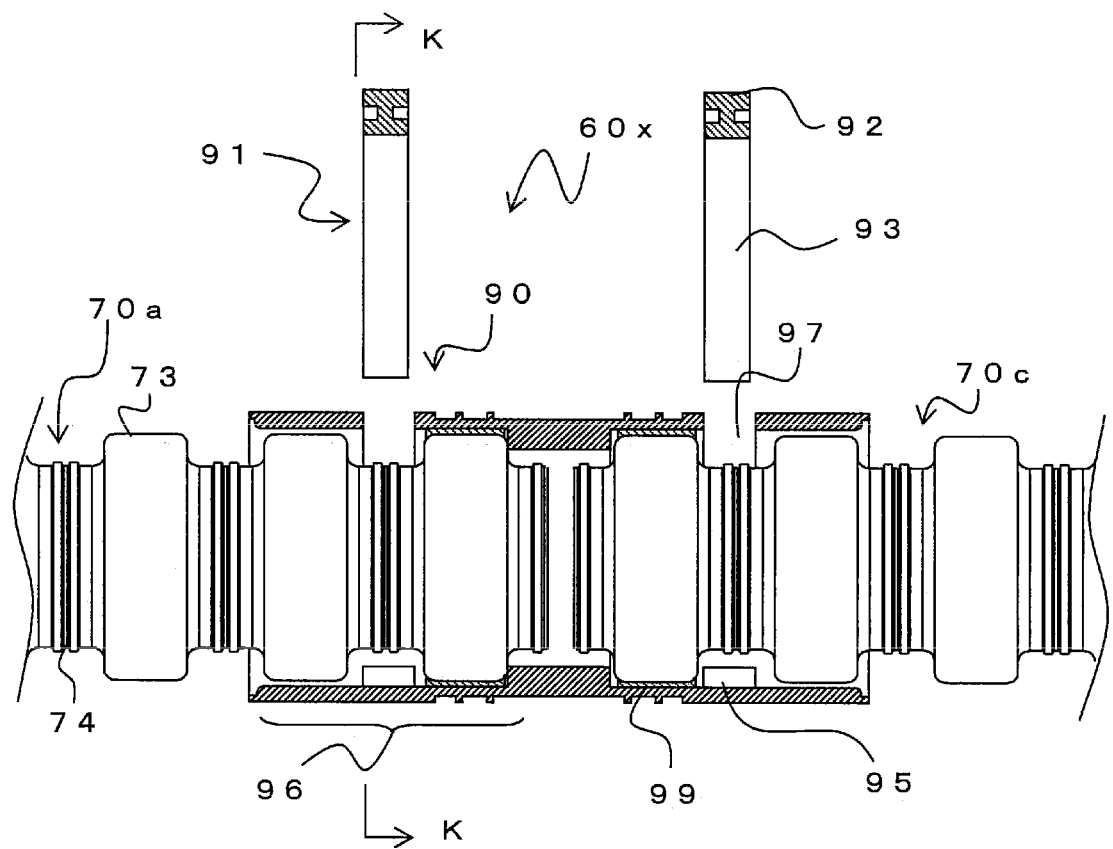
FIG. 28A is the view showing a method for connecting the double-wall rectangular electrical conduits 70 using the pipe coupling 60x.
FIG. 28B is the view showing a method for connecting the double-wall rectangular electrical conduits 70 using the pipe coupling 60x.

Next, the Π-shaped fixing member 91 is inserted into the cutout portion 97 from the upper part of the coupling body 90. FIG. 28A is a view showing a state before insertion of the Π-shaped fixing member 91, and FIG. 28B is a view showing a state after insertion of the Π-shaped fixing member 91. Also, FIG. 29A is a cross sectional view taken along K-K line in FIG. 28A, and FIG. 29B is a cross sectional view taken along L-L line in FIG. 28B.

Figure 29B:
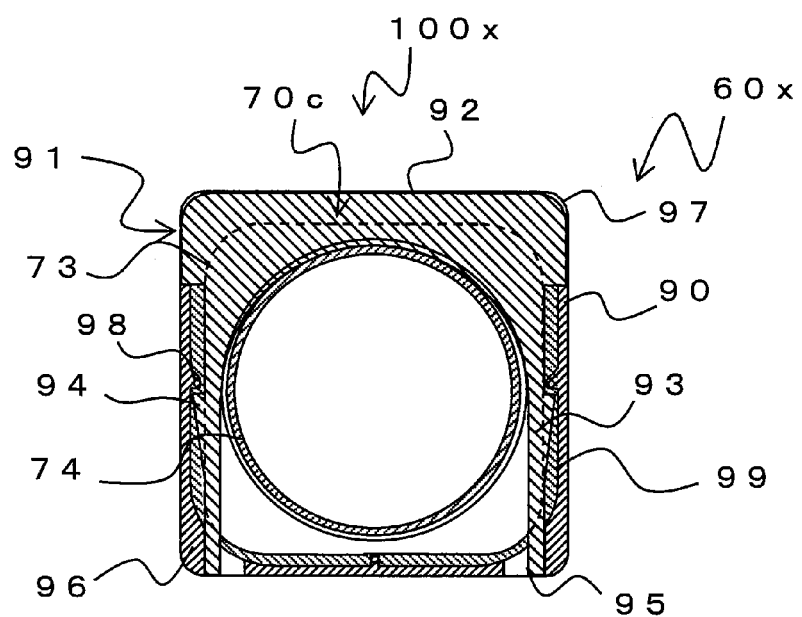
FIG. 29B is a cross sectional view taken along L-L line in FIG. 28B.

As shown in FIG. 27B and FIG. 29B, the Π-shaped fixing member 91 is inserted into the cutout portion 97 from above. Also, a tip end of the leg portion 93 of the Π-shaped fixing member 91 is inserted into the opening portion 95 that is provided at the bottom portion of the tubular portion 96 of the coupling body 90. At this time, the engaging portion 94 engages with the engaging step portion 98, and the Π-shaped fixing member 91 is fixed to the coupling body 90.

When the Π-shaped fixing member 91 is inserted into the cutout portion 97, the inner periphery surface of the top surface portion 92 of the Π-shaped fixing member 91 is smaller than the larger diameter part 73 and larger than the small diameter part 74 of the double-wall rectangular electrical conduits 70a and 70c. Thus, in an attempt to pull the double-wall rectangular electrical conduits 70a and 70c out of the coupling body 90 with the Π-shaped fixing member 91 being fixed to the coupling body 90, a part of the upper part of the inner surface of the top surface portion 92 and the leg portions 93 of the Π-shaped fixing member 91 come into contact with and engage with the side faces of the large diameter parts 73 of the double-wall rectangular electrical conduits 70a and 70c. In this way, the double-wall rectangular electrical conduits 70a and 70c engage with the pipe coupling 60x in the pipe axial direction, and thus the double-wall rectangular electrical conduits 70a and 70c do not come off the coupling body 90. That is, the connection structure 100x for the double-wall rectangular electrical conduits 70a and 70c using the pipe coupling 60x can be formed.

(Connection Structure for Double-Wall Rectangular Electrical Conduits Using a Pipe Coupling with a Locking Piece)

Next, a connection structure 100y between a cut double-wall rectangular electrical conduit and another pipe coupling will be described. Although any of the double-wall rectangular electrical conduits 70a, 70b, and 70c can be used for this connection structure for the double-wall rectangular electrical conduits, the double-wall rectangular electrical conduit 70c will be used for description here as an example.

Figure 30:
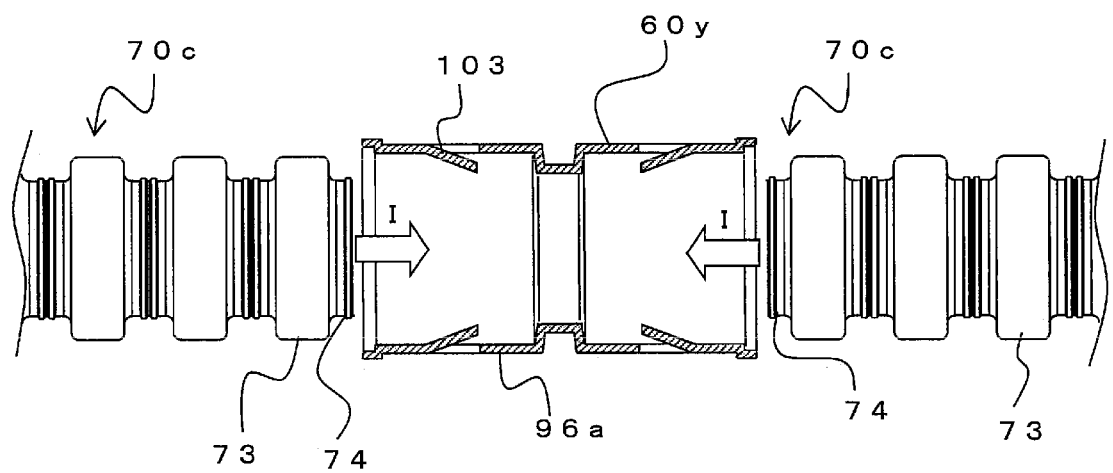
FIG. 30A is a view showing a method for connecting the double-wall rectangular electrical conduits 70 using a pipe coupling 60y.
FIG. 30B is a view showing a method for connecting the double-wall rectangular electrical conduits 70 using the pipe coupling 60y.
Figure 30:
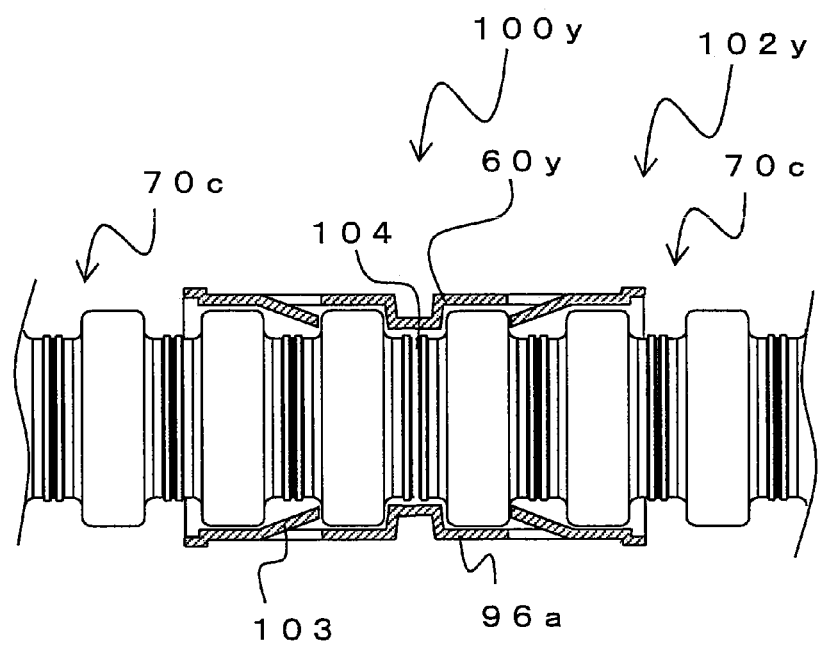

FIG. 30A and FIG. 30B are views showing a method for connecting the double-wall rectangular electrical conduits 70c with the other by using a pipe coupling 60y after cutting the double-wall rectangular electrical conduit 70c at the predetermined position of the small diameter part 74. The cutting position of the small diameter part 74 as the predetermined position is the substantial center of the pipe axial direction of the small diameter part 74. The pipe coupling 60y is formed of a tubular member 96a in which a diameter thereof is reduced at a substantial center of its axial direction. The tubular member 96a is in a substantially circular shape at the reduced diameter section at the center, and other sections on both sides of the reduced diameter section are in substantially rectangular shapes.

A locking piece 103, protruding toward the center of the axial direction, is provided on a rectangular cross section of the pipe coupling 60y. The locking piece 103 has a spring property and formed so as to increase an amount of protrusion gradually toward the center of the axial direction. The locking pieces 103 are disposed at substantially symmetrical positions with the reduced diameter section at the center of the axial direction therebetween. Also, the locking pieces 103 are disposed at a plurality of positions in a periphery direction of the tubular member 96a (at least at two facing positions, for example).

First, as shown in FIG. 30A, the double-wall rectangular electrical conduits 70c are cut into the predetermined lengths and are disposed so as to face each other's cut ends (the small diameter parts 74). At the end of the double-wall rectangular electrical conduit 70c, the cut section of the small diameter part 74, the large diameter part 73, the small diameter part 74, and the large diameter 73 are formed in sequence.

As shown in FIG. 30A, when each double-wall rectangular electrical conduit 70c is inserted from the opening part on each end of the pipe coupling 60y (the tubular member 96a) (an arrow I in the drawing) so as to face the double-wall rectangular electrical conduits 70c each other via a facing portion 104, the large diameter part 73 of each of the double-wall rectangular electrical conduits 70c comes into contact with the locking piece 103. By further inserting the double-wall rectangular electrical conduits from the opening parts of both ends of the pipe coupling 60y, the large diameter part 73 climbs over the locking piece 103 and then returns to its original position due to the spring property, as shown in FIG. 30B.

Thus, a tip end of the locking piece 103 comes into contact with the side face of each of the large diameter parts 73 and the double-wall rectangular electrical conduits 70c are locked. As above, the connection structure 100y for the double-wall rectangular electrical conduits 70c using the pipe coupling 60y can be formed by means of a mechanism of contacting the locking piece 103 with the side face of the large diameter part 73 on a side closer to the facing portion 104 of the double-wall rectangular electrical conduits 70c, wherein the locking piece 103 is supported inside the substantially rectangular tube member 96a on a far side from the facing portion 104 of the double-wall rectangular electrical conduits 70c.

With such the pipe coupling 60y being used, each locking piece 103 inside the pipe coupling 60y supports the double-wall rectangular electrical conduit 70c even when a pulling force acts in a direction of keeping away the double-wall rectangular electrical conduit 70c from the pipe coupling 60y. Thus, the double-wall rectangular electrical conduit 70c does not come off the pipe coupling 60y. As above, the same effects as in the connection structure 100x for the double-wall rectangular electrical conduits 70a and 70c can be obtained in the connection structure 100y for the double-wall rectangular electrical conduits by using the double-wall rectangular electrical conduits 70c each of which is cut at the substantial center of the pipe axial direction of the small diameter part 74.

(Conduit line using the connection structure for double-wall rectangular electrical conduits)

As mentioned above, using the pipe coupling 60x and inserting the Π-shaped fixing member 91 from above into the cutout portion 97 so as to restrict the movement of the large diameter part 73 by the Π-shaped fixing member 91 can form the connection structure 100x for the double-wall rectangular electrical conduits in which the double-wall rectangular electrical conduit 70a is connected with the double-wall rectangular electrical conduit 70c. Furthermore, a conduit line 102x can be obtained by repeatedly connecting the double-wall rectangular electrical conduit 70c having no fitting parts to this connection structure 100x for the double-wall rectangular electrical conduits. Also, a conduit line 102y can be similarly obtained by further repeatedly connecting the double-wall rectangular electrical conduit 70c having no fitting parts to the connection structure 100y formed by connecting the double-wall rectangular electrical conduit 70c with the other using the pipe coupling 60y. In particular, the long conduit line 102x or 102y for the double-wall rectangular electrical conduits can be obtained by repeatedly connecting multiple number of the double-wall rectangular electrical conduits 70c by using the pipe coupling 60x or the pipe coupling 60y.

Although the embodiments of the present invention have been described referring to the attached drawings, the technical scope of the present invention is not limited to the embodiments described above. It is obvious that persons skilled in the art can think out various examples of changes or modifications within the scope of the technical idea disclosed in the claims, and it will be understood that they naturally belong to the technical scope of the present invention.

DESCRIPTION OF NOTATIONS 1a, 1b . . . male fitting part
3, 3a, 3b, 3c . . . pipe body
5, 5a, 5b . . . ring member
7 . . . water sealing member
9 . . . locking wall
10, 10a . . . connection structure
11 . . . ring member mounting position
17 . . . thin part
19 . . . opening part
21 . . . reduced diameter part
22 . . . first click part
23 . . . second click part
24a, 24b . . . joint part
25, 25a, . . . slit
26 . . . fitting part
27 . . . water sealing member holder
29 . . . clearance
30a, 30b . . . female fitting part
33 . . . tapered part
35 . . . cylindrical part
37 . . . slope part
39 . . . ring fitting part
40a, 40b, 40c . . . electrical conduit
41 . . . wavy form
43 . . . mountain part
45 . . . valley part
47 . . . protrusion part
49 . . . flat part
50, 50a . . . bell block
53 . . . bell mouth
55 . . . handhole
60a, 60b, 60c, 60d . . . pipe coupling
60x, 60y . . . pipe coupling
61 . . . wavy form
70, 70a, 70b, 70c . . . double-wall rectangular electrical conduit
71 . . . outer pipe
72 . . . inner pipe
73 . . . large diameter part
74 . . . small diameter part
80 . . . manufacturing apparatus for double-wall rectangular electrical conduit
81a, 81b . . . extruding machine
82a, 82b . . . endless track
83 . . . extrusion head
85 . . . metal mold
87a, 87b, 87c . . . flow channel
89a, 89b . . . element tube
90 . . . coupling body
91 . . . Π-shaped fixing member
92 . . . top surface portion
93 . . . leg portion
94 . . . engaging portion
95 . . . opening portion
96 . . . tubular portion
96a . . . tubular member
97 . . . cutout portion
98 . . . engaging step portion
99 . . . water sealing member
100, 100x, 100y . . . connection structure for double-wall rectangular electrical conduit
102, 102x, 102y . . . conduit line for double-wall rectangular electrical conduit
103 . . . locking piece
104 . . . facing portion

What is claimed is:

1. A double-wall rectangular electrical conduit comprising:
   an outer pipe formed of an electrical conduit having fitting structures on both ends, the electrical conduit comprising:
   a pipe body;
   a male fitting part formed on one end part of the pipe body; and
   a female fitting part formed on another end part of the pipe body, the female fitting part having a shape that can be fitted with the male fitting part, wherein the male fitting part is formed on an outer periphery part of the pipe body in a vicinity of an end part of the pipe body, the male fitting part comprising:
   a pair of locking walls that are disposed separately in a pipe axial direction;
   a ring member mounting position that connects the locking walls with one another, the ring member mounting position being formed parallel to the pipe axial direction in a straight-pipe shape; and
   a ring member that is disposed on the ring member mounting position between the locking walls,
   wherein:
   the ring member is either in a substantially C shape with an opening at a part of a circumferential direction of the ring member, or in a ring shape being connected at ring member joint parts formed at both ends of the circumferential direction of the ring member;

the ring member includes a reduced diameter part at one end part of the ring member, a plurality of first click parts and a plurality of second click parts, the first and second click parts being provided side by side separately with slits therebetween to the reduced diameter part in the circumferential direction of the ring member;

the first click part is a click part that protrudes from the reduced diameter substantially parallel to the pipe axial direction to form a slide guide and the second click part is a locking click whose outer diameter gradually increases in a straight line from an edge of the reduced diameter part at the ring member mounting position toward a tip end of the second click part of the ring member on a cross section taken in the pipe axial direction thereof, and the tip end of the second click part is configured to abut a ring fitting part of the female fitting part that projects toward the center of the pipe radial direction when a pulling-out force is applied to the male fitting part of the double-wall rectangular electrical conduit;

in the ring member, both a tip end of the second click part and a tip end of the slide guide are disposed so as to be positioned on an inner side of a pipe axial direction of the pipe body and the reduced diameter part is disposed so as to be positioned on a tip end side of the pipe body;

outer diameters of the reduced diameter part and the slide guide are formed smaller than an outer diameter of the locking wall and an outer diameter of the tip end of the second click part is formed larger than the outer diameter of the locking wall; and there is a clearance between the ring member and at least one of the locking walls and the ring member can slide in an axial direction within the ring member mounting position;

the female fitting part is formed on an inner circumferential part of the pipe body and includes, from the tip end side in sequence, a cylindrical part, a slope part whose diameter reduces gradually from the cylindrical part, and a ring fitting part whose diameter expands from a minimum inner diameter part of the slope part;

a water sealing member is provided on a farther inner side of the locking wall on the inner side of the pipe axial direction of the male fitting part of the outer pipe;

large diameter parts as substantially square shaped mountain parts and small diameter parts as circular valley parts are alternately formed on an outer periphery surface of the pipe body between the male fitting part and the female fitting part;

the double-wall electrical conduit has an inner pipe other than an outer pipe, the inner pipe in a substantially tubular shape is disposed inside the outer pipe; and an inner periphery surface of the small diameter part of the outer pipe is fusion bonded with an outer periphery surface of the inner pipe at the small diameter part.

2. The double-wall rectangular electrical conduit according to claim 1, wherein the inner pipe is accommodated inside the male fitting part of the outer pipe, and the inner pipe is cut inside the female fitting part of the outer pipe so as not to obstruct a connection between the male fitting part and the female fitting part.

3. A connection structure for double-wall rectangular electrical conduits, wherein:
the two double-wall rectangular electrical conduits according to claim 2 are disposed facing each other in the pipe axial direction; and
the female fitting part of one of the double-wall rectangular electrical conduits is connected to the male fitting part of the other double-wall rectangular electrical conduit.

4. A connection structure for the double-wall rectangular electrical conduit according to claim 1 or claim 2, comprising:
a handhole including a bell block; and
the double-wall rectangular electrical conduit, wherein the bell block having the same structure as the female fitting part is connected with the male fitting part of the double-wall rectangular electrical conduit.

5. The connection structure for the double-wall rectangular electrical conduit according to claim 4, wherein:
the handhole comprises a plurality of the bell blocks;
and the double-wall rectangular electrical conduits are connected to a part or all of the bell blocks.

6. A pipe coupling connected to the double-wall rectangular electrical conduit according to claim 2, the pipe coupling comprising:
a pipe body of the pipe coupling;
a male fitting part, disposed on one end of the pipe body of the pipe coupling; and
a fitting structure disposed on the other end of the pipe body of the pipe coupling;
wherein the male fitting part on one end of the pipe body of the pipe coupling and the fitting structure on the other end of the pipe body of the pipe coupling are each adjacent to a water sealing member disposed between the male fitting part and the fitting structure with the male fitting part and the fitting structure facing opposite directions;
the male fitting part comprising:
a pair of locking walls that are disposed separately in a pipe axial direction;
a ring member mounting position that connects the locking walls with one another, the ring member mounting position being formed parallel to the pipe axial direction in a straight-pipe shape; and
a ring member that is disposed on the ring member mounting position between the locking walls,
wherein:
the ring member is in a substantially C shape with an opening at a part of a circumferential direction of the ring member or a ring member joint part is formed on each end of the ring member and both ends of the ring member are connected at the ring member joint parts so that the ring member is formed in a ring shape;
the ring member includes a reduced diameter part at one end part thereof, a plurality of first click parts and a plurality of second click parts, the first and second click parts being provided side by side separately with slits therebetween to the reduced diameter part in the circumferential direction of the ring member;
the first click part is a click part that protrudes from the reduced diameter part substantially parallel to the pipe axial direction to form a slide guide and the second click part is a locking click whose outer diameter gradually increases in a straight line from an edge of the reduced diameter part at the ring member mounting position toward a tip end of the ring member on a cross section taken in the pipe axial direction thereof;
in the ring member, both a tip end of the second click part and a tip end of the slide guide are disposed so as to be positioned on an inner side of a pipe axial direction of the pipe body of the pipe coupling and the reduced diameter part is disposed so as to be positioned on a tip end side of the pipe body of the pipe coupling;

outer diameters of the reduced diameter part and the slide guide are formed smaller than an outer diameter of the locking wall and an outer diameter of the tip end of the second click part is formed larger than the outer diameter of the locking wall;

the male fitting part is formed so that the length of the ring member mounting position is longer than the length of the ring member; and there is a clearance between the ring member and at least one of the locking walls and the ring member can slide in an axial direction over the ring member mounting position.

7. The pipe coupling according to claim 6, wherein one end of the pipe coupling has the male fitting part and the other end of the pipe coupling has the same male fitting part as the fitting structure.

8. The pipe coupling according to claim 6, wherein one end of the pipe coupling has the male fitting part and the other end of the pipe coupling is a bell mouth.

9. The pipe coupling according to claim 6, wherein one end of the pipe coupling has the male fitting part and the other end of the pipe coupling has a female fitting part having a shape that can be fitted with the male fitting part.

10. The double-wall rectangular electrical conduit according to claim 1, wherein the double-wall rectangular electrical conduits each end part of which is cut at a substantial center of the pipe axial direction of the small diameter part.

11. A connection structure for double-wall rectangular electrical conduits, wherein:

a pipe coupling connecting the double-wall rectangular electrical conduits according to claim 3, the pipe coupling comprising:

a coupling body; and a Π-shaped fixing member, wherein:

the Π-shaped fixing member includes a top surface portion and leg portions connected at substantially right angles to the top surface portion projecting downward, the outer periphery of the Π-shaped fixing member having a Π-shape, and the inner periphery of the Π-shaped fixing member having an inverted U shape;

the double-wall rectangular electrical conduits each end part of which is cut at a substantial center of the pipe axial direction of the small diameter part that can give the highest fusion strength to the interface between the inner pipe and the outer pipe and stabilize the shape of the large diameter part of the outer pipe are inserted into both sides of the coupling body of the pipe coupling, respectively;

a cutout portion is formed at an upper part of the coupling body at a position corresponding to each of the small diameter parts in the proximity of the end parts of the double-wall rectangular conduits, the small diameter part being situated between the two large diameter parts that are being inserted into the coupling body;

the Π-shaped fixing member is inserted from above into the cutout portion and the inserted Π-shaped fixing member restricts movement of the large diameter part so that the double-wall rectangular electrical conduit being cut at the substantial center of the pipe axial direction of the small diameter of the double-wall rectangular electrical conduit and the other double-wall rectangular electrical conduit being cut at the substantial center of the pipe axial direction of the small diameter are connected to the pipe coupling.

12. The connection structure for double-wall rectangular electrical conduits according to claim 11 wherein:

a pair of protrusion portions are formed symmetrically with a flat portion therebetween at the substantial center of the pipe axial direction of the small diameter part of the double-wall rectangular electrical conduit; and substantial center of the flat portion between the protrusion portions is cut.

13. The connection structure according to claim 11, further comprising at least one additional double-wall rectangular conduit coupled to the other end part of the connection structure.

* * * * *